(12) United States Patent
Okuda et al.

(10) Patent No.: US 8,467,666 B2
(45) Date of Patent: Jun. 18, 2013

(54) RECORDING MEDIUM PRODUCTION METHOD, RECORDING MEDIUM, AND PLAYER FOR RECORDING MEDIUM

(75) Inventors: Hiroshi Okuda, Tokyo (JP); Kensuke Onuma, Tokyo (JP); Toshiyuki Katsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 12/847,020

(22) Filed: Jul. 30, 2010

(65) Prior Publication Data

US 2011/0038598 A1 Feb. 17, 2011

(30) Foreign Application Priority Data

Aug. 11, 2009 (JP) ................ P2009-186690

(51) Int. Cl.
*H04N 9/80* (2006.01)
(52) U.S. Cl.
USPC ......................................... 386/353; 386/355
(58) Field of Classification Search
None
See application file for complete search history.

(56) References Cited

U.S. PATENT DOCUMENTS

| | | | |
|---|---|---|---|
| 6,564,006 B1* | 5/2003 | Mori et al. | 386/241 |
| 7,565,060 B2 | 7/2009 | Hamada et al. | |
| 2008/0131090 A1* | 6/2008 | Mae et al. | 386/124 |

FOREIGN PATENT DOCUMENTS

| | | |
|---|---|---|
| JP | 6-203025 | 7/1994 |
| JP | 2002-196853 | 7/2002 |
| JP | 2002-197088 | 7/2002 |
| JP | 3334795 | 8/2002 |
| JP | 4228767 | 12/2008 |

* cited by examiner

*Primary Examiner* — William C Vaughn, Jr.
*Assistant Examiner* — Asher Khan
(74) *Attorney, Agent, or Firm* — Sony Corporation

(57) ABSTRACT

A recording medium production method includes the steps of: obtaining, from electronic document data, text string placement information which represents placement of text strings included therein, with an electronic document data obtaining unit; first converting of the electronic document data into still image data with a still image data conversion unit; second converting of predetermined still image data of the still image data into moving image data, by generating moving image data of n seconds with a moving data conversion unit; generating underline rendering control information for highlighted display of predetermined text strings included in the moving image data and also to move the display position of the highlight, with an underline rendering control information generating unit, based on the text placement information; and recording the moving image data and the underline rendering control information in the recording medium with a recording unit, following a predetermined recording medium format.

9 Claims, 42 Drawing Sheets

| MATERIAL NO. | LOCATION SAVED |
|---|---|
| 1 | /BDMV/STREAM/00001.m2ts |
| 2 | /BDMV/STREAM/00002.m2ts |
| ... | ... |
| 4 | http://www.absdbcdaed.com/index.html |
| 10 | /BDMV/JAR/picture/page001 |
| 11 | /BDMV/JAR/picture/page001 |
| ... | ... |
| XX | /BDMV/JAR/picture/page003zoom01 |
| ... | ... |

MATERIAL USED AS STILL IMAGE WITHOUT BEING ENCRYPTED (brace covers rows 10, 11, XX)

FIG. 15

CPi

FOR MATERIAL NO. "1"

| CHAPTER NO. | CORRESPONDING PAGE NO. | PAGE ENTRANCE? |
|---|---|---|
| 1 | 2 | true |
| 2 | 4 | true |

...

FOR MATERIAL NO. "10"

| CHAPTER NO. | CORRESPONDING PAGE NO. | PAGE ENTRANCE? |
|---|---|---|
| 1 | 1 | true |

...

FOR MATERIAL NO. "11"

| CHAPTER NO. | CORRESPONDING PAGE NO. | PAGE ENTRANCE? |
|---|---|---|
| 1 | 3 | true |

...

FOR MATERIAL NO. "XX"

| CHAPTER NO. | CORRESPONDING PAGE NO. | PAGE ENTRANCE? |
|---|---|---|
| 1 | 3 | false |

FIG. 16A

| LINK NO. | CHAPTER NO. | x COORDINATE | y COORDINATE | WIDTH | HEIGHT | MATERIAL NO. OF TRANSITION DESTINATION | PAGE NO. OF TRANSITION DESTINATION |
|---|---|---|---|---|---|---|---|
| 1 | 1 | 310 | 130 | 130 | 30 | 5 | 10 |
| 2 | 2 | 230 | 20 | 150 | 80 | 6 | 12 |

| LINK NO. | CHAPTER NO. | x COORDINATE | y COORDINATE | WIDTH | HEIGHT | MATERIAL NO. OF TRANSITION DESTINATION | PAGE NO. OF TRANSITION DESTINATION |
|---|---|---|---|---|---|---|---|
| 1 | 1 | 20 | 250 | 150 | 50 | 13 | 15 |
| 2 | 1 | 50 | 200 | 30 | 20 | XX | 3 |
| 3 | 1 | 250 | 300 | 100 | 30 | 4 | – |

| LINK NO. | CHAPTER NO. | x COORDINATE | y COORDINATE | WIDTH | HEIGHT | MATERIAL NO. OF TRANSITION DESTINATION | PAGE NO. OF TRANSITION DESTINATION |
|---|---|---|---|---|---|---|---|
| 1 | 1 | 40 | 280 | 220 | 70 | 19 | 22 |

| | ROW NO. ID | PAGE NO. PG | SCREEN TEXT POSITION x COORDINATE DIS_CX | SCREEN TEXT POSITION y COORDINATE DIS_CY | SCREEN TEXT WIDTH DIS_W | UP MOVEMENT ROW NO. U_ID | DOWN MOVEMENT ROW NO. D_ID | LEFT MOVEMENT ROW NO. L_ID | RIGHT MOVEMENT ROW NO. R_ID | AUDIO SAVING LOCATION AS |
|---|---|---|---|---|---|---|---|---|---|---|
| TR1 | 0 | 1 | 100 | 100 | 50 | 0 | 1 | 0 | 0 | /BDMV/JAR/audio/001 |
| TR2 | 1 | 1 | 100 | 110 | 50 | 0 | 2 | 1 | 1 | |
| TR1022 | 1021 | 56 | 466 | 625 | 424 | 1020 | 1022 | 1035 | 1054 | /BDMV/JAR/audio/011 |
| TR1023 | 1022 | 56 | 466 | 648 | 424 | 1021 | 1023 | 1036 | 1055 | /BDMV/JAR/audio/012 |
| TR1024 | 1023 | 56 | 466 | 672 | 424 | 1022 | 1024 | 1037 | 1056 | /BDMV/JAR/audio/013 |
| | 1035 | 56 | 196 | 622 | 129 | 1034 | 1036 | 1035 | 1021 | |
| | 1036 | 56 | 196 | 643 | 54 | 1035 | 1037 | 1036 | 1022 | |
| | 1037 | 56 | 196 | 663 | 120 | 1036 | 1038 | 1037 | 1023 | |
| | 1054 | 56 | 1031 | 625 | 424 | 1024 | 1055 | 1021 | 1074 | /BDMV/JAR/audio/020 |
| | 1055 | 56 | 1031 | 648 | 424 | 1054 | 1056 | 1022 | 1075 | /BDMV/JAR/audio/021 |
| | 1056 | 56 | 1031 | 672 | 424 | 1055 | 1057 | 1023 | 1056 | /BDMV/JAR/audio/022 |
| | 1068 | 56 | 1031 | 955 | 424 | 1067 | 1069 | 1050 | 1068 | |
| | 1069 | 56 | 1031 | 978 | 424 | 1068 | 1078 | 1051 | 1069 | |
| | 1078 | 57 | 466 | 129 | 424 | 1069 | 1079 | 1078 | 1078 | |
| | 1079 | 57 | 466 | 153 | 424 | 1078 | 1080 | 1114 | 1079 | |
| TRn | 2000 | 90 | 466 | 955 | 424 | 1999 | 2000 | 1980 | 1989 | /BDMV/JAR/audio/091 |

| | |
|---|---|
| PL1 — The production re- | (1942) with its compelling — PL10 |
| PL2 — quired moving sets | finale on the Statue of — PL11 |
| PL3 — and strategically | Liberty; Light of a Glory — PL12 |
| PL4 — choreographed move- | (1943) about a troubled — PL13 |
| PL5 — ments, as well as | family in a California town — PL14 |

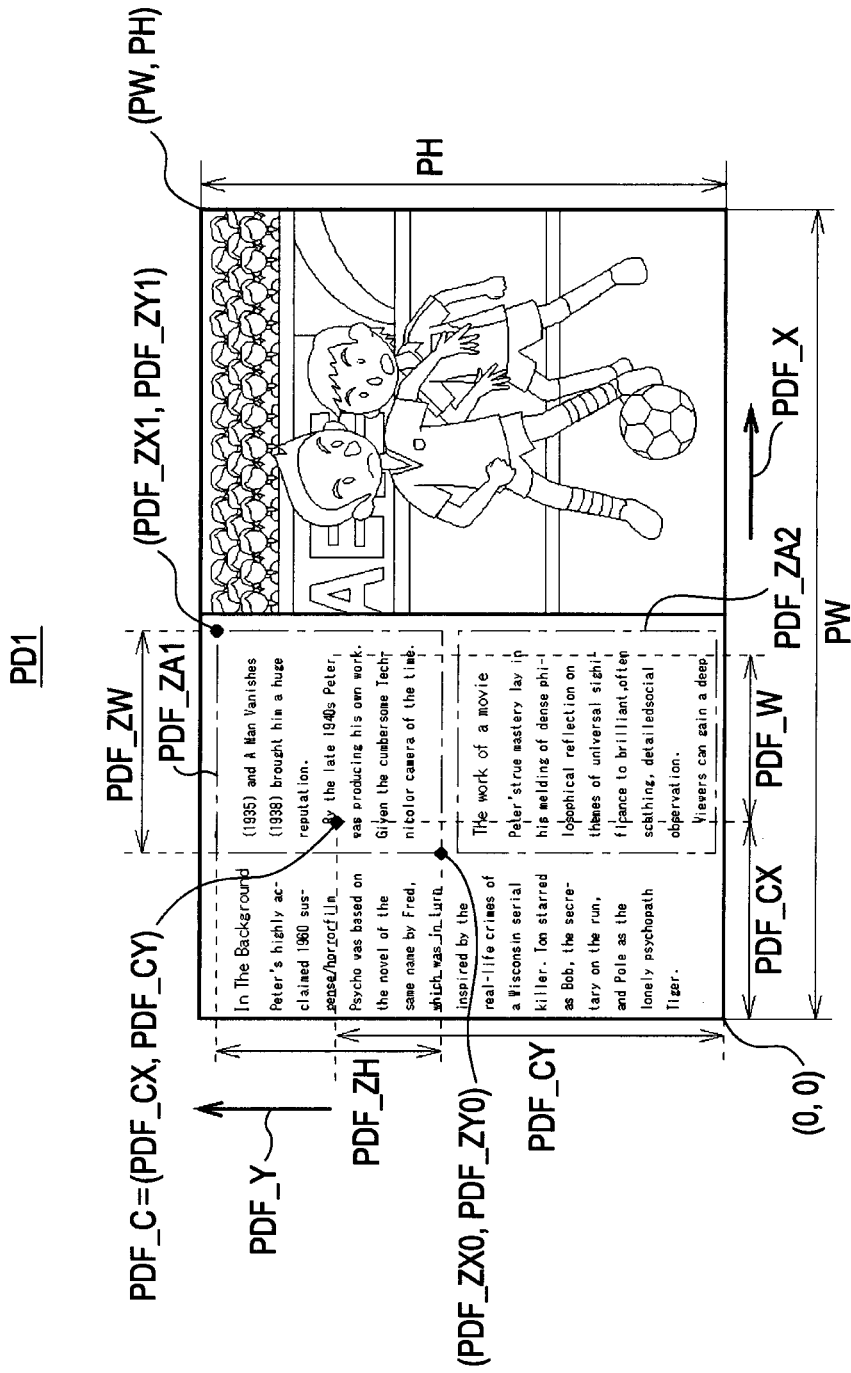

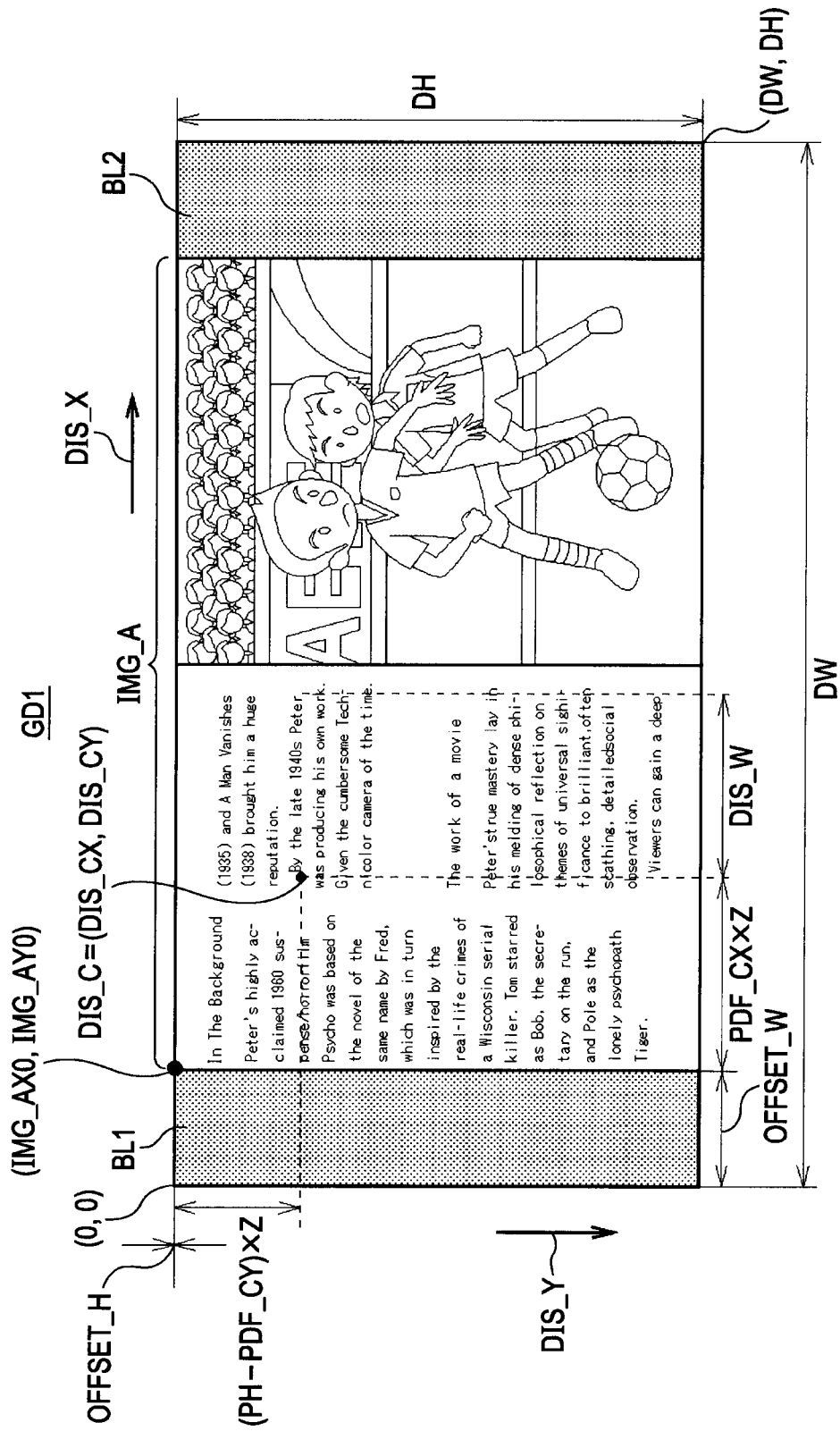

FIG. 35
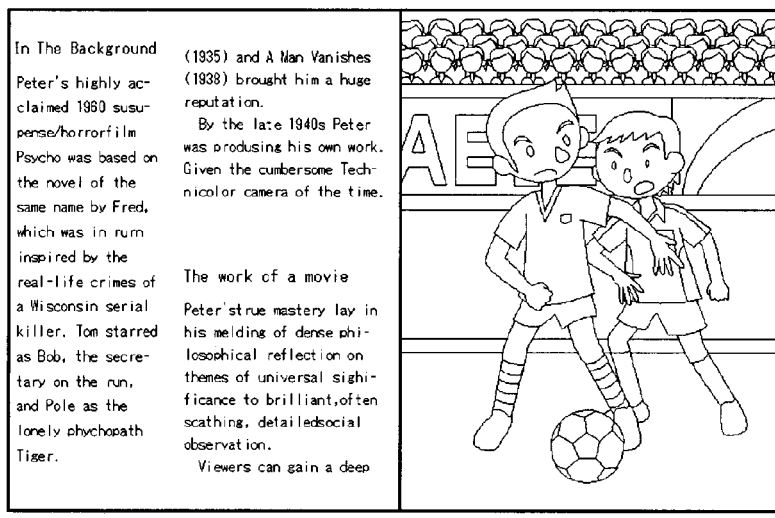
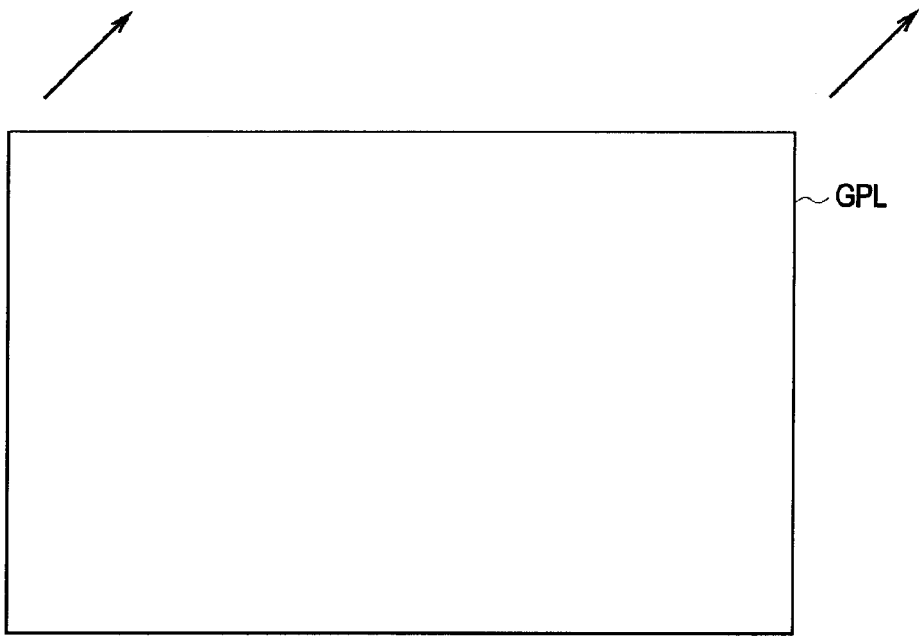

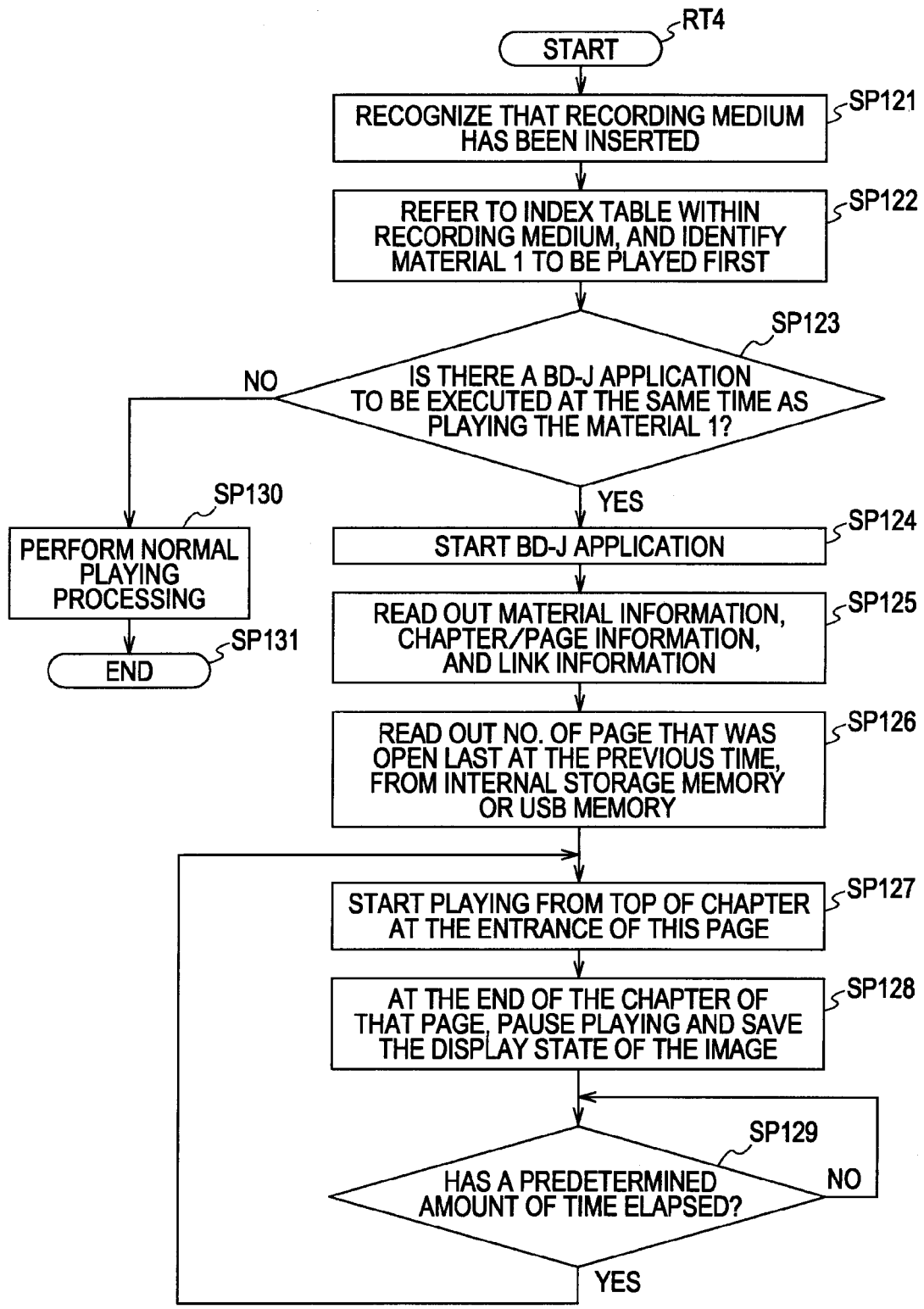

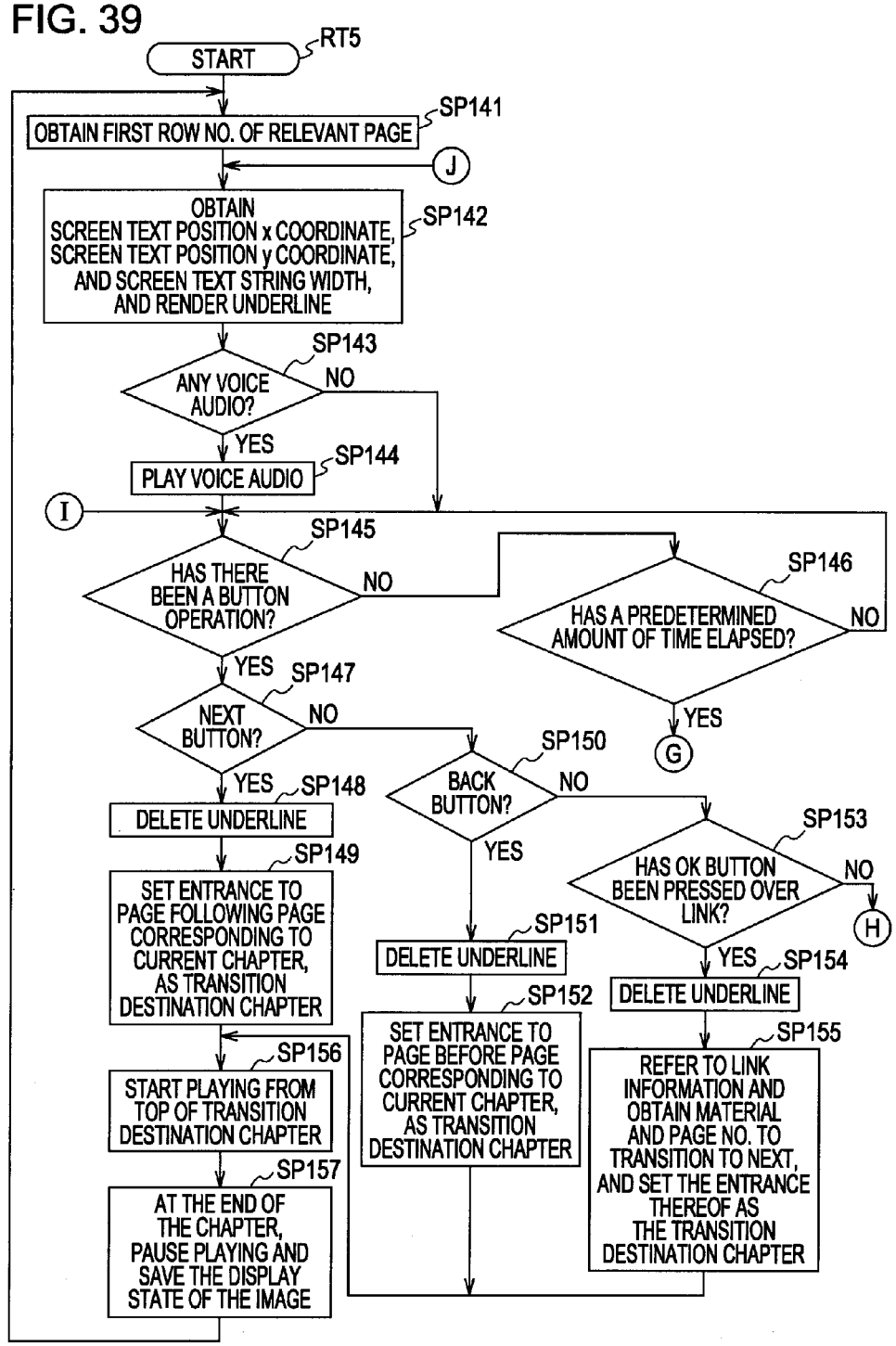

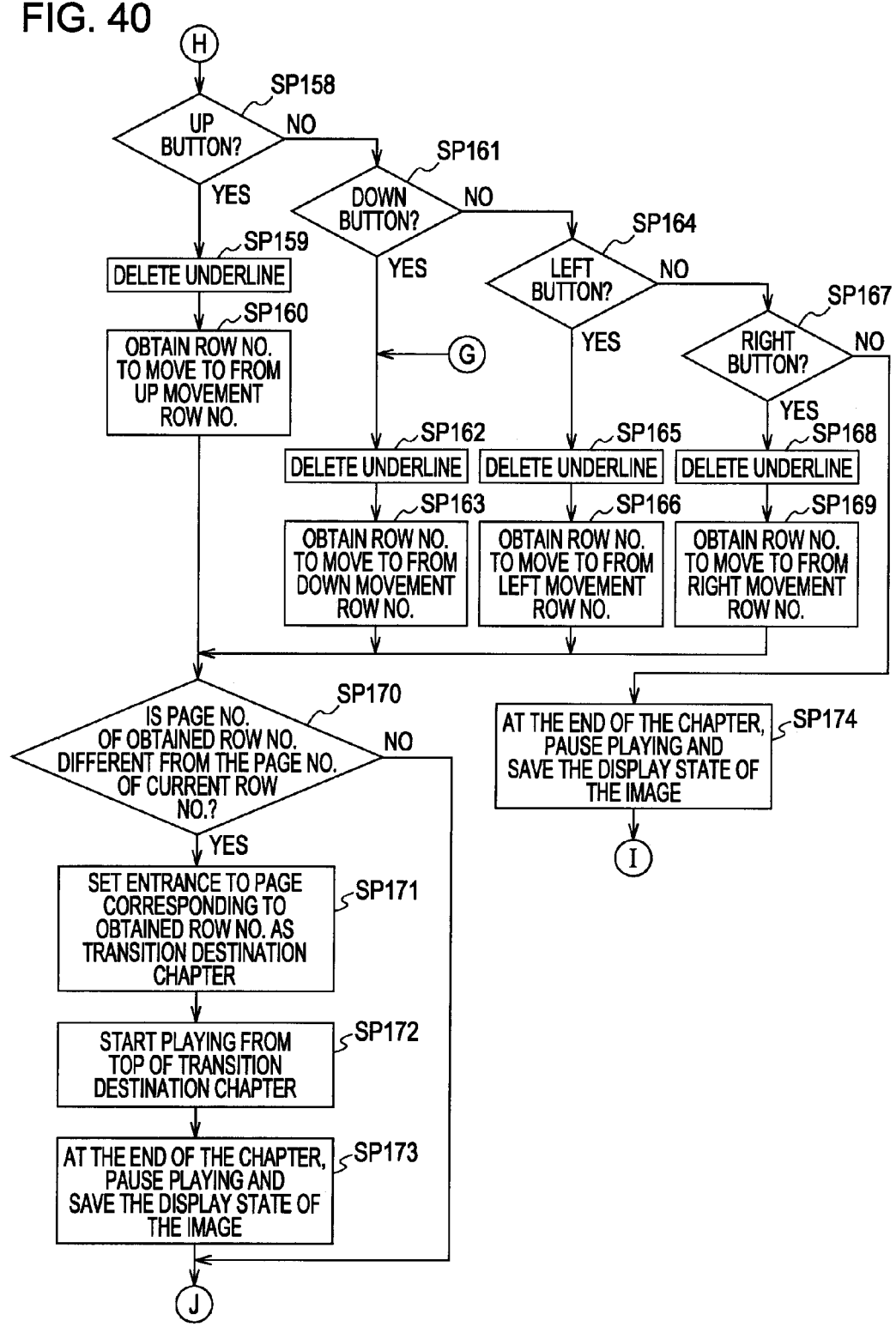

RECORDING MEDIUM PRODUCTION METHOD, RECORDING MEDIUM, AND PLAYER FOR RECORDING MEDIUM

BACKGROUND OF THE INVENTION

1. Field of the Invention

The present invention relates to a recording medium production method, a recording medium, and a player for playing the recording medium, which can be suitably applied to cases of recording contents the same as publications in a Blu-ray disc (registered trademark) which is a recording medium, for example.

2. Description of the Related Art

Heretofore, there have been proposed players which use recording media such as DVDs (Digital Versatile Discs), Blu-ray discs, and so forth, to play moving images in which still images are sequentially displayed one after another at predetermined intervals, also called "browsable slide shows" (e.g., see Japanese Patent Nos. 3334795 and 4228767).

SUMMARY OF THE INVENTION

However, Japanese Patent No. 3334795 has a problem in that, in the event that the moving image screen includes text with multiple characters, and particularly in the event that the number of characters is great, the user has difficulty in comprehending which portion on the screen is being indicated.

It has been found desirable to propose a recording medium production method, a recording medium, and a player for playing the recording medium, which can produce a recording medium in which contents, which can present portions to be noted in an easy-to-understand manner, are recorded.

A recording medium production method according to an embodiment of the present invention includes the steps of: obtaining of text string placement information, which represents placement of a plurality of text strings included in electronic document data, from the electronic document data, with an electronic document data obtaining unit; first converting, of the electronic document data into still image data with a still image data conversion unit; second converting, of predetermined still image data of the still image data into moving image data, by generating moving image data of n seconds with a moving data conversion unit using the still image data; generating of underline rendering control information to display predetermined text strings included in the moving image data in a highlighted manner and also to move the display position of the highlight, with an underline rendering control information generating unit, based on the text placement information; and recording of the moving image data and the underline rendering control information in the recording medium with a recording unit, following a predetermined recording medium format.

Thus, not only moving image data obtained by converting still image data based on electronic document data, but also text string placement information extracted from the electronic document data is recorded in a recording medium, so when the recording medium is played highlights are displayed as to text strings included in the content obtained by converting still images, and also the display position of the highlights can be freely moved.

Also, a recording medium according to an embodiment of the present invention has recorded therein: moving image data converted by generating moving image data of n seconds, using, of still image data obtained by converting electronic document data, predetermined the still image data; and underline rendering control information generated to display predetermined text strings included in the moving image data in a highlighted manner and also to move the display position of the highlight based on text position information obtained from the electronic document data, representing the position of a plurality of text strings included in the electronic document data.

Thus, when the recording medium is played, highlights are displayed as to text strings included in the contents obtained by converting still images into moving images, and also the display position of the highlights can be freely moved.

Further, a player medium according to an embodiment of the present invention includes: a playing unit configured to play, as an object of playing, a recording medium, in which are recorded moving image data converted by generating moving image data of n seconds, using, of still image data obtained by converting electronic document data, predetermined the still image data, and underline rendering control information generated to display predetermined text strings included in the moving image data in a highlighted manner and also to move the display position of the highlight, based on text position information obtained from the electronic document data, representing the position of a plurality of text strings included in the electronic document data; and an underline rendering control unit configured to display highlights for the text strings included in the still image data, and also to move the display position of the highlights, based on the underline rendering control information.

Thus, highlights are displayed as to text strings included in the contents obtained by converting still images into moving images, and also the display position of the highlights can be freely moved.

According to the above-described configurations, not only moving image data obtained by converting still image data based on electronic document data, but also text string placement information extracted from the electronic document data is recorded in a recording medium, so when the recording medium is played highlights are displayed as to text strings included in the content obtained by converting still images, and also the display position of the highlights can be freely moved. Accordingly, a recording medium producing method can be realized in which portions of displayed contents which should be noted can be presented.

Also, according to the above-described configurations, when the recording medium is played, highlights are displayed as to text strings included in the contents obtained by converting still images into moving images, and also the display position of the highlights can be freely moved. Accordingly, a recording medium can be realized in which portions of displayed contents which should be noted can be presented.

Further, according to the above-described configurations, highlights are displayed as to text strings included in the contents obtained by converting still images into moving images, and also the display position of the highlights can be freely moved. Accordingly, a player can be realized in which portions of displayed contents which should be noted can be presented.

BRIEF DESCRIPTION OF THE DRAWINGS

FIG. 14 is a schematic drawing illustrating material information within a recording medium;

FIG. 15 is a schematic drawing illustrating chapter/page information stipulated for each material;

FIGS. 16A through 16C are schematic drawings illustrating link information stipulated for each material;

FIG. 18 is a schematic drawing illustrating a screen text row placement table;

FIG. 19 is a schematic drawing illustrating an example of placement of PDF text rows;

FIGS. 20A and 20B are schematic drawings illustrating an example of coordinate conversion;

FIG. 35 is a schematic drawing illustrating the configuration of a screen display (part 1);

FIG. 38 is a flowchart illustrating playing processing procedures;

FIG. 39 is a flowchart illustrating underline rendering control processing procedures (part 1);

FIG. 40 is a flowchart illustrating underline rendering control processing procedures (part 2)

DESCRIPTION OF THE PREFERRED EMBODIMENTS

Preferred embodiments of the invention will be described below. Note that the description will be given in the following order.

1. Embodiment
2. Other Embodiments

1. Embodiment 1-1. Configuration of Disc Producing Device

Figure 1:
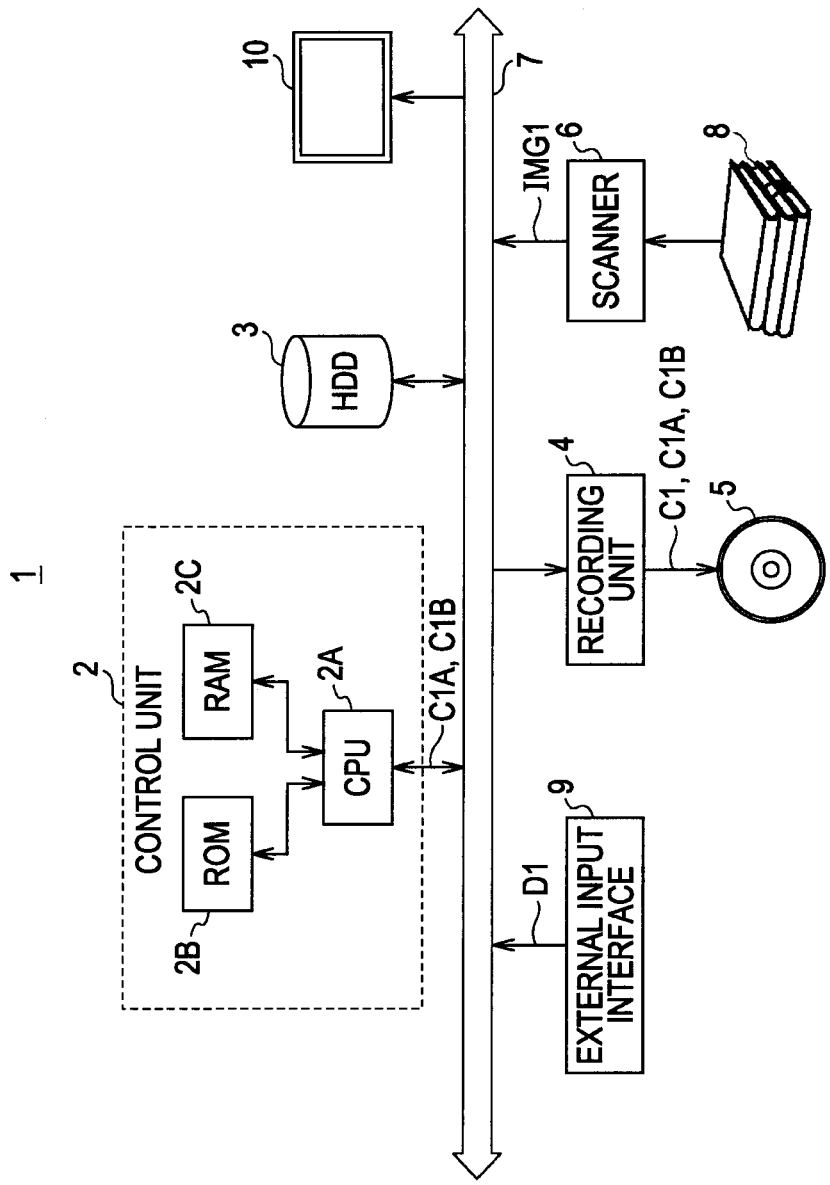
FIG. 1 is a schematic block diagram illustrating the configuration of a disc production device according to an embodiment of the present invention.

In FIG. 1, 1 denotes a disc producing device according to an embodiment of the present invention, and is used to record published material content data C1, which shows the content of printed material 8, onto a Blu-ray disc 5 and create a commercially sold disc (BD-ROM).

The disc producing device 1 is configured such that, in the event of recording published material content data C1, a Blu-ray disc—Java (registered trademark) application (hereinafter referred to as a "BD-J application") is also recorded on a Blu-ray disc 5, and an interactive GUI (Graphical User Interface) display by the BD-J application can be executed.

A BD-J application is an application written with Java (registered trademark) language, which can be connected to a network such as the Internet, and can access a link destination recorded on the Blu-ray disc 5 and download information.

Content of the published material content data C1 recorded on the Blu-ray disc 5 will be described in detail using playing result display example shown in FIGS. 2 through 6 from when the Blu-ray disc 5 is actually played.

Figure 2:
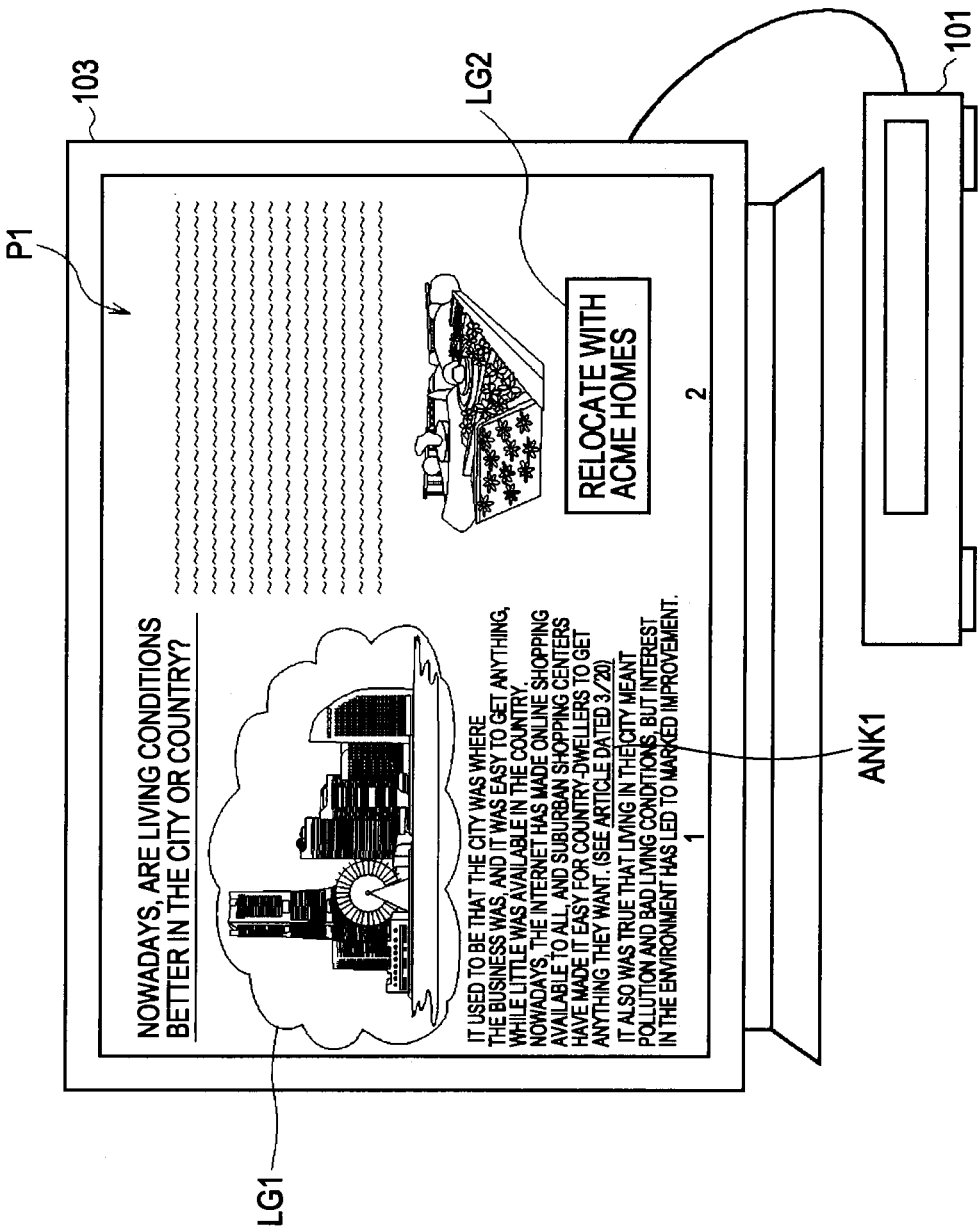
FIG. 2 is a schematic drawing illustrating a two-page spread of a publication content.

FIG. 2 shows a two-page spread P1 in an open state, for example of the first and second pages as the content of the published material content data C1, by a BD recorder 101 playing the Blu-ray disc 5 which is a commercially sold disc.

On the two-page spread P1, a link image LG1 for linking to a moving image, an anchor ANK1 indicated by underlining for linking to another page, and a link image LG2 for linking to another site of the network are provided.

Figure 3:
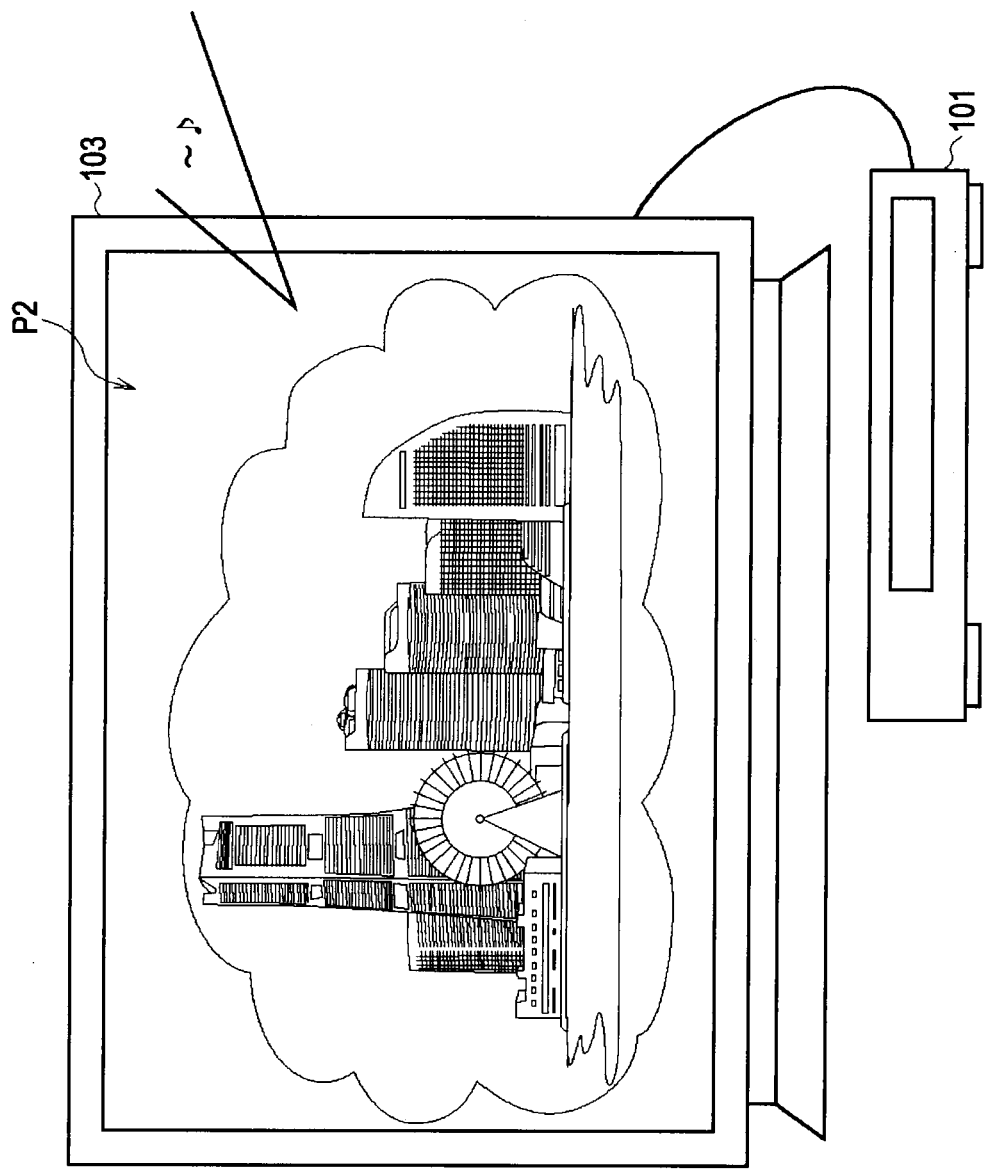
FIG. 3 is a schematic drawing illustrating what is displayed when linking to a moving image in a publication content.

Upon one of the link images LG1 or LG2 or the anchor ANK1 having been selected via a remote controller (unshown) of the BD recorder 101, the BD recorder 101 transitions from the two-page spread P1 to the link destinations defined by the respective links and display on a television receiver 103. Actually, in the case that the image LG1 is selected on the two-page spread P1, the BD recorder 101 transitions to the moving image page P2 of the link destination defined by the link of the link image LG1 and displays, as shown in FIG. 3.

Figure 4:
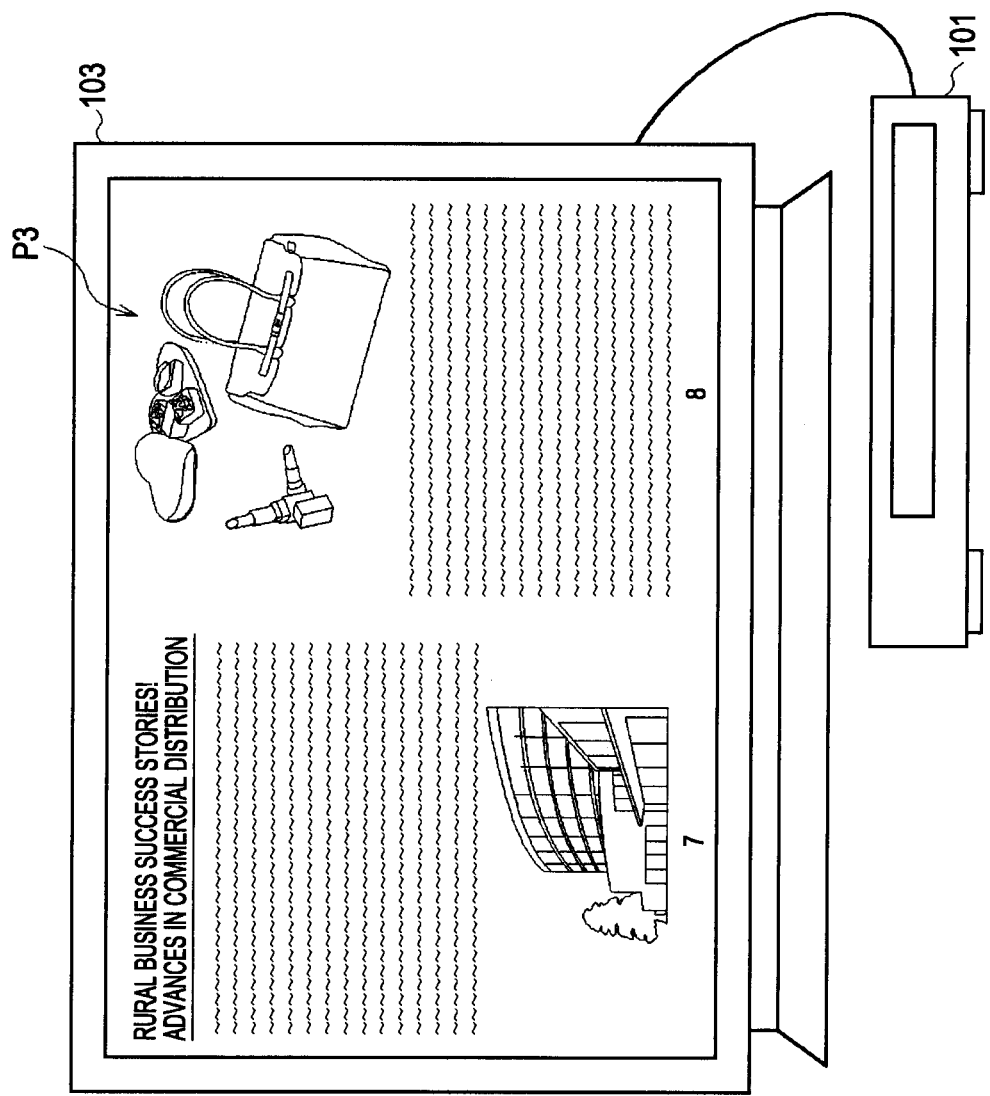
FIG. 4 is a schematic drawing illustrating what is displayed when linking to another page in a publication content.
Figure 5:
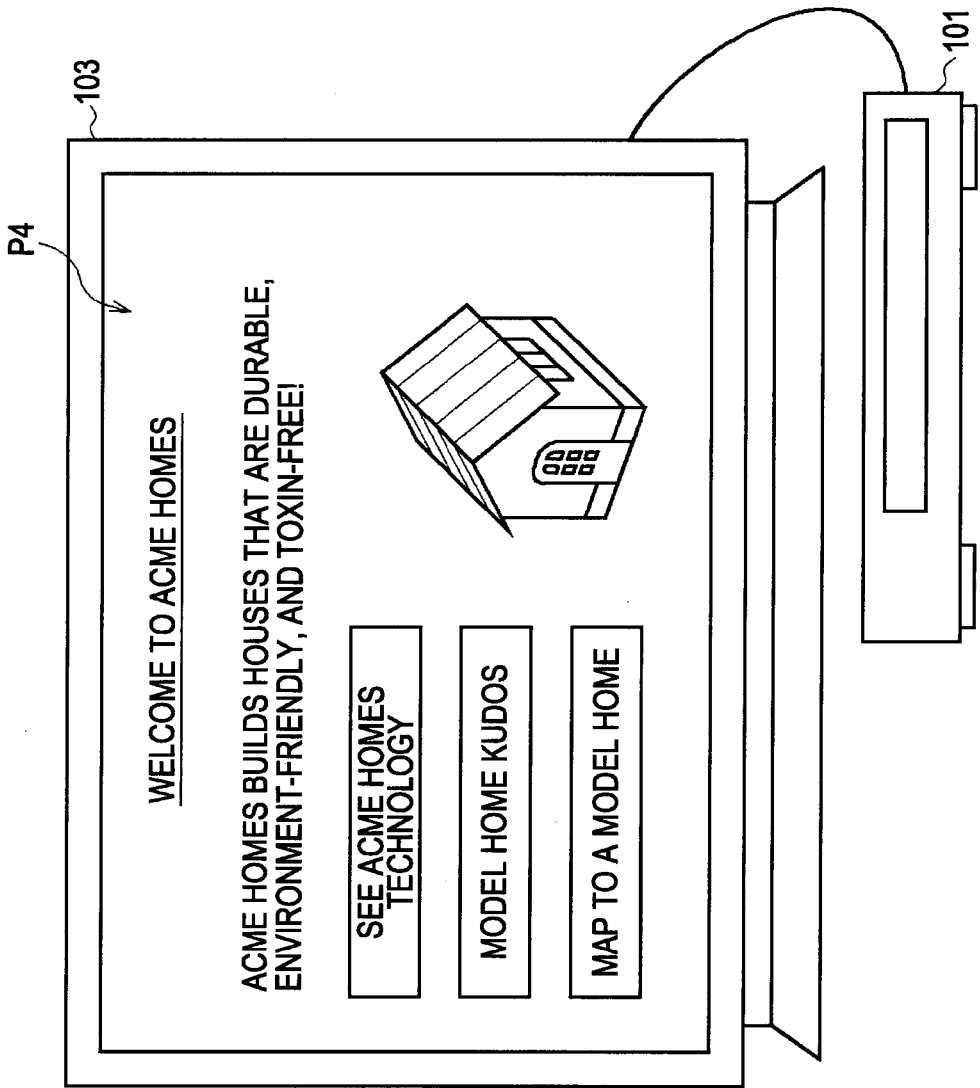
FIG. 5 is a schematic drawing illustrating what is displayed when linking to a site on a network.

Also, in the case that the anchor ANK1 is selected on the two-page spread P1, the BD recorder 101 transitions to another page P3 of the link destination defined by the link of the anchor ANK1 and displays, as shown in FIG. 4.

Further, in the case that the link image LG2 is selected on the two-page spread P1 (FIG. 2), the BD recorder 101 accesses a site on the network defined by the link of the link image LG2, according to the BD-J application, and transitions to the top page P4 of the site from the two-page spread P1 and displays.

Figure 6:
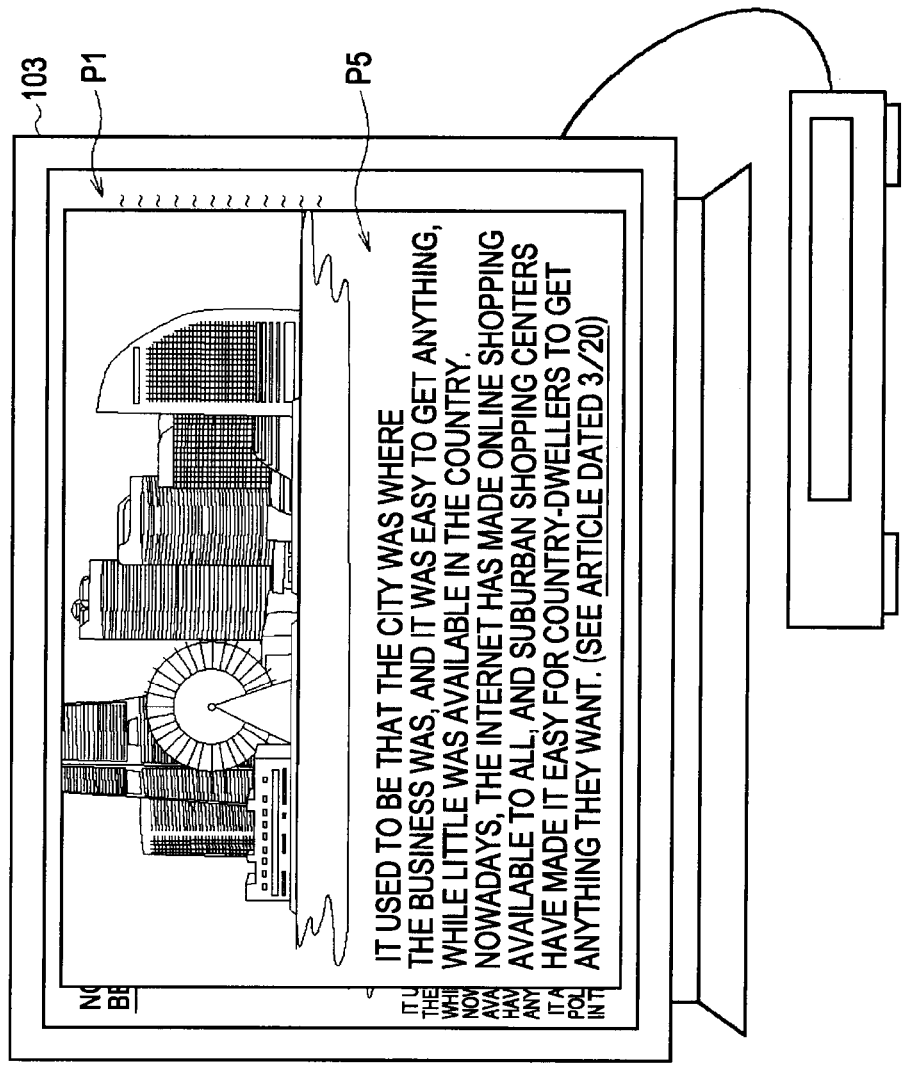
FIG. 6 is a schematic drawing illustrating what is displayed when a portion is enlarged in accordance with zoom operations.

Note that in the case that a zoom operation is performed in the state wherein a cursor is placed on a predetermined area on the two-page spread P1 (FIG. 2), the BD recorder 101 transitions to a enlarged image page P5 defined by the link correlated to a predetermined region where the cursor is placed, and layers this on the two-page spread P1 and displays, as shown in FIG. 6.

Incidentally, in the case that a pressing operation is performed on a next button by a remote controller on the two-page spread P1 (FIG. 2), the BD recorder 101 transitions to the next page which is the second page and displays this, and in the case that a pressing operation is performed on the back button while the second page is being displayed, BD recorder 101 can transition to the prior two-page spread P1 and display.

It goes without saying that, in the case that the fifth page, for example, is specified by the remote controller on the two-page spread P1 (FIG. 2), the BD recorder 101 can transition to the fifth page and display this.

Actually, with the disc producing device 1 (FIG. 1), a control unit 2 connected to a system bus 7 is made up of a CPU (Central Processing Unit) 2A, ROM (Read Only Memory) 2B, and RAM (Random Access Memory) 2C.

The CPU 2A of the control unit 2 controls the various parts to execute basic processing and so forth as the disc producing device 1 according to basic programs and application programs read from the ROM 2B or hard disk drive 3 and run on the RAM 2C.

Figure 7:
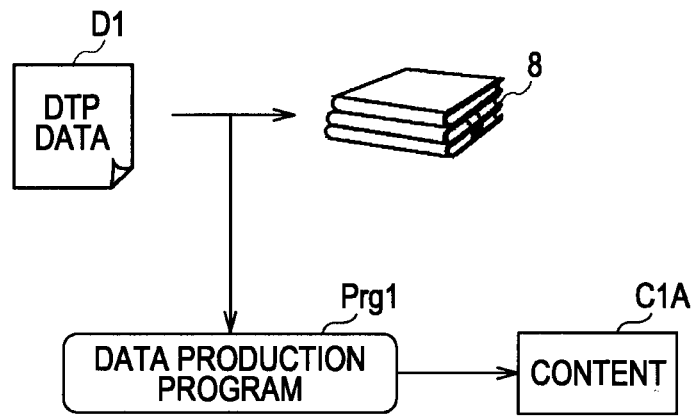
FIG. 7 is a schematic drawing illustrating a content data production process (part 1) of content data to be stored in a Blu-ray disc.

As shown in FIG. 7, DTP data D1 created using DTP (DeskTop Publishing) software by a publisher or the like is normally provided to a printing company, and becomes printed material 8 such as books, magazines, newspapers, flyers, comic books, and so forth. Actually, the CPU 2A of the control unit 2 takes in the DTP data D1 via an external input interface 9, and temporarily stores this on the hard disk drive 3.

Subsequently, the CPU 2A of the control unit 2 converts the DPT data D1 to the published material content data C1A, based on predetermined conversion conditions and various parameters specified by the producer, according to the data control program Prg 1 which is an application program.

The CPU 2A of the control unit 2 (FIG. 1) can record the published material content data C1A onto a Blu-ray disc BD with the recording unit. At this time the CPU 2A of the control unit 2 enables the producer to visually confirm the processing process via a monitor.

Incidentally, the DPT data D1 exists, not only in the case of data unique to DPT software but also in the case of general-use data such as PDF (Portable Document Format).

Figure 8:
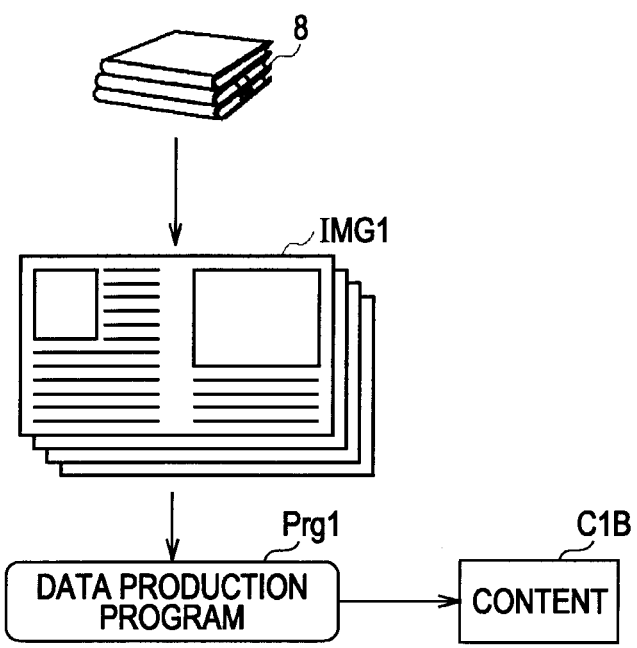
FIG. 8 is a schematic drawing illustrating a content data production process (part 2) of content data to be stored in a Blu-ray disc.

On the other hand, as shown in FIG. 8, in the case that only the printed material 8 exists without the DPT data D1 existing, the CPU 2A of the control unit 2 stores the still image data IMG 1 obtained by capturing the manuscript of the printed material 8 via a scanner 6 (FIG. 1) temporarily onto a hard disk drive 3.

Subsequently, the CPU 2A of the control unit 2 converts the still image data IMG 1 to published material content data C1B based on predetermined conversion conditions and various parameters specified by the producer according to the data control program Prg1.

The CPU 2A (FIG. 1) of the control unit 2 records the published material content data C1B onto the Blu-ray disc 5 with the recording unit 4, whereby the processing process at the time thereof can be visually confirmed by the producer by a monitor 10.

1-2. Data Conversion Processing Sequence

As described above, the data conversion processing sequence to convert the content of the printed material 8 onto published content data C1 (C1A and C1B) to be recorded on the Blu-ray disc 5 will be described using the flowchart shown in FIG. 9.

The CPU 2A of the control unit 2 enters the starting step of a routine RT1 and advances to the next step SP1, reads in the DPT data D1 that has been taken in via the external input interface 9 or the still image data IMG 1 that has been taken in via a scanner 6 as input manuscript data, and advances to the next step SP2.

In step SP2 the CPU 2A confirms the predetermined conversion conditions specified from the producer and various types of parameters, and advances to the next step SP3.

In step SP3 the CPU 2A determines whether or not the input manuscript data is the still image data IMG 1. Upon negative results being obtained, this indicates that the input manuscript data is not the still image IMG 1 itself but is the DTP data D1, and at this time the CPU 2A advances to the next step SP4.

In step SP4 the CPU 2A decodes the DPT data D1, and crops out the still image data IMG 1 in double-page spread increments made up of left and right pages of the published material content data C1. Further, the CPU 2A assigns new pages numbers of the two-page spread increments used as page transitioning control information and underline rendering control information (to be described later) as to the cropped out still image data IMG 1. That is to say, the entire two-page spread P1 in the state of opening to the first page one and page two of the published content data c1 is assigned page No. "1" as the new page No.

Next the CPU 2A advances to the next screen text row placement table creating sub-routine SRT1. Hereinafter, this will be referred to as "sub-routine SRT1".

In the sub-routine SRT1, the CPU 2A extracts text row placement information expressing the placement of text rows and so forth from the DTP data D1 at the time of decoding in step SP4, and after creating the screen text row placement table TBL (to be described later) based on the text string placement information, moves to the step SP6.

Upon positive results being obtained in step SP3, on the other hand, this indicates that the input manuscript data is the still image data IMG 1 itself, and the CPU 2A at this time advances to the next step SP5.

In step SP5 the CPU 2A assigns new page Nos. in two-page spread increments to the still image data IMG 1 with the sequence specified by the producer, similar to step SP4, and advances to the next step SP6.

In step SP6 the CPU 2A generates enlarged still image data corresponding to the enlarged image page P5 (FIG. 6) by enlarging a predetermined zoom region preset in the still image data IMG 1 of the newly assigned page Nos., by a predetermined magnification rate, and advances to the next step SP7 and ends the processing.

Thus, the CPU 2A of the control unit 2 can convert the input manuscript data into still image data IMG 1 assigned with new page Nos. and into the published content data C1 (C1A and C1B) made up of the enlarged still image data.

1-3. Encryption Processing with Consideration for Copyright Protection

Now, in the case that the still image data and enlarged still image data of the published content data C1 (C1A and C1B) described above are recorded as is on a Blu-ray disc 5, the following problems occur.

For example, upon the Blu-ray disc 5 being played with a personal computer, the still image data and enlarged still image data are readily taken in to the hard disk of the personal computer because these are not encrypted, due to the Blu-ray disc standards.

In particular, with the BD-ROM format of the Blu-ray disc 5, protection measures by encryption only for the picture audio stream of the moving image are standardized, and there is no structure for the still image data.

Therefore, the still image data and enlarged still image data recorded on the Blu-ray disc 5 can be copied by a malicious user in an unauthorized manner, so copyrights are not protected.

Incidentally, the encryption processing can be written in the BD-J application recorded on the Blu-ray disc 5, but particularly with a BD-ROM, processing content is decompiled with Java (registered trademark) and can be readily made visible, whereby the content of the encryption processing can be decrypted and is therefore useless.

Figure 10:
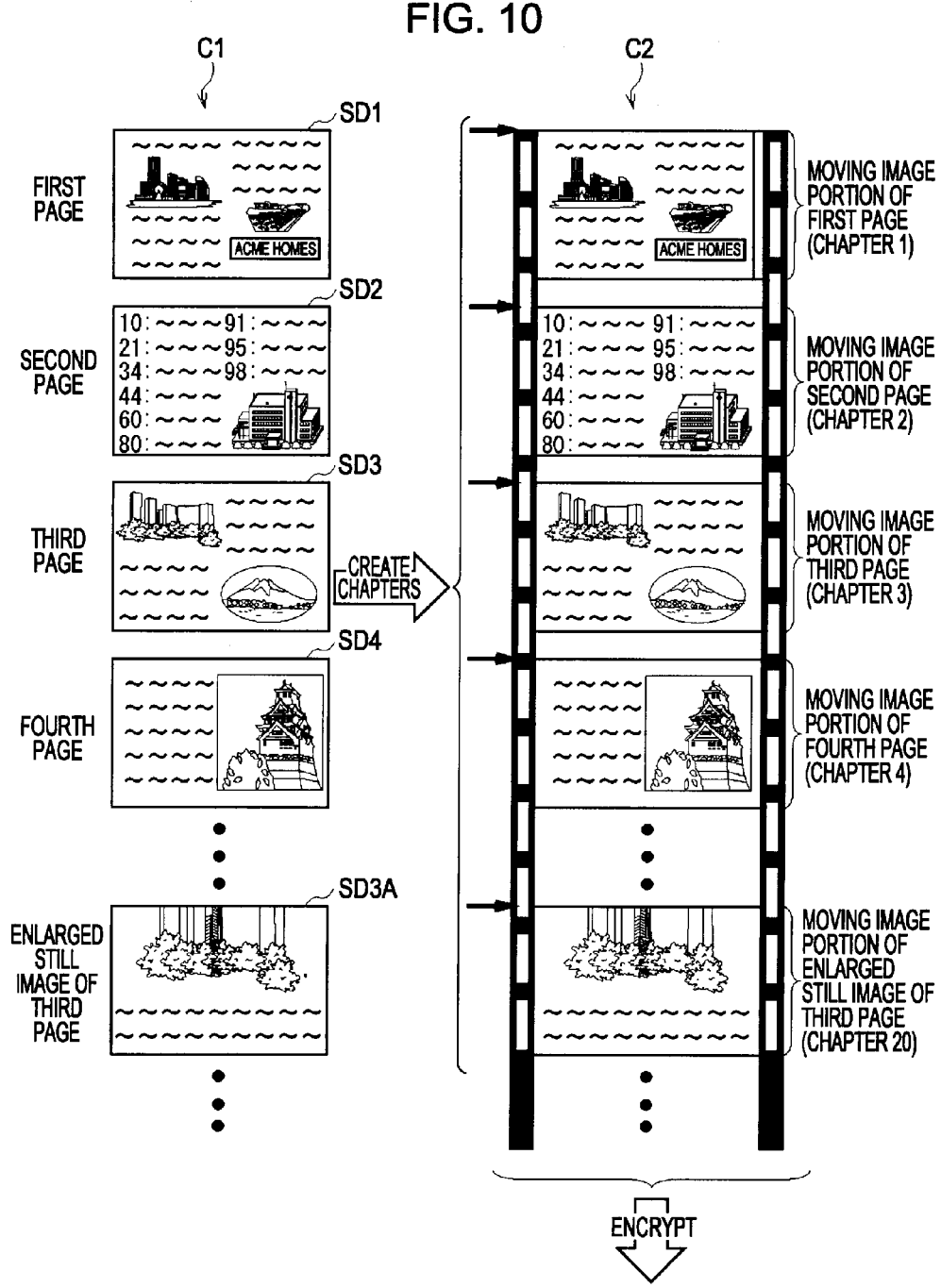
FIG. 10 is a schematic drawing for describing an example wherein all still images are converted into a moving image and encrypted.

1-3-1. Case of Converting All Still Images into Moving Images and Encrypting A disc producing device 1 may be conceived wherein, as shown in FIG. 10, from the still image data SD1 on one published material content data C1 in sequence, all of the still images are converted to moving image data of which the frame frequency is 60 Hz in order to display in sequence every five seconds, for example, and upon being encrypted to AACS (Advanced Access Content System) for example, are recorded on the Blu-ray disc 5.

Actually, for the still image data SD1 of the first page of the published material content data C1, the CPU 2A of the control unit 2 generates a total of 300 frames or so of the still image data SD1 in order to display the still image data moving images every five seconds, and encrypts this as a moving image portion of a chapter 1 corresponding to the first page.

Similarly, for the still image data SD2 of the second page of the published material content data C1, the CPU 2A of the control unit 2 generates a total of 300 frames or so of the still image data SD2 in order to display the still image data moving images every five seconds, and encrypts this as a moving image portion of a chapter 2 corresponding to the second page.

Thus, the CPU 2A of the control unit 2 generates a total of 300 frames or so of the still image data SD3, SD4, and so forth for the third page, fourth page, and thereinafter of the published material content data C1, encrypts this as moving image portions of chapter 3 and chapter 4 corresponding to the third page and forth page and subsequent pages.

Note that for the enlarged still image data SD3A of the third page for example of the published material content data C1, the CPU 2A of the control unit 2 displays the enlarged still image data SD3A as moving images every five seconds, thereby generating a total of 300 frames or so of the enlarged still image data SD3A, and encrypts this as a moving image portion of a chapter 10, for example, corresponding to the enlarged still images on the third page.

Thus, the CPU 2A of the control unit 2 converts the still image data SD1 through SD4 and the like, SD3A and the like, which are all of the pages of the published material content data C1, into moving image data and encrypts this, whereby the published material content data C1 can be converted into new published material content data C2 made up of moving image data.

The CPU 2A of the control unit 2 records the new published material content data C2 after the moving image conversion onto the Blu-ray disc 5, whereby all pages can be recorded in a state of being copyright protected, while retaining none of the format of the still image data.

Figure 11:
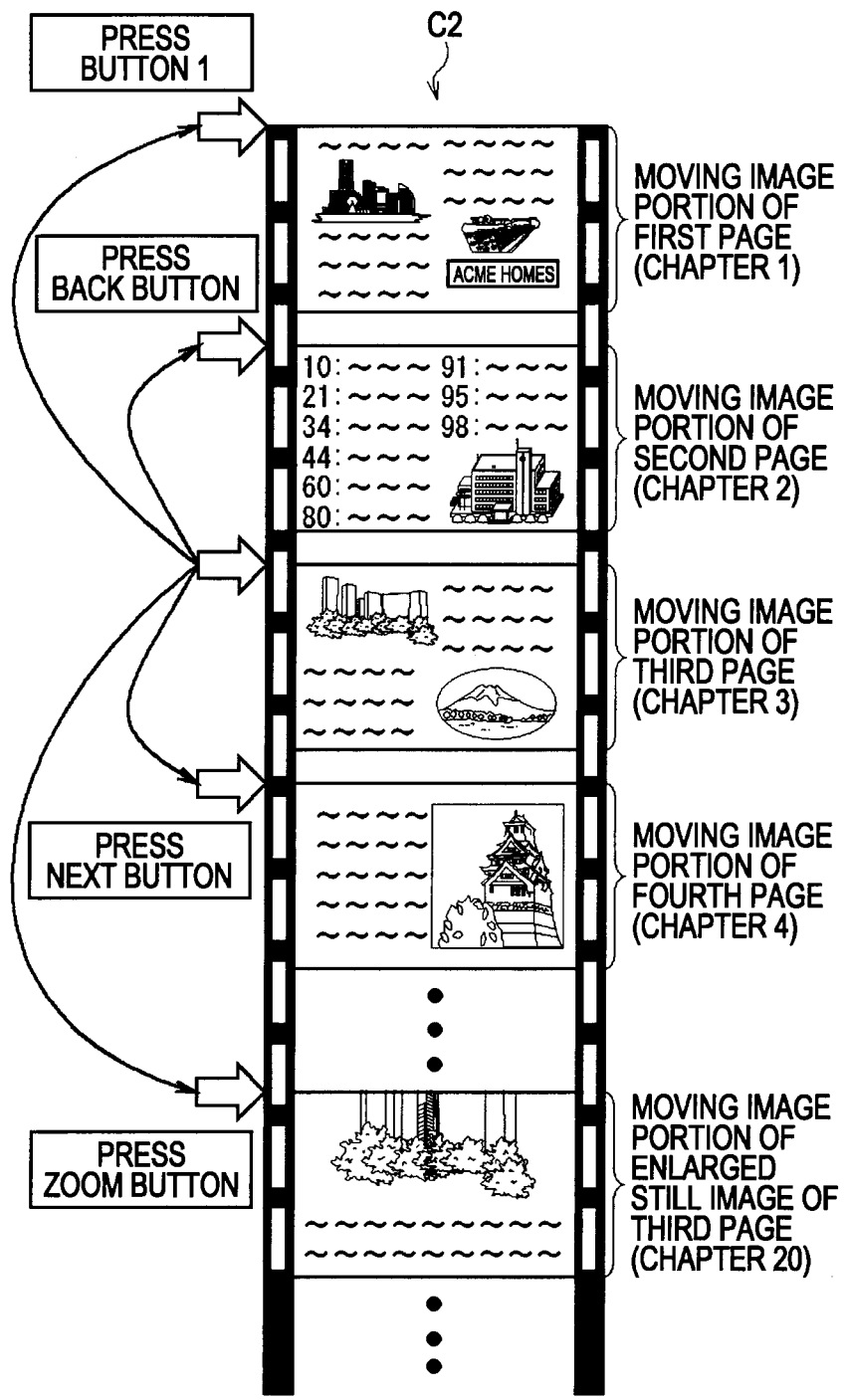
FIG. 11 is a schematic drawing illustrating an example of page transition while a third page is being displayed.

Next, page transition performed by a BD recorder 101 (FIG. 2) when the Blu-ray disc 5 is played by the BD recorder 101 as shown in FIG. 11 will be described.

The BD recorder 101 plays the Blu-ray disc 5, and upon a pressing operation being performed on the next button via the remote controller (unshown) during display on the television receiver 103 of the third page moving image portion (chapter 3), for example, making up the new published material content data C2, the BD recorder starts playing the moving images from the beginning of the fourth page moving image portion (chapter 4).

Also, upon a pressing operation being performed on the back button via the remote controller (unshown) during display on the television receiver 103 of the third page moving image portion (chapter 3), the BD recorder 101 starts playing the moving images from the beginning of the second page moving image portion (chapter 2).

Further, upon a pressing operation being performed on a "1" button for specifying page 1 via the remote controller (unshown) during display on the television receiver 103 of the third page moving image portion (chapter 3), the BD recorder starts playing the moving images from the beginning of the first page moving image portion (chapter 1).

Further, upon a pressing operation being performed on the zoom button via the remote controller (unshown) during display on the television receiver 103 of the third page moving image portion (chapter 3), the BD recorder starts playing the moving images from the beginning of the enlarged still image moving image portion (chapter 20) on the already created third page.

Incidentally, the BD recorded 101 starts playing the moving images at this time, but repeatedly plays the 300 frames, all having the same content, with a frame frequency of 60 Hz, whereby although these are displayed as a moving image, but to the eye of the user, this can be visually confirmed as a still image.

Note that if the still image data SD1 through SD4 and so forth, and SD3A and so forth, for all the pages of the published content data C1 are converted to moving image data for the purpose of encryption, the data capacity to be stored on the Blu-ray disc 5 becomes huge, and all the data may not be able to be stored therein.

Figure 12:
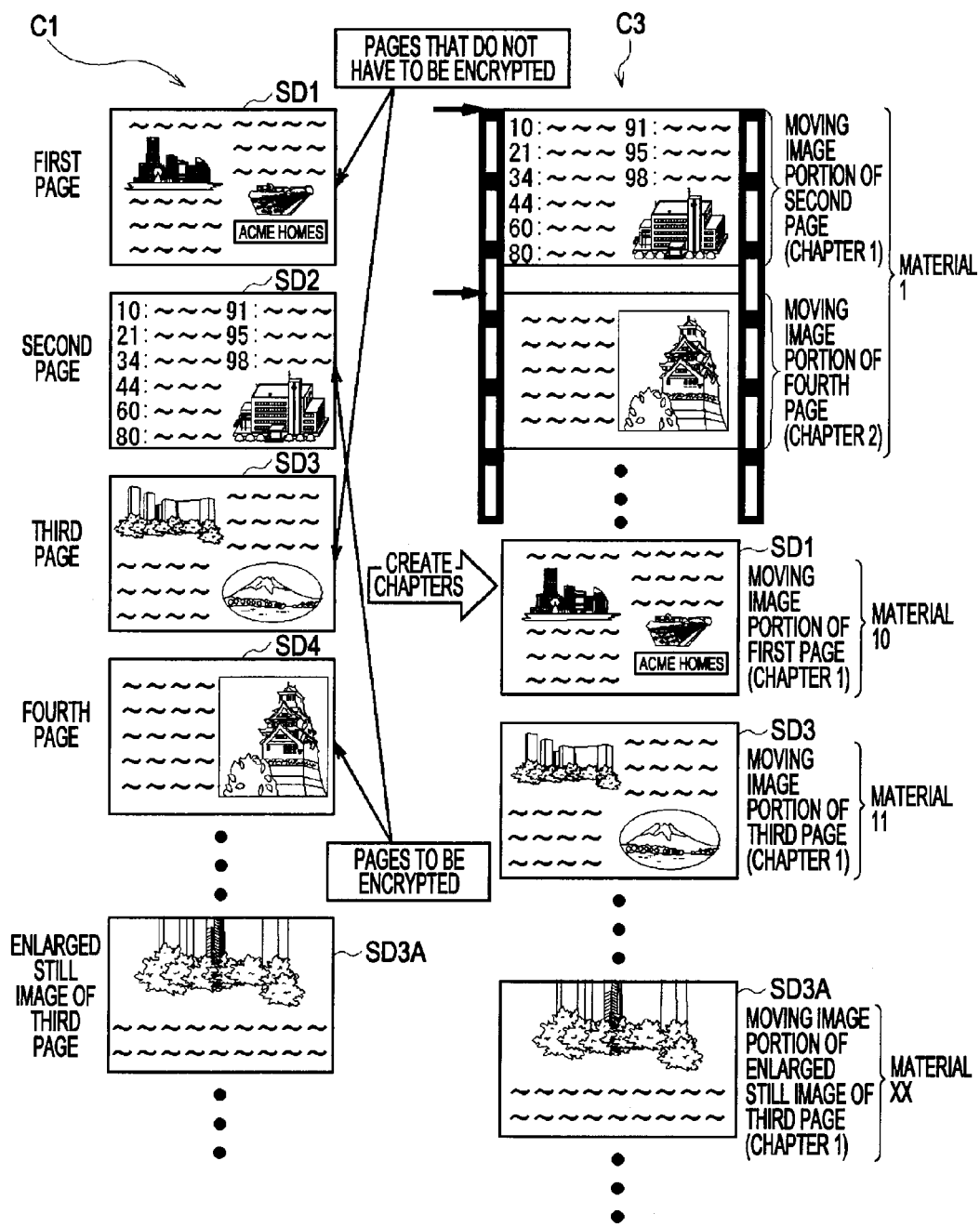
FIG. 12 is a schematic drawing for describing an example wherein a portion of still images are converted into a moving image and encrypted.

1-3-2. Case of Converting a Portion of Still Images into Moving Images and Encrypting Thus, as shown in FIG. 12, with the CPU 2A of the control unit 2, of all the pages in the published material content data C1, only the still image data SD4 of the fourth page and the still image data SD2 of the second page for example are selected to be encrypted, according to instructions from the producer, and converted into moving image data.

That is to say, the CPU 2A of the control unit 2 does not encrypt or convert into moving image data the still image data SD1 of the first page, the still image data SD3 of the third page, or the enlarged still image data SD3A of the third page, which are other than the second page and fourth page of the published material content data C1.

Thus the CPU 2A of the control unit 2 can break out the published material content data C1 into a material 1 made up of the moving image portions of the second page and fourth page, and so forth, a material 10 made up of the still images of the first page, material 11 made up of the still images of the third page, and so forth, and a material XX made up of the enlarged still images of the third page, and so forth.

The material 1 is made up of the moving image portions of the second page and the moving image portions of the fourth page, whereby the CPU 2A of the control unit 2 sets the moving image portion of the second page as chapter 1, and sets the moving portion of the fourth page as chapter 2.

Note that with the material 10 made up of the still images of the first page, only the still images of the first page exist in the material 10, whereby the CPU 2A of the control unit 2 sets this as chapter 1. The CPU 2A of the control unit 2 also sets the material 11 made up of the still images of the third page and the material XX made up of the enlarged still images of the third page similarly as chapter 1.

That is to say, with the new published material content data C3, the moving image portions and the still image portions can be mixed together, whereby the CPU 2A of the control unit 2 breaks out the published content data C1 into new published content data C3 made up of the material 1, material 10, material 11, material XX, and so forth, and renumbers the chapter numbers from "1" in the material increments thereof.

Figure 13:
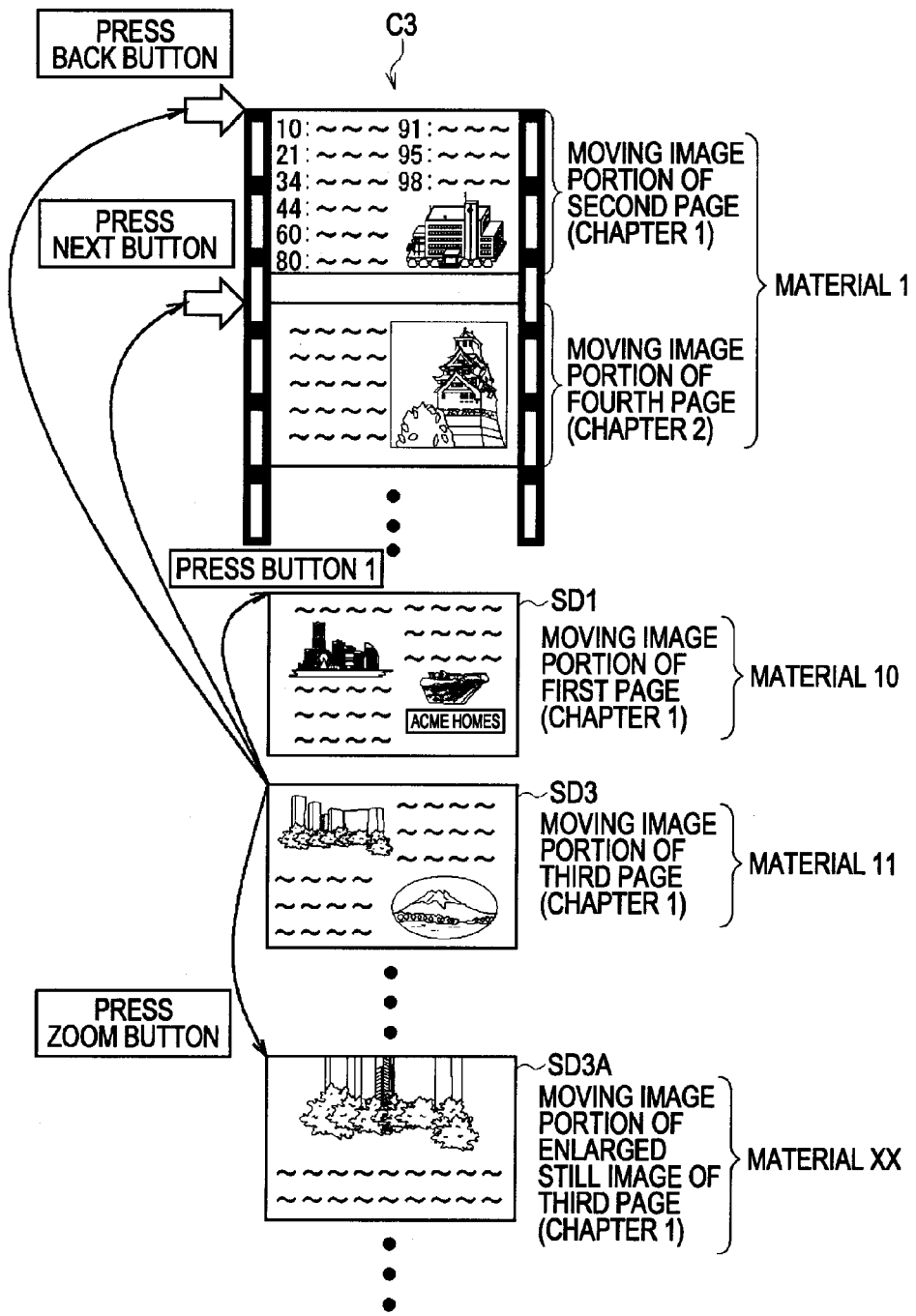
FIG. 13 is a schematic drawing illustrating an example of page transition while a third page is being displayed in accordance with a button operation.

Next, page transition when the Blu-ray disc 5, with the new published content data C3 made up of such material 1 and so forth, material 10, material 11, material XX and so forth recorded therein, is played by the BD recorder 101 (FIG. 2) as shown in FIG. 13 will be described.

The BD recorder 101 plays the Blu-ray disc 5, and upon a pressing operation being performed on the next button via the remote controller (unshown) during display on the television receiver 103 of the third page still images (chapter 1) of the material 11, for example, the BD recorder starts playing the moving images from the beginning of the fourth page moving images (chapter 1) of the material 1.

Also, upon a pressing operation being performed on the back button via the remote controller (unshown) during display on the television receiver 103 of the third page moving images of the material 11, the BD recorder 101 starts playing the moving images from the beginning of the second page moving image portion (chapter 1) of the material 1.

Incidentally, the BD recorder 101 starts playing the moving images at this time from the beginning of the moving image portion of the second page of the material 1 (chapter 1) and the moving image portion of the fourth page (chapter 2), but repeatedly plays the 300 frames, all having the same content, with a frame frequency of 60 Hz, whereby to the eye of the user, this can be visually confirmed as still images, and not moving images.

Further, upon a pressing operation being performed on the "1" button for specifying page 1 via the remote controller (unshown) during display on the television receiver 103 of the third page still images of the material 11, the BD recorder 101 starts playing the still images from the first page still images (chapter 1).

Further, upon a pressing operation being performed on the zoom button via the remote controller (unshown) during display on the television receiver 103 of the third page still images of the material 11, the BD recorder 101 starts playing the still images as to the third page enlarged still images of the material XX created beforehand.

Thus, in the case of transitioning between pages with the new published content data C3, the BD recorder 101 does not use the material numbers such as material 1 and so forth, material 10, material 11 and so forth, material XX and so forth, but transitions between the pages based on the page Nos. on the original published material content data C1.

Thus, with the BD recorder 101, the pages of the still images and moving image portions of the published material content data C3 can be switched according to the sequence of the original published content data C1.

1-4. Page Transition Control Information

The CPU 2A of the control unit 2 of the disc producing device 1 has to generate beforehand the page transition control information for freely transitioning between the chapter 1, chapter 2, and so forth of the material 1, the chapter 1 of the material 10, chapter 1 of the material 11, and so forth, and chapter 1 of the material XX and so forth, and to record this on the Blu-ray disc 5.

The page transition control information thereof is made up of material information within the recording medium, chapter/page information standardized by material, and link information defined for each material.

1-4-1. Material Information

As shown in FIG. 14, the material information Mi within the recording medium which is the Blu-ray disc 5, a storage location is written corresponding to each of the material numbers such as material 1 and so forth, and material XX and so forth.

For example, for the material information Mi, the moving image data of the material 1 (FIG. 12) denoted by the material number "1" (the moving image portion of the second page and fourth page) is stored in the region of the Blu-ray disc 5 indicated as "/BDMV/STREAM/00001.m2ts". For the material information Mi, the moving image data of the material 2 (unshown) denoted by the material number "2" is stored in the region of the Blu-ray disc 5 indicated as "/BDMV/STREAM/00002.m2ts".

For the material information Mi, an HTML (Hyper Text Markup Language) file for example, of the material 4 denoted by the material number "4" is shown to exist at the URL (Uniform Resource Locator) shown as http://www.absdb-cdaed.com/Index.html on the network.

Also, for the material information Mi, the still image of the first page (chapter 1) of the material 10 (FIG. 12) shown with the material number "10" is stored in the region indicated as "/BDMV/JAR/picture/page001" on the Blu-ray disc 5, and the still image of the third page (chapter 1) of the material 11 (FIG. 12) shown with the material number "11" is stored in the region indicated as "/BDMV/JAR/picture/page003" on the Blu-ray disc 5.

Further, for the material information Mi, the enlarged still image of the third page (chapter 1) of the material XX (FIG. 12) shown with the material number "XX" is stored in the region indicated as "/BDMV/JAR/picture/page003zoom01" on the Blu-ray disc 5.

Thus, with the BD recorder 101 which is on the playing side of the Blu-ray disc 5, the storage locations of the material 1 and so forth, the material 10, material 11 and so forth, and the material XX and so forth can be confirmed, the moving image data and still image data of the material 1 and so forth, the material 10, material 11 and so forth, and the material XX and so forth can be obtained and output to the television receiver 103.

1-4-2. Chapter/Page Information

Also, as shown in FIG. 15, for the chapter/page information CPi that is standardized for each material, the three items of "chapter number", "corresponding page No.", and "whether the page entrance" are correlated to the material 1 and so forth, material 10, material 11 and so forth, and material XX and so forth, corresponding to the material numbers "1" through "XX".

With the material 1 for the material number "1" (FIG. 12), the page No. corresponding to "chapter number: 1" is the moving image portion of the second page (chapter 1) indicated by "corresponding page No.: 2", and "whether the page entrance: true" indicates that this is the entrance to the second page and that this is not an enlarged still image.

Also, with the material 1 for the material number "1" (FIG. 12), the page No. corresponding to "chapter number: 2" is the moving image portion of the fourth page (chapter 2) indicated by "corresponding page No.: 2", and "whether the page entrance: true" indicates that this is the entrance to the fourth page and that this is not an enlarged still image.

Further, with the material 10 for the material number "10" (FIG. 12), the page No. corresponding to "chapter number: 1" is the still image portion of the first page (chapter 1) indicated by "corresponding page No.: 1", and "whether the page entrance: true" indicates that this is the entrance to the first page and that this is not an enlarged still image.

Further, with the material 11 for the material number "11" (FIG. 12), the page No. corresponding to "chapter number: 1" is the still image portion of the third page (chapter 1) indicated by "corresponding page No.: 3", and "whether the page entrance: true" indicates that this is the entrance to the third page and that this is not an enlarged still image.

Further, with the material XX for the material number "XX" (FIG. 12), the page No. corresponding to "chapter number: 1" is the still image portion of the third page (chapter 1) indicated by "corresponding page No.: 3", and "whether the page entrance: false" indicates that this is not the entrance to the third page and that this is an enlarged still image.

Thus, for the chapter/page information CPi that is standardized for each material, regardless of still image or moving image, chapter numbers are newly appended in page increments of still image data SD1 through SD4 and so forth, SD3A and so forth, which make up the original published material content data C1, and the corresponding page Nos. corresponding to the chapter numbers thereof, as well as whether or not these apply to the page entrances, are standardized.

1-4-3. Link Information

Further, as shown in FIGS. 16A through 16C, the link information Li defined for each material is made up of link source information LS corresponding to "link number" and a link destination information LG.

In particular, for the link information Li, "link numbers" assigned uniformly within the material, "chapter numbers" existing of the links, the "x-coordinates", "y-coordinates", "width", and "height" of the links, and the "material number of transition destination" and "page No. of transition destination" in the event the link thereof is selected, are shown.

Now, with the material 1 for the material number "1" (FIG. 12), link source information LS1 and link destination LG1 are correlated for each "link number", and with the material 10 for the material number "10" (FIG. 12), link source information LS10 and link destination information LG10 are correlated for each "link number".

Similarly, with the material 11 for the material number "11" (FIG. 12), link source information LS11 and link destination information LG11 are correlated to "link number: 1". Note that for the material XX for the material number "XX" (FIG. 12), the description thereof is omitted as appropriate.

For example, with the "link number: 1" of the material 1 for the material number "11" (FIG. 12), when a region shown as "x-coordinate: 310", "y-coordinate: 130", "width: 130", "height: 30" of the second page corresponding to the "chapter number: 1" serving as link destination information LG1 is selected by a user via a remote controller (unshown), the link destination information LG1 is tied so as to link to "transition destination material number: 5" and "transition destination page No.: 10".

Also, with the "link number: 2" of the material 1 for the material number "1" (FIG. 12), when a region shown as "x-coordinate: 230", "y-coordinate: 20", "width: 150", "height: 80" of the fourth page corresponding to the "chapter number: 2" serving as link source information LS1 is selected by a user via a remote controller (unshown), the link destination information LG1 is tied so as to link to "transition destination material number: 6" and "transition destination page No.: 12".

For example, with the "link number: 1" of the material 10 for the material number "10" (FIG. 12), when a region shown as "x-coordinate: 250", "y-coordinate: 150", "width: 150", "height: 50" of the first page corresponding to the "chapter number: 1" serving as link source information LS10 is selected by a user via a remote controller (unshown), the link destination information LG10 is tied so as to link to "transition destination material number: 13" and "transition destination page No.: 15".

Also, with the "link number: 2" of the material 10 for the material number "10" (FIG. 12), when a region shown as "x-coordinate: 50", "y-coordinate: 200", "width: 30", "height: 20" of the first page corresponding to the "chapter number: 1" serving as link source information LS10 is selected by a user via a remote controller (unshown), the link destination information LG10 is tied so as to link to "transition destination material number: XX" and "transition destination page No.: 3".

Further, with the "link number: 3" of the material 10 for the material number "10" (FIG. 12), when a region shown as "x-coordinate: 250", "y-coordinate: 300", "width: 100", "height: 30" of the first page corresponding to the "chapter number: 1" serving as link source information LS10 is selected by a user via a remote controller (unshown), the link destination information LG10 is tied so as to link to "transition destination material number: 4" and "transition destination page No.: -".

Now, the reason that "transition destination page No.: -" does not list the page No. is that the material 4 shown by the "transition destination material number: 4" is a page on a site on the network.

For example, with the "link number: 1" of the material 11 for the material number "11" (FIG. 12), when a region shown as "x-coordinate: 40", "y-coordinate: 280", "width: 220", "height: 70" of the third page corresponding to the "chapter number: 1" serving as link source information LS10 is selected by a user via a remote controller (unshown), the link destination information LG11 is tied so as to link to "transition destination material number: 19" and "transition destination page No.: 22".

Thus with the link information Li standardized for each material, the link destination according to the region in the page corresponding to the chapter number is identified by the material number and page No. of the transition destination.

Accordingly, by recording on a Blu-ray disc 5 the page transition control information made up of the material information Mi within the recording medium, chapter/page information CPi that is standardized by material, and the link information Li defined for each material, page transitions can be freely made regardless of the new published content data C3 being still images or moving images at the time of playing the Blu-ray disc 5.

1-5. Screen Text Row Placement Table Creating Processing Procedures

Next, a screen text row placement table creating processing procedure of a sub-routine SRT1 in the data conversion processing procedures of the routine RT1 shown in FIG. 9 will be described in detail with reference to the flowchart in FIG. 17.

First, before describing the flowchart of the sub-routine SRT1, a BD-J application and screen text row placement table TBL according to the present embodiment will be described. The BD-J application recorded on the Blu-ray disc 5 is programmed such that, in the event that the DTP data D1 including text is converted to captured moving image data as still image data IMG1 and displayed on the television receiver 103, an underline can be displayed under one row worth of text (hereinafter, this will be referred to as a "screen text row").

Note that a case wherein the DTP data D1 is PDF data will be described below. Also below, the text row included in the PDF data will be referred to as "PDF text row PL".

Also, with the BD recorder 101 which is on the playing side of the Blu-ray disc 5 wherein the BD-J application is recorded, the underline displayed on the screen text row can be moved to a screen text row at another position by user operation or automatically.

Therefore, the CPU 2A of the control unit 2 has to generate beforehand a screen text row placement table TBL to serve as an underline rendering control information for freely moving the underline of the screen text row displayed on the television receiver 103 to a screen text row at another position, and record this together with the BD-J application on the Blu-ray disc 5.

The flowchart of the sub-routine SRT1 will be described below. Actually the CPU 2A in the step SP11 above initializes the value of all row No. IDs corresponding to the rows TR1 through TRn of the screen text row placement table TBL shown in FIG. 18 to "0", and advances to the next step SP12.

Now, the screen text row placement table TBL (FIG. 18) will be described. The screen text row placement table TBL is made up of multiple rows TR1 through TRn, and unique identifying information appended for each row correlated to all of the PDF text rows PL included in the PDF data (hereinafter referred to as "row No. ID") is defined for the respective rows TR. Note that the value of the row No. 1 does not necessarily have the value of the PDF text row PL within the PDF data appended, and a unique value is appended.

Also, for each row No. ID, a page No. PG, screen text position x-coordinate DIS_CX, screen text position y-coordinate DIS_CY, screen text string width DIS_W, up movement row No. U_ID, down movement row No. D_ID, left movement row No. L_ID, right movement number R_ID, and audio saving location AS are correlated to the screen text row placement table TBL.

Now, FIG. 19 shows the PDF screen PD wherein the PDF text row PL1 of the first row within the PDF data is displayed. On the PDF screen PD, multiple PDF text rows PL1, PL2 and so forth, PL10 and so forth, and PL14 and so forth are placed, and each PDF text row PL has a text string that is a length worth one row. Also on the PDF screen PD, for example a sentence "The production required . . . " is written so as to follow a sequence such as PDF text row PL1, PL2, PL3, and so forth.

Now, the coordinate value in the coordinate system of the PDF data and the coordinate value in the coordinate system in the case of converting the PDF data to captured moving image data as still image data IMG1 and displaying on the television receiver 103 are different from one another.

Note that hereinafter, the coordinate system of the PDF data will be called the PDF coordinate system, and the coordinate system in the event of displaying on the television receiver 103 will be called the screen coordinate system. Various types of information used with the screen coordinate system are defined in the screen text row placement table TBL.

In step SP12 (FIG. 17) the CPU 2A obtains text string placement information (described later) from a text status operator or text placement operator of the stream wherein the text is stored, or from font object information and so forth used to display the PDF text row PL, of the page object in the PDF data for the first row of PDF text row PL1 of the PDF data.

Further, the CPU 2A obtains the page size (described later) of the two-page spread of the PDF data from Media Box information indicating printed region of a page object of the page data.

Next the CPU 2A sets the page No. newly assigned in step SP4 of the data conversion processing procedure (FIG. 9) for each two-page spread as a value of the page No. PG corresponding to the row TR1 of the screen text row placement table TBL, as to the page shown by the page No. of the PDF data included in the obtained text string placement information, and moves to the next coordinate conversion sub-routine SRT2.

Next, the coordinate conversion processing procedures to convert the coordinate values of the PDF coordinate system to the coordinate values of the screen coordinate system, which is executed in the sub-routine SRT2 in the screen text row placement table creating processing procedures of the sub-routine SRT1 shown in FIG. 17, will be described with reference to the flowcharts shown in FIGS. 21 and 22, and also FIGS. 20, 23, and 24.

First, the PDF coordinate system and the screen coordinate system will be described. FIG. 20A shows a PDF screen PD1 of the two-page spread corresponding to the PDF data, and FIG. 20B shows a still image screen GD1 wherein the PDF data has been cropped out as still image data IMG1 and displayed on the television receiver 103.

Now, the PDF screen PD1 in FIG. 20A is based on the PDF coordinate system, and according to the PDF coordinate system thereof, the PDF coordinate origin point (0, 0) of the coordinates are set on the lower left. Now, the PDF coordinate system is shown by PDF x-coordinate PDF_X wherein the value increases towards the right direction from the PDF coordinate origin point, and the PDF y-coordinate PDF_Y wherein the value increases towards the upward direction from the PDF coordinate origin point.

Also, the page size of the PDF screen PD1 is shown by the PDF page width PW and PDF page height PH shown by the PDF coordinate values (PW, PH).

On the other hand, the still image screen GD1 in FIG. 20B is based on the screen coordinate system of the television receiver 103, the screen coordinate system differs from the PDF coordinate system, and the screen coordinate origin point (0, 0) of the coordinates is set on the upper left. Now, the screen coordinate system is shown by screen x-coordinate DIS_X wherein the value increases towards the right direction from the screen coordinate origin point, and the screen y-coordinate DIS_Y wherein the value increases towards the downward direction from the screen coordinate origin point. Incidentally, the above-described link information Li (FIGS. 16A through 16C) shows the screen x-coordinate DIS_X, and the y-coordinate shows the screen y-coordinate DIS_Y.

Also, the still image screen GD1 shows the screen page width DW and screen page height DH with the screen coordinate value (DW, DH). Now, the screen page width DW is set to "1920" and the screen page height DH is set up "1080".

Thus, since the coordinate values for the PDF coordinate system and the screen coordinate system differ mutually, the CPU 2A has to convert the text string placement information shown by the coordinate values of the PDF coordinate system obtained in step SP12 (FIG. 17) to the coordinate values of the screen coordinate system.

The text string placement information obtained from the PDF data in step SP12 includes the PDF character position x-coordinate PDF_CX and PDF character position y-position PDF_CY which are the coordinate values indicating the position of the first character of the PDF text row PL1 of the first row of the PDF data.

Note that the position of the first character of the PDF text row PL shown by the PDF character position x-coordinate PDF_CX and PDF character position y-coordinate PDF-CY will be referred to as "the PDF character position PDF_C".

Also, the character line placement information further includes the PDF text string width PDF_W indicating the length from the first character position to the last character position of the PDF text row PL1 shown by the PDF character position PDF_C.

A case will be described below wherein the PDF character position PDF_C and PDF text string width PDF_W which are the PDF coordinates of the PDF screen PD1 shown in FIG. 20A are converted to the screen character position DIS_C and screen text string width DIS_W which are the screen coordinate system of the still image screen GD1 shown in FIG. 20B. Note that the screen character position DIS_C is the first character position of the screen test row shown by the screen character position x-coordinate DIS_CX and screen character position y-coordinate DIS_CY.

Incidentally, for convenience of description, in FIG. 20A the PDF character position PDF_C is in the state showing not the PDF text row PL1 correlated with the row TR1 of the screen test row placement table TBL of the PDF data, but another predetermined PDF text row PL. That is to say, in this state the CPU 2A has ended setting the row No. ID, page No. PG, screen character position x-coordinate DIS_CX, screen character position y-coordinate DIS_CY, screen text string width DIS_W, up movement row No. U_ID, down movement row No. D_ID, and audio saving location AS up to the row TR that is one row before the row TR of the screen text row placement table TBL (FIG. 18) correlated to another PDF text row PL (described in detail later).

Actually in step SP31 (FIG. 21) the CPU 2A computes the conversion width rate ZW in the case of converting the PDF page width PW to the screen width DW (1920), by dividing the screen width DW of the screen coordinate system of the still image screen GD1 (FIG. 20B) by the PDF page width PW of the PDF coordinate system of the PDF screen PD1 (FIG. 20A), and advances to the next step SP32.

In step SP32 the CPU 2A computes the conversion height rate ZH in the case of converting the PDF page height PH to the screen height DH (1080), by dividing the screen height DH of the screen coordinate system of the still image screen GD1 by the PDF page height PH of the PDF coordinate system of the PDF screen PD1, and advances to the next step SP33.

In step SP33 the CPU 2A sets the smaller of the conversion width rate ZW and conversion height rate ZH as the conversion rate Z to be used for coordinate conversion from the PDF coordinate system to the screen coordinate system in the processing below, and advances to the next step SP34. Note that in the description below, the conversion height rate ZH is smaller than the conversion width rate ZW, and so the conversion height rate ZH is set as the conversion rate Z.

Thus the CPU 2A can arrange the post coordinate conversion still image data IMG_A (FIG. 20B) at the time of coordinate conversion of the PDF two-page spread based on the PDF data to the screen coordinate system so as to fit in the screen width DW and screen height DH.

Incidentally, according to the present embodiment, as shown in FIG. 20B, the post coordinate conversion still image data IMG_A is displayed on the central portion of the television receiver 103.

Also, the point in the region that the post coordinate conversion still image data IMG_A is displayed on the still image screen GD1 that is nearest the screen coordinate origin (0, 0) becomes (post coordinate conversion starting point x-coordinate IMG_AX0, post coordinate conversion starting point y-coordinate IMG_AY0).

Now, let us consider a case wherein, in the case that the ratio of the PDF page width PW and the PDF page height PH (FIG. 20A) is 4:3, for example, and the ratio of the screen width DW and the screen height DH (FIG. 20B) is 16:9, the post coordinate conversion still image data IMG_A wherein the CPU 2A has coordinate-converted the PDF page with the conversion rate Z is displayed on the television receiver 103.

In this case the ratio between PDF page width PW and PDF page height PH and the ratio between screen width DW and screen height DH differ, whereby as shown in FIG. 20B for example, blank regions BL1 and BL2 can occur wherein nothing is displayed on the outside of the left and right directions of the post coordinate conversion still image data IMG_A on the still image screen GD1.

Incidentally, according to the present embodiment, the post coordinate conversion still image data IMG_A is displayed on the central portion of the television receiver 103, whereby the width of the blank region BL1 and the width of the blank region BL2 are the same.

In this case the conversion height rate ZH is set as the conversion rate Z, whereby a blank region BL has occurred on the outside of the left and right directions of the post coordinate conversion still image data IMG_A. On the other hand, in the case that the conversion width rate ZW is set as the conversion rate Z, there is a possibility that a blank region BL (not shown) will occur on the outside of the upper and lower directions of the post coordinate conversion still image data IMG_A.

Note that in the case that the rate of the PDF page width PW and the PDF page height PH, and the ratio of the screen width DW and the screen height DH are the same, a blank region BL will not occur on the outside of either the left and right directions or the upper and lower directions of the post coordinate conversion still image data IMG_A on the still image screen GD1.

With the processing described below, the PDF page is coordinate-converted from the PDF coordinate system to the screen coordinate system, with consideration for such a blank region BL.

Now, as shown on the PDF screen PD1 shown in FIG. 20A, in step SP2 of the above-described data conversion processing procedures (FIG. 9), there are cases wherein a zoom region (hereinafter referred to as "PDF zoom region PDF_ZA") in the case of displaying an expanded still image data IMG1 based on the PDF data is specified as one type of various types of parameters. According to the present embodiment, for example as shown in FIG. 20A, a PDF zoom region PDF_ZA1 or PDF_ZA2 which do not overlap regions mutually are specified.

Now, the PDF zoom region PDF_ZA1 is shown with a rectangular frame, and the coordinate values closest to the PDF coordinate origin of this rectangular frame are shown as PDF zoom region starting point x-coordinate PDF_ZX0 and PDF zoom region starting point y-coordinate PDF_ZY0.

Also, the coordinate values of the point farthest from the PDF coordinate origin of the rectangular frame of the PDF zoom region PDF_ZA1 are shown as PDF zoom region ending point x-coordinate PDF_ZX1 and PDF zoom region ending point y-coordinate PDF_ZY1.

Thus, the PDF zoom region PDF_ZA1 is a rectangular region surrounded by (PDF zoom region starting point x-coordinate PDF_ZX0, PDF zoom region starting point y-coordinate PDF_ZY0) and (PDF zoom region ending point x-coordinate PDF_ZX1 and PDF zoom region ending point y-coordinate PDF_ZY1).

Also the PDF zoom region PDF_ZA2 is shown with a rectangular frame, similar to the PDF zoom region PDF_ZA1, and the region thereof is shown by the coordinate values of the points (unshown) closest to the PDF coordinate origin of the rectangular frame and the points (unshown) farthest from the PDF coordinate origin of the rectangular frame.

Figure 23:
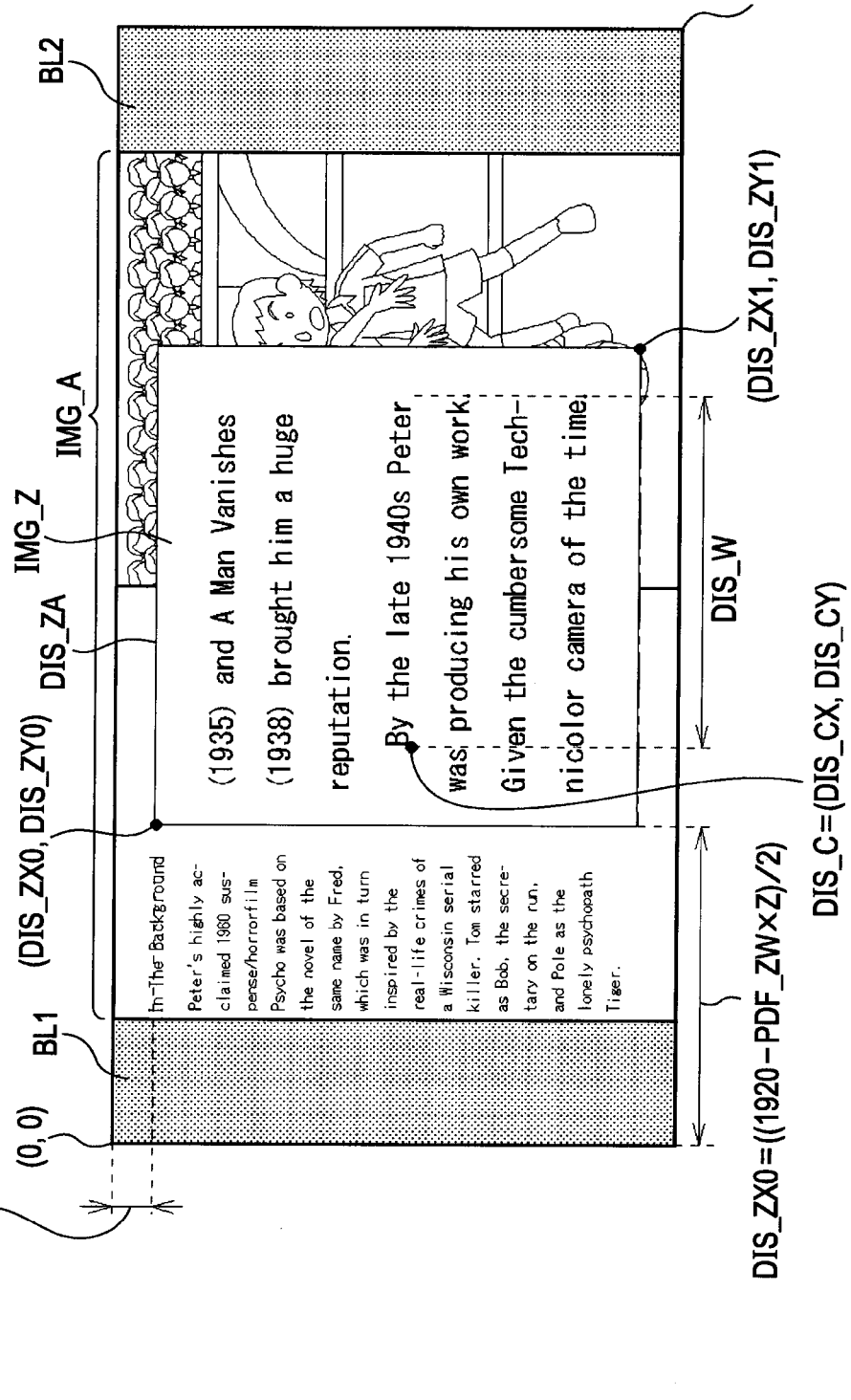
FIG. 23 is a schematic diagram illustrating an example of coordinate conversion in a zoom region (part 1)

Now, the still image screen GD2 shown in FIG. 23 displays the expanded still image data IMG_Z wherein the PDF zoom region PDF_ZA1 shown in FIG. 20A on the central portion of the television receiver 103 in the state of being layered over the post coordinate conversion still image data IMG_A.

The screen zoom region DIS_ZA (FIG. 23) is the result of coordinate conversion of the PDF zoom region PDF_ZA1 (FIG. 20A) to the screen coordinate system. Also, the screen zoom region DIS_ZA (FIG. 23) is a rectangular frame surrounded by (screen zoom region starting point x-coordinate DIS_ZX0, screen zoom region starting point y-coordinate DIS_ZY0) and (screen zoom region ending point x-coordinate DIS_ZX1, screen zoom region ending point y-coordinate DIS_ZY1), corresponding to the PDF zoom region PDF_ZA1 (FIG. 20A).

We now return to the description of the flowchart in the sub-routine SRT2. In step SP34 (FIG. 21) the CPU 2A determines whether or not the PDF character position PDF_C (PDF character position x-coordinate PDF_CX and PDF character position y-coordinate PDF_CY) shown in FIG. 20A is within the PDF zoom region PDF_ZA.

Now, if negative results are obtained, this indicates that in step SP2 of the above-described data conversion processing procedures (FIG. 9) for example, the PDF zoom region PDF_ZA2 (FIG. 20A) is specified as a parameter, and that the PDF zoom region PDF_ZA2 does not include the PDF character position PDF_C.

In step SP35, upon multiplying the PDF page width PW by the conversion rate Z, the CPU 2A subtracts this from the screen width DW (1920) (FIG. 20B) and divides by 2, thereby computing a screen width offset OFFSET_W that indicates the distance of the screen x-coordinate DIS_X from the screen coordinate origin to the post-coordinate conversion starting point x-coordinate IMG_AX0 on the still image screen GD1, and advances to the next step SP 36.

In step SP36, upon multiplying the PDF page height PH (FIG. 20A) by the conversion rate Z, the CPU 2A subtracts this from the screen height DH (1080) (FIG. 20B) and divides by 2, thereby computing a screen height offset OFFSET_H that indicates the distance of the screen y-coordinate DIS_Y from the screen coordinate origin to the post-coordinate conversion starting point y-coordinate IMG_AY0 on the still image screen GD1, and advances to the next step SP 37.

Incidentally according to the present embodiment, the conversion height ZA is set as the conversion rate Z, and height direction of the PDF page has been coordinate-converted to the same value as the screen height DH. Therefore, a blank region BL (unshown) does not occur outside the upper and lower directions of the post coordinate conversion still screen data IMG_A, whereby the screen height offset OFFSET_H becomes "0".

In step SP37, upon multiplying the PDF character position x-coordinate PDF_CX (FIG. 20A) by the conversion rate Z computed in step SP33 (PDF_CX x Z), by adding this to the screen width offset OFFSET_W (FIG. 20B), the CPU 2A computes a screen character position x-coordinate DIS_CX in the screen coordinate system, and advances to the next step SP38. Therefore, the CPU 2A can convert the PDF character position x-coordinate PDF_CX (FIG. 20A) to the screen character position x-coordinate DIS_CX (FIG. 20B).

In step SP38, upon subtracting the PDF character position y-coordinate PDF_CY from the PDF page height PH (FIG. 20A) and multiplying by the conversion rate Z (PH−PDF_CY×Z), and adding this to the screen height offset OFFSET_H (FIG. 20B), the CPU 2A computes a screen character position y-coordinate DIS_CY in the screen coordinate system, and advances to the next step SP39. Therefore, the CPU 2A can convert the PDF character position y-coordinate PDF_CY (FIG. 20A) to the screen character position y-coordinate DIS_CY (FIG. 20B).

Note that since the y-coordinate direction is reversed top and bottom with the PDF coordinate system and the screen coordinate system, in the processing in step SP39 the CPU 2A subtracts the PDF character position y-coordinate PDF_CY from the PDF page height PH (FIG. 20A).

In step SP39 the CPU 2A multiples the PDF text string width PDF_W by the conversion rate Z, thereby computing the screen text string width DIS_W (FIG. 20B) in the screen coordinate system. Thus the CPU 2A can convert the PDF text string width PDF_W (FIG. 20A) in the PDF coordinate system to the screen text string width DIS_W (FIG. 20B) in the screen coordinate system.

Figure 17:
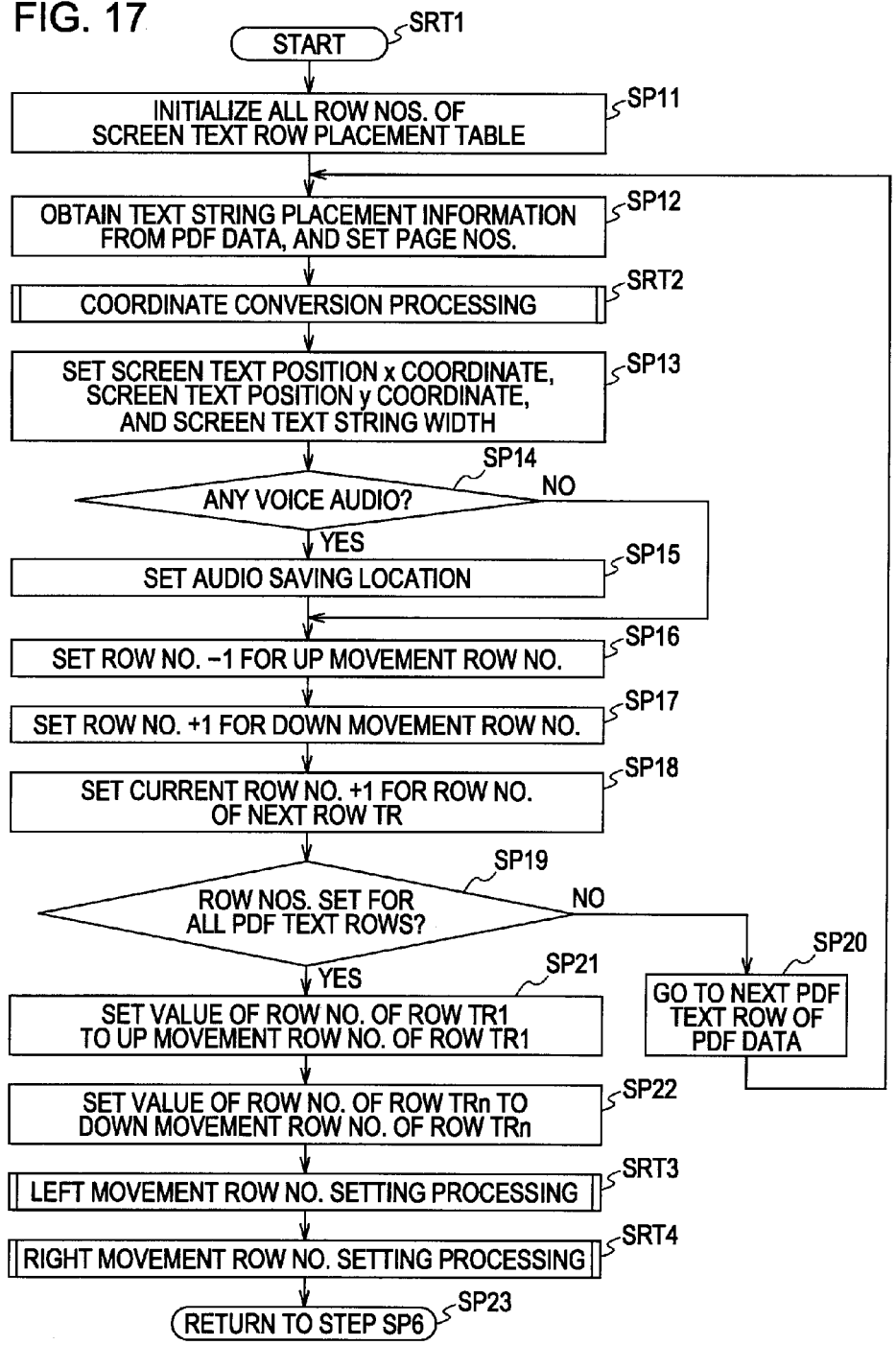
FIG. 17 is a flowchart illustrating screen text row placement table creating processing procedures.

After the processing in step SP39, the CPU 2A advances to the next step SP51 and ends the coordinate conversion sub-routine SRT2, and returns to step SP13 in the sub-routine SRT1 (FIG. 17).

Figure 22:
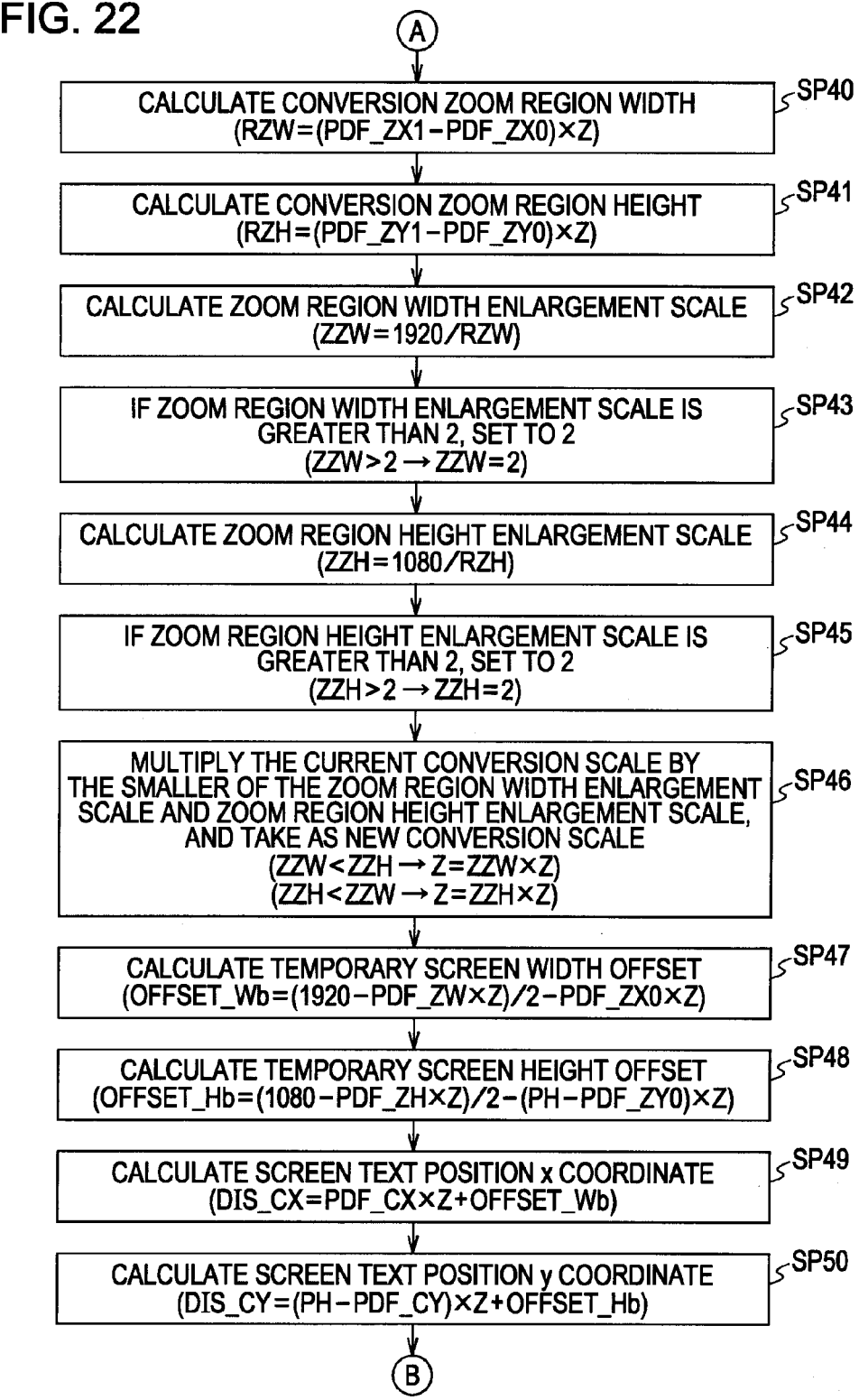
FIG. 22 is a flowchart illustrating coordinate conversion processing procedures (part 2)

On the other hand, if a positive result is obtained in step SP34, this indicates that, in step SP2 of the above-described data conversion processing procedures (FIG. 9) for example, the PDF zoom region PDF_ZA1 (FIG. 20A) is specified as a parameter, and that the PDF zoom region PDF_ZA1 includes the PDF character position PDF_C, and at this time the CPU 2A advances to step SP40 (FIG. 22).

In step SP40, the CPU 2A computes the width of the PDF zoom region PDF_ZA1 (hereinafter referred to as "PDF zoom region width PDF_ZW") from the difference between the PDF zoom region ending point x-coordinate PDF_ZX1 and the PDF zoom region starting point x-coordinate PDF_ZX0 on the PDF screen PD1 shown in FIG. 20A.

Next the CPU 2A multiplies the PDF zoom region width PDF_ZW by the conversion rate Z. Thus the CPU 2A computes a conversion zoom region width RZW (temporary variable) wherein the PDF zoom region width PDF_ZW (FIG. 20A) is coordinate-converted to the screen coordinate system by the conversion rate Z computed in step SP33 (FIG. 21), and advances to the next step SP41.

In step SP41, the CPU 2A computes the height of the PDF zoom region PDF_ZA1 (hereinafter referred to as "PDF zoom region height PDF_ZH") from the difference between the PDF zoom region ending point y-coordinate PDF_ZY1 and the PDF zoom region starting point y-coordinate PDF_ZY0 on the PDF screen PD1 shown in FIG. 20A.

Next the CPU 2A multiples the PDF zoom region height PDF_ZH by the conversion rate Z. Thus the CPU 2A computes a conversion zoom region height RZH (temporary variable) wherein the PDF zoom region height PDF_ZH (FIG. 20A) is coordinate-converted to the screen coordinate system by the conversion rate Z computed in step SP33 (FIG. 21), and advances to the next step SP42.

In step SP42 the CPU 2A divides the conversion zoom region width RZW computed in step SP40 (FIG. 22) by the screen width DW (1920) shown in FIG. 20B. Thus the CPU 2A computes a zoom region width expanded rate ZZW (temporary variable) which indicates how many times the conversion zoom region width RZW can be expanded to fit in the screen width DW (FIG. 20B), and advances to the next step SP43.

In the case that the zoom region width expanded rate ZZW is greater than two times, the CPU 2A in step SP43 sets the zoom region width expanded rate ZZW to two times, and advances to the next step SP44. Thus the CPU 2A can prevent situations such as the text in the PDF zoom region PDF_ZA1 (FIG. 20B) expanding too much and becoming fuzzy or unclear because the zoom region width expanded rate ZZW is too large.

In step SP44 the CPU 2A divides the conversion zoom region height RZH computed in step SP40 (FIG. 22) by the screen height DH (1080) shown in FIG. 20B. Thus the CPU 2A computes a zoom region height expanded rate ZZH (temporary variable) which indicates how many times the conversion zoom region height RZH can be expanded to fit in the screen height DH (FIG. 20B), and advances to the next step SP45.

In step SP45 in the case the zoom region height expanded rate ZZH is greater than two times, the CPU 2A is greater sets the zoom region height expanded rate ZZH by the reason as in step SP43, and advances to the next step SP46.

In step SP46 the CPU 2A selects the smaller of the zoom region width expanded rate ZZW and the zoom region height expanded rate ZZH. Next the CPU 2A generates a new conversion rate Z to be used for the coordinate conversion of the PDF zoom region PDF_ZA1 (FIG. 20A) from the PDF coordinate system to the screen coordinate system in the processing described below, by multiplying either the zoom region width expanded rate ZZW or zoom region height expanded rate ZZH by the current conversion rate Z computed in step SP33 (FIG. 21), and advances to the next step SP47.

Thus the CPU 2A can expand the PDF zoom region PDF_ZA1 to the extent of fitting in the screen width DW and screen height DH and to the extent that the text included in the region does not become difficult to read.

In step SP47, upon multiplying the PDF zoom region width PDF_ZW (FIG. 20A) by the conversion rate Z computed in step SP46, the CPU 2A subtracts this from the screen width DW (1920) (FIG. 20B) and divides by 2, thereby computing the screen zoom region starting point x-coordinate DIS_ZX0 of the screen zoom region DIS_ZA shown in FIG. 23.

Next, upon multiplying the PDF zoom region starting point x-coordinate PDF_ZX0 (FIG. 20A) by the conversion rate Z, and subtracting this from the screen zoom region starting x-coordinating DIS_ZX0 (FIG. 23), thereby computing a temporary screen width offset OFFSET_Wb (temporary variable). Thus the CPU 2A can prevent the distance of the PDF x-coordinate PDF_X from the PDF coordinate origin (FIG. 20A) to the PDF zoom region starting point x-coordinate PDF_ZX0 of the PDF coordinate system from being added to the later-computed screen character position x-coordinate DIS_CX (details will be described in step SP49). Thereinafter the CPU 2A advances to the next step SP48.

In step SP48, upon multiplying the PDF zoom region height PDF_ZH by the conversion rate Z computed in step SP46, and subtracting this from the screen height DH (1080) and dividing by 2, the CPU 2A computes the screen zoom region starting point y-coordinate DIS_ZY0 of the screen zoom region DIS_ZA shown in FIG. 23.

Next, upon subtracting the PDF zoom region starting point y-coordinate PDF_ZY0 from the PDF page height PH (FIG. 20A) and multiplying the conversion rate Z, and subtracting this from the screen zoom region starting point y-coordinate DIS_ZY0 (FIG. 23), the CPU 2A computes a temporary screen height offset OFFSET_Hb (temporary variable). Thus the CPU 2A can prevent the distance of the PDF y-coordinate PDF_Y from the PDF coordinate origin (FIG. 20A) to the PDF zoom region starting point y-coordinate PDF_ZY0 of the PDF coordinate system from being added to the later-computed screen character position y-coordinate DIS_CY (details will be described in step SP49).

Note that similar to step SP38, since the y-coordinate direction is reversed top and bottom with the PDF coordinate system and the screen coordinate system, in step SP48 the CPU 2A subtracts the PDF zoom region starting point y-coordinate PDF_ZY0 from the PDF page height PH. Subsequently the CPU 2A advances to the next step SP49.

The processing in step SP49 will be described in detail below. In step SP49, upon multiplying the PDF character position x-coordinate PDF_CX by the conversion rate Z (PDF_CX×Z), the CPU 2A adds this to the temporary screen width offset OFFSET_Wb, thereby computing the screen character position x-coordinate DIS_CX (FIG. 23) in the screen coordinate system, and advances to the next step SP50.

Figure 24:
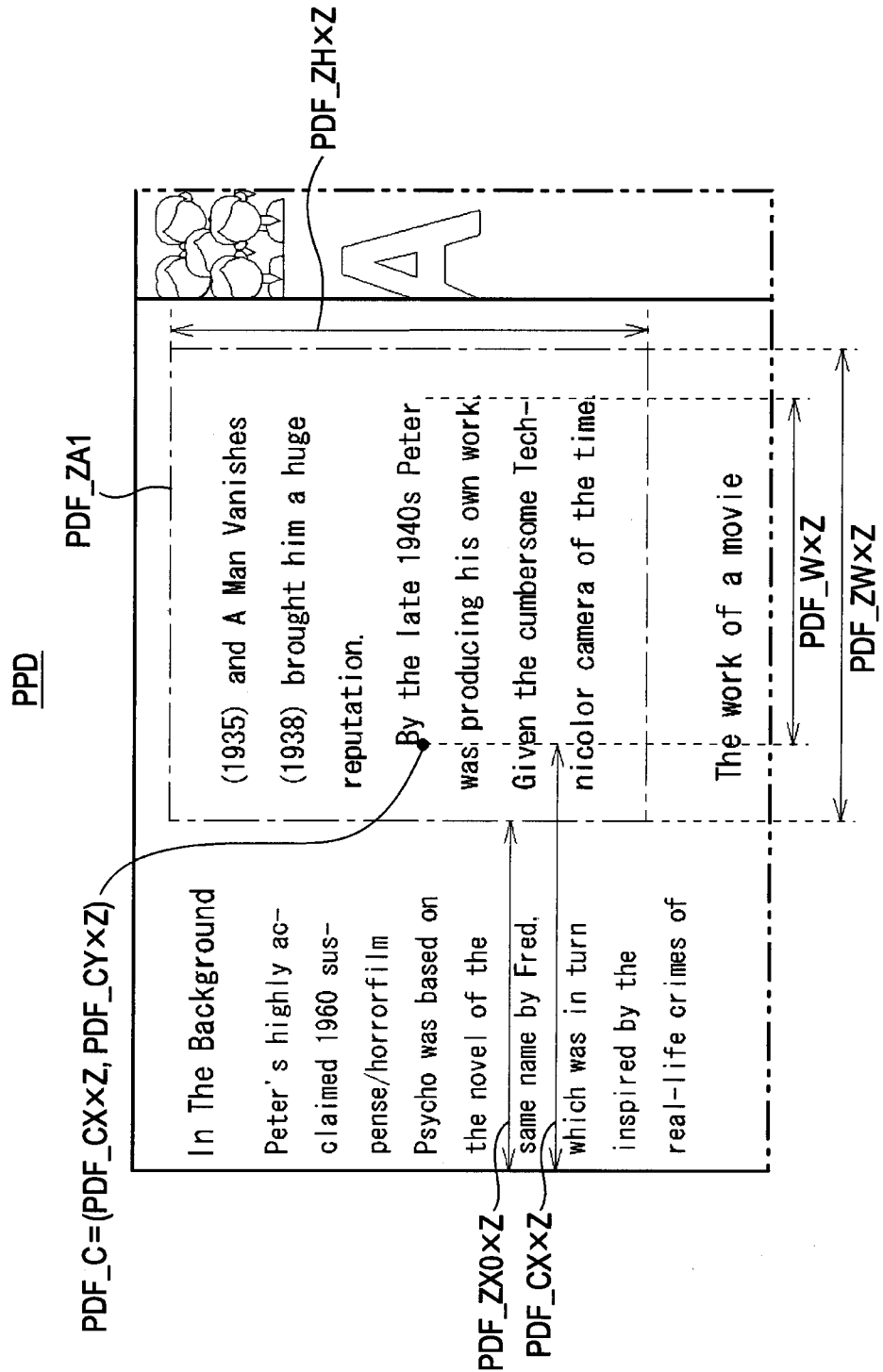
FIG. 24 is a schematic diagram illustrating an example of coordinate conversion in a zoom region (part 2)

Now, of the PDF screen PD1 shown in FIG. 20A, the portion PDF screen PPD which is the periphery portion including the region wherein the PDF zoom region PDF_ZA1 is expanded by the conversion rate Z is shown in FIG. 24.

In the above-described step SP47, upon multiplying the PDF zoom region starting point x-coordinate PDF_ZX0 by the conversion rate Z (PDF_ZX0×Z) (FIG. 24), the CPU 2A subtracts this from the screen zoom region starting point x-coordinate DIS_ZX0 (i.e., (1920−PDF_ZX×Z)/2).

Therefore, in the processing in step SP49, the CPU 2A prevents the (PDF_ZX0×Z) shown in FIG. 24 from being added to the screen character position x-coordinate DIS_CX.

That is to say, the CPU 2A can take a value obtained by adding the screen zoom region starting point x-coordinate DIS_ZX0 to the value wherein the distance from the PDF zoom region starting x-coordinate PDF_ZX0 to the PDF character position x-coordinate PDF_CX has been coordinate-converted with the conversion rate Z, instead of the distance of the PDF x-coordinate PDF_X from the PDF coordinate origin to the PDF character position x-coordinate PDF_CX of the PDF coordinate system in the PDF screen (FIG. 20A), as the screen character position x-coordinate DIS_CX.

The description given above is regarding the screen character position x-coordinate DIS_CX, but the screen character position y-coordinate DIS_CY in the later-described step SP50 is also similar.

Figure 21:
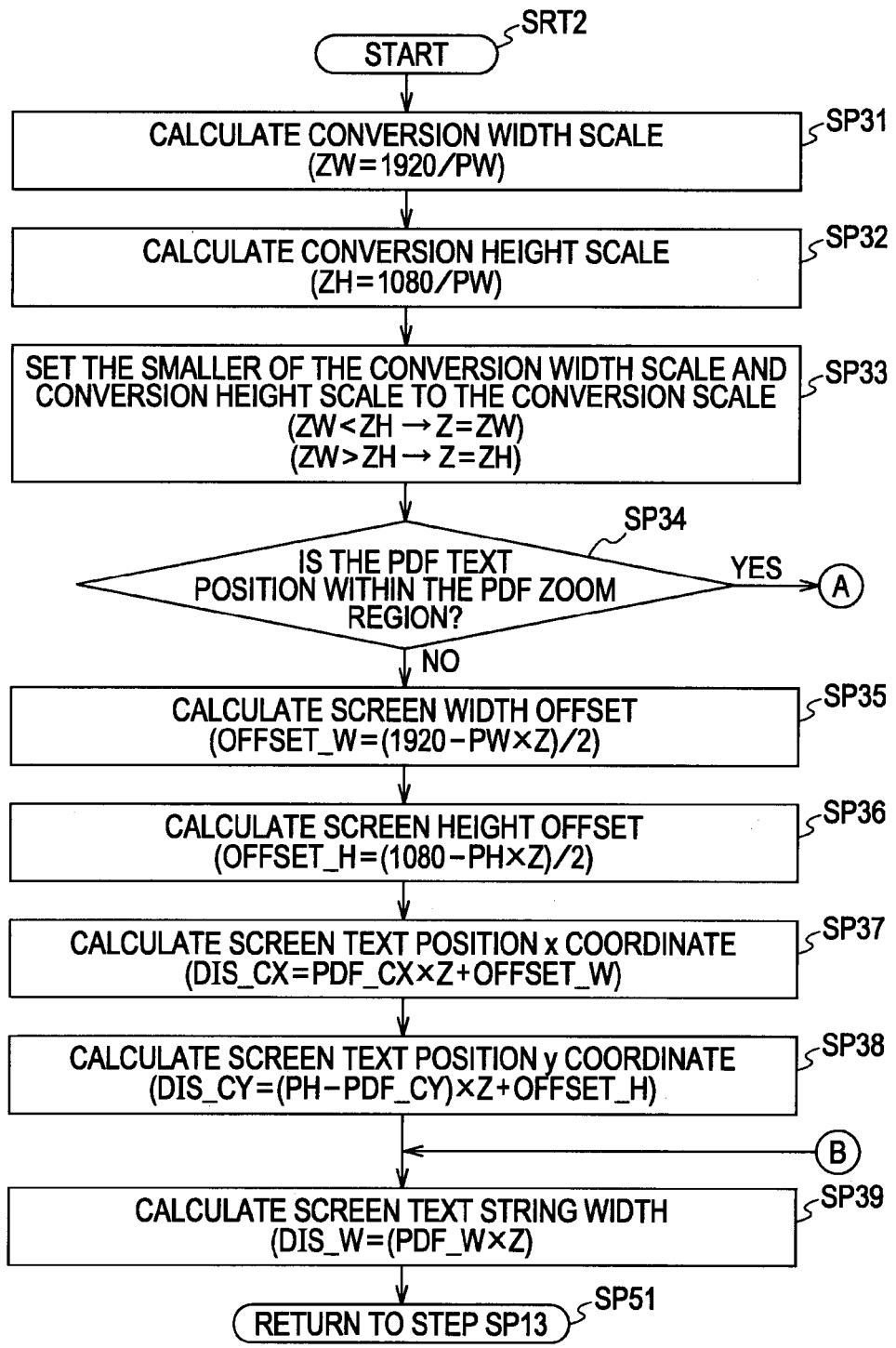
FIG. 21 is a flowchart illustrating coordinate conversion processing procedures (part 1)

In step SP50, upon subtracting the PDF character position y-coordinate PDF_CY from the PDF page height PH (FIG. 20A) and multiplying by the conversion rate Z (PH−PDF_CY×Z), and adding this to the temporary screen height offset OFFSET_Hb, the CPU 2A computes the screen character position y-coordinate DIS_CY of the screen coordinate system and advances to the next step SP39 (FIG. 21).

Thus the CPU 2A can convert the PDF character position y-coordinate PDF_CY (FIG. 20A) to the screen character position y-coordinate DIS-CY (FIG. 23).

In step SP39 the CPU 2A computes the screen text string width DIS_W (FIG. 23) with the processing similar to the processing described above, advances to the next step SP51 and ends the coordinate conversion sub-routine SRT2, and returns to step SP13 of the sub-routine SRT1 (FIG. 17).

In step SP13 of the sub-routing SRT1, the CPU 2A sets the value of the screen character position x-coordinate DIS_CX computed in the coordinate conversion sub-routine SRT2 (FIG. 20B or FIG. 23) to be the screen character position x-coordinate DIS_CX corresponding to the row TR1 of the screen text row placement table TBL.

Further, the CPU 2A sets the values of the screen character position y-coordinate DIS_CY and the screen text string width DIS_W (FIG. 20B or FIG. 23) computed in the coordinate conversion sub-routine SRT2 to the screen character position y-coordinate DIS_CY and screen text string width DIS_W respectively, which correspond to the row TR1 of the screen text row placement table TBL (FIG. 18), and advances to the next step SP14.

In step SP14 the CPU 2A determines whether or not voice audio data for reading the text string of the current screen text row is included in the PDF data.

If a positive result is obtained here, this indicates that audio data for reading the text string of the current screen text row is included in the PDF data, and at this time the CPU 2A advances to the next step SP15.

In step SP15 the CPU 2A extracts the audio data from the PDF data and saves this, sets the saving location of the audio data as an audio saving location AS corresponding to the row TR1 of the screen text row placement table TBL (e.g., "/BDMV/JAR/audio/001"), and advances to the next step SP16. Conversely, if a negative result is obtained in step SP14, the CPU 2A advances to step SP 16 without executing step SP 15.

Now, in the event that an underline is displayed under a certain screen text line, the up movement row No. U_ID of the screen text row placement table TBL is the value of the row No. ID corresponding to the screen text row to which the underline is to be moved next, for example in the case that a pressing operation is performed on the up button via the remote controller (unshown).

In step SP 16 the CPU 2A subtracts "1" from the row No. ID corresponding to the row TR1 of the screen text row placement table TBL, sets this to the up movement row No. U_ID corresponding to the row TR1, and advances to the next step SP17. That is to say, the CPU 2A sets the "−1" obtained by subtracting "1" from "0" to the up movement row No. U_ID corresponding to the row TR1.

By repeatedly executing such processing with later processing as to all rows TR of the screen text row placement table TBL, "1" is subtracted from the row No. ID corresponding to each row TR and these are set to the up movement row Nos. U_ID corresponding to the rows TR.

Also, in the event an underline is displayed under a certain screen text row, for example in the case a pressing operation is performed on the down button via the remote controller (unshown), the down movement number D_ID of the screen text row placement table TBL is the value of the row No. ID corresponding to the screen text row to which the underline is to be moved next.

In step SP17 the CPU 2A adds "1" to the row No. ID corresponding to the row TR1 of the screen text row placement table TBL, and this is set to the down movement row No. D_ID corresponding to the row TR1, and advances to the next step SP18. That is to say, the CPU 2A sets the "1" obtained by adding "1" to "0" as the down movement row No. D_ID corresponding to the row TR1.

By repeatedly executing such processing with later processing as to all rows TR of the screen text row placement table TBL, "1" is added to the row No. ID corresponding to each row TR and these are set to the down movement row Nos. D_ID corresponding to the rows TR.

In step SP18 the CPU 2A adds "1" to the row No. ID corresponding to the row TR1 of the screen text row placement table TBL and finds this as the value to be set as the row No. ID corresponding to the next row TR (i.e. row TR2), and advances to the next step SP19. That is to say, the CPU 2A finds the "1" obtained by adding "1" to "0" as the value to be set as the row No. ID corresponding to the next row TR2.

In step SP19 the CPU 2A determines whether or not the row No. IDs have been correlated to the PDF text rows PL included in the PDF data and set for the screen text row placement table TBL. If a negative result is obtained here, the CPU 2A advances to step SP20.

In step SP20 the CPU 2A advances that to be processed of the PDF data to the next PDF text row PL, returns to step SP 12, repeats the above-described processing as to all of the PDF text rows PL of the PDF data, and sets the rows TR of the screen text row placement table TBL, one row at a time.

Conversely, if a positive result is obtained in step SP19, this indicates that a row No. ID, page No. PG, screen character position x-coordinate DIS_CX, screen character position y-coordinate DIS_CY, screen text string width DIS_W, up movement row No. U_ID, down movement number D_ID, and audio saving location AS as to the row TR1 through row TRn of the screen text row placement table TBL have ended setting, and the CPU 2A at this time advances to step SP21.

In step SP21 the CPU 2A resets the value of the row No. ID corresponding to the row TR1 of the screen text row placement table TBL, to the up movement row No. U_ID corresponding to the row TR1, and advances to the next step SP22. Therefore "0" instead of "−1" is set as the up movement row No. U_ID corresponding to the row TR1 of the screen text row placement table TBL.

Thus in the event that an underline is displayed under a screen text row corresponding to the row No. ID of the row TR1 of the screen text row placement table TBL, even in the case wherein instructions are given to move the underline upwards, the CPU 2A can prevent the underline from being moved to a screen text row that does not exist.

In step SP22, the CPU 2A resets the value of the row No. ID corresponding to the row TRn of the screen text row placement table TBL, to the down movement row No. D_ID corresponding to the row TRn, and moves to the next sub-routine SRT3. Therefore "2000" instead of "2001" is set as the down movement row No. D_ID corresponding to the row TRn of the screen text row placement table TBL.

Thus in the event that an underline is displayed under a screen text row corresponding to the row No. ID of the row TRn of the screen text row placement table TBL, even in the case wherein instructions are given to move the underline downwards, the CPU 2A can prevent the underline from being moved to a screen text row that does not exist.

Thus, the CPU 2A sets unique row Nos. ID for each of all of the PDF text rows PL included in the PDF data, while setting the screen character position x-coordinate DIS_CX, screen character position y-coordinate DIS_CY of the screen coordinate system, the screen text string width DIS_W, and the row No. IDs corresponding to the screen text row of the movement destination of the underline, in the screen text row placement table TBL.

Figure 25:
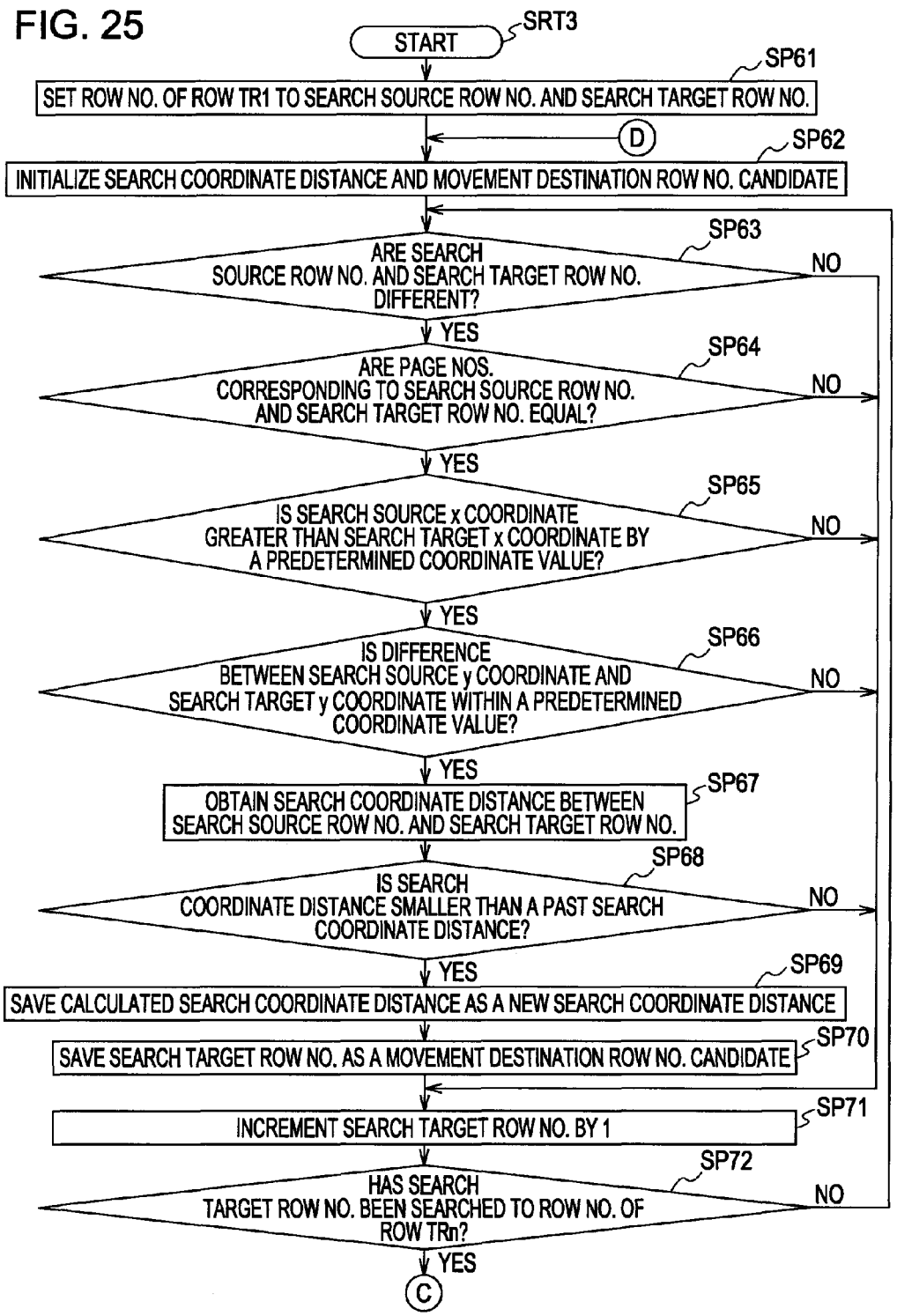
FIG. 25 is a flowchart illustrating left movement row No. setting processing procedures (part 1)

Next, left movement row No. setting processing procedures of a sub-routine SRT3 in the screen text row placement table creating processing procedures of the sub-routine SRT1 shown in FIG. 17 will be described with reference to the flowchart shown in FIGS. 25 and 26 and the screen text row placement table TBL shown in FIG. 18.

In the case that a pressing operation is performed on the left button via the remote controller (unshown) wherein, in the event that an underline is displayed under a certain text row, the left movement row No. L_ID in the screen text row placement table TBL is the value of the row No. ID corresponding to the screen text row to which the underline is to be moved next.

In step SP 61 the CPU 2A sets the value of the row No. ID corresponding to the row TR1 of the screen text row placement table TBL as the search source row No. wherein a predetermined row No. ID of the screen text placement table TBL serving as the search source in the processing below has been set, and as the search target row No. wherein all row No. IDs including the row No. ID set as the search source row No. have been set.

In step SP62 the CPU 2A sets a predetermined initial value (e.g. "−1" which is a value not assumable in the processing below) as a movement destination row No. candidate M serving as a candidate of the left movement row No. L_ID corresponding to the row No. ID shown by the search source row No.

Next the CPU 2A sets a predetermined initial value (e.g. "10000000" which is a value not assumable in the processing below) as search coordinate distance D showing the distance between the screen character position DIS_C corresponding to the row No. ID shown by the search source row No. and the screen character position DIS_C corresponding to the row No. ID shown by the search target row No.

In step SP63 the CPU 2A determines whether or not the values of the search source row No. and the search target row No. differ. If a negative result is obtained here, this indicates that a search target row No. of the same row No. ID as the row No. ID shown by the search source row No. is being searched, and at this time the CPU 2A advances to step SP71.

On the other hand, if a positive result is obtained in step SP 63, the CPU 2A advances to the next step SP64, and determines whether or not the page No. PG corresponding to the row No. ID shown by the search source row No. and the page No. PG corresponding to the row No. ID shown by the search target row No. are the same.

If a positive result is obtained here, this indicates that the screen text row corresponding to the row No. ID shown by the search target row No. is positioned on the same two-page spread as the screen text row corresponding to the row No. ID shown by the search source row No., and the CPU 2A at this time advances to the next step SP65.

Conversely, if a negative result is obtained in step S64, this indicates that the screen text row corresponding to the row No. ID shown by the search target row No. is not positioned in the same two-page spread as the screen text row corresponding to the row No. ID shown by the search source row No., and thereby is not applicable to the screen text row positioned to the left side of, and near to, the screen text row corresponding to the row No. ID shown by the search source row No., and at this time the CPU 2A advances to step SP71.

In step SP65 the CPU 2A determines whether or not the screen character position x-coordinate DIS_CX corresponding to the row No. ID shown by the search source row No. (hereinafter referred to as "search source x-coordinate X1") is greater or not than the screen character position x-coordinate DIS_CX corresponding to the row No. ID shown by the search target row No. (hereinafter referred to as "search target x-coordinate X2") by a predetermined coordinate value (e.g. equivalent to 30 pixels worth).

If a positive result is obtained here, this indicates that for example the search source row No. is not in the state of indentation by a predetermined number of characters worth in the x-direction as when the screen text row corresponding to the row No. ID shown by the search source number is positioned at the beginning of the paragraph, but that the screen text row corresponding to the row No. ID shown by the search target row No. is positioned farther than the number of characters worth of the indentation to the left side of the screen text row corresponding to the row No. ID shown by the search source row No., and at this time the CPU 2A advances to the next step SP66.

Conversely, if a negative result is obtained in step SP65, this indicates that the screen text row corresponding to the row No. ID shown by the search target row No. is not positioned farther than the number of characters of indentation to the left side of the screen test row corresponding to the row No. ID shown by the search source row No., and that for example the screen text row corresponding to the row No. ID shown by the search source row No. is in the state of being indented by a predetermined number of characters worth in the x-direction.

Therefore the screen text row corresponding to the row No. ID shown by the search target row No. is determined to not be applicable to the screen text row positioned to the left side of the screen text row corresponding to the row No. ID shown by the search source row No. At this time the CPU 2A advances to the step SP71.

In step SP66 the CPU 2A determines whether or not the difference between the screen character position y-coordinate DIS_CY corresponding to the row No. ID shown by the search source row No. (hereinafter referred to as "search source y-coordinate Y1") and the screen character position y-coordinate DIS_CY corresponding to the row No. ID shown by the search target row No. (hereinafter referred to as "search target y-coordinate Y2") is at or below a predetermined coordinate value (e.g. equivalent to 30 pixels worth).

Incidentally, the coordinates shown by the search source x-coordinate X1 and search source y-coordinate Y1 are called the search source coordinates, and the coordinates shown by the search target x-coordinate X2 and search target y-coordinate Y2 are called the search target coordinates.

If a positive result is obtained here, this indicates that the screen text row corresponding to the row No. ID shown by the search source row No. and the screen text row corresponding to the row No. ID shown by the search target row No. are not too far apart in the Y-direction, and at this time the CPU 2A advances to the next step SP67.

Conversely, if a negative result is obtained in step SP66, this indicates that the screen text row corresponding to the row No. ID shown by the search source row No. and the screen text row corresponding to the row No. ID shown by the search target row No. are too far apart in the Y-direction. Therefore, the screen text row corresponding to the row No. ID shown by the search target row No. is not applicable to the screen text row positioned to the left side of, and near to, the screen text row corresponding to the row No. ID shown by the search source row No., and at this time the CPU 2A advances to step SP71.

In step SP67 the CPU 2A finds the distance between the search source coordinates and the search target coordinates (search coordinate distance D) and advances to the next step SP68.

In step SP68 the CPU 2A determines whether or not the search coordinate distance D found in step SP67 is smaller than the search coordinate distance D found in the past.

If a negative result is obtained here, this indicates that the screen text row corresponding to the row No. ID shown by the current search target row No. is separated from the screen text row corresponding to the row No. ID shown by the search source row No., and the row No. ID shown by the current search target row No. will not be a candidate for the left movement row No. L_ID. The CPU 2A at this time moves to the step SP71.

Conversely if a positive result is obtained in step SP68, this indicates that the screen text row corresponding to the row No. ID shown by the current search target row No. is near the screen text row corresponding to the row No. ID shown by the search source row No., and that the value of the row No. ID shown by the current search target row No. is a candidate for the left movement row No. L_ID. At this time, the CPU 2A advances to the next step SP69.

In step SP69 the CPU 2A saves the search coordinate distance D found in step SP67 as a new search coordinate distance D, thereby maintaining the value thereof until an even smaller search coordinate distance D is detected in the processing thereinafter. Subsequently the CPU 2A advances to the next step SP70.

In step SP70 the CPU 2A saves the value of the current search target row No. in the movement destination row No. candidate M, thereby maintaining the value of the current search target row No. until an even smaller search coordinate distance D is detected in the processing thereinafter. Subsequently the CPU 2A advances to the next step SP71.

In step SP71 the CPU 2A increments the value of the search target row No. by "1", thereby moving from the row TR of the screen text row placement table TBL corresponding to the row No. ID shown by the current search target row No. to the next TR. Subsequently the CPU 2A advances to the next step SP72.

In step SP72 the CPU 2A determines whether a search has ended regarding whether or not a screen text row exists that is positioned, and near to, the left side of the screen text row corresponding to the row No. ID shown by the search source row No., up to the row No. ID corresponding to the row TRn of the screen text row placement table TBL.

If a negative result is obtained here, this indicates that a search has not ended for a movement destination row No. candidate M up to the row No. ID of the row TRn on the screen text row placement table TBL, and at this time the CPU 2A returns to the step SP63 and repeats the processing described above for the screen text row corresponding to the row No. ID shown by a new search target row No.

Figure 26:
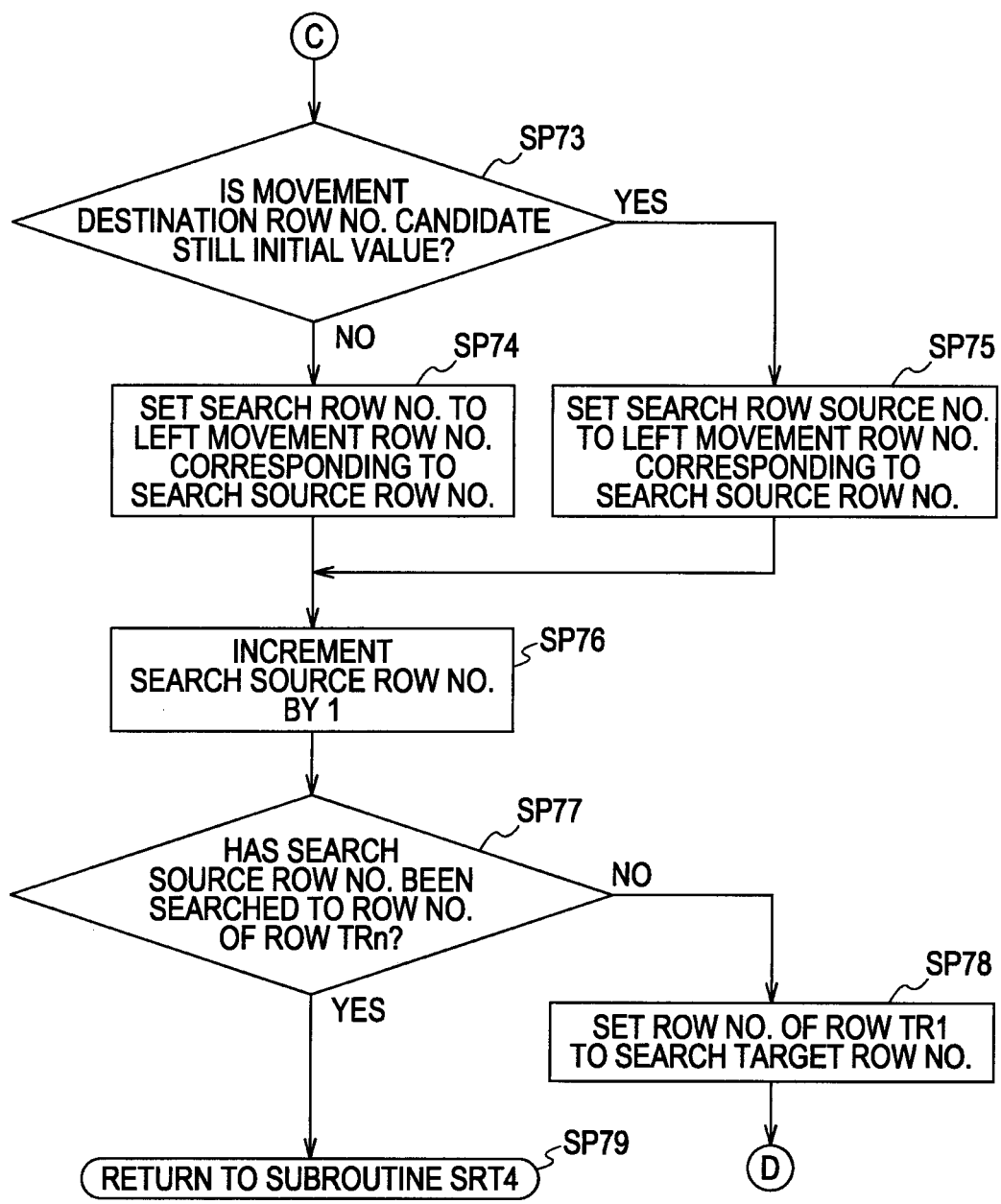
FIG. 26 is a flowchart illustrating left movement row No. setting processing procedures (part 2)

On the other hand, if a positive result is obtained in step SP72, this indicates that the search has ended for a movement destination row No. candidate M up to the row No. ID of the row TRn on the screen text row placement table TBL, and at this time the CPU 2A advances to the next step SP73 (FIG. 26).

In step SP73 the CPU 2A determines whether or not the movement destination row No. candidate M has remained as the initial value.

If a negative result is obtained here, this indicates that a screen text row has been discovered that is positioned, and near to, the left side of the screen text row corresponding to the row No. ID shown by the search source row No., and at this time the CPU 2A advances to the next step SP74.

In step SP74 the CPU 2A sets the value of the movement destination row No. candidate M as the left movement row No. L_ID that corresponds to the row No. ID shown by the search source row No., and advances to the next step SP76.

Conversely, if a negative result is obtained in step SP73, this indicates that a screen text row has not been discovered that is positioned, and near to, the left side of the screen text row corresponding to the row No. ID shown by the search source row No., and at this time the CPU 2A advances to the next step SP75.

In step SP75 the CPU 2A sets the value of the current search source row No. as the left movement row No. L_ID that corresponds to the row No. ID shown by the search source row No., and advances to step SP76.

Thus in the case that an underline is displayed under the screen text row corresponding to the row No. ID shown by the current search source row No., and that a screen text row near to the left side of the screen text row does not exist, the CPU 2A can arrange the underline from being moved from the current screen text row, even when moving the underline to the left side with the BD recorder 101 which is the playing side.

Thus, since the search processing for all of the row No. IDs of the screen text row placement table TBL has ended, in step SP76 the CPU 2A increments the search source row No. by "1", and advances to the next step SP77.

In step SP77 the CPU 2A determines whether or not the search source row No. has been searched for up to the row No. ID corresponding to the row TRn of the screen text row placement table TBL.

Now if a negative result is obtained, this indicates that the setting of the left movement row No. L_ID has not ended for all of the rows TRn of the screen text row placement table TBL, and the CPU 2A at this time move to step SP78.

In step SP78 the CPU 2A sets the row No. ID corresponding to the row TR1 of the screen text row placement table TBL and returns to step SP62, and repeats the above-described processing for the screen text row corresponding to the row No. ID shown by a new search source row No.

Conversely if a positive result is obtained in step SP77, this indicates that a search source row No. has been searched for up to the row No. ID corresponding to the row TRn of the screen text row placement table TBL, i.e. that the left movement row No. L_ID is has been set by correlating the row No. ID of all of the rows TR of the screen text row placement table TBL. At this time the CPU 2A advances to the next step SP79 and ends the left movement row No. setting sub-routine SRT3, and moves to the right movement row No. setting sub-routine SRT4 of the sub-routine SRT1 (FIG. 17).

Thus the CPU 2A in the left movement row No. setting sub-routine SRT3 is made to search for the screen text row positioned to, and near to, the left side of all of the screen text rows.

Figure 27:
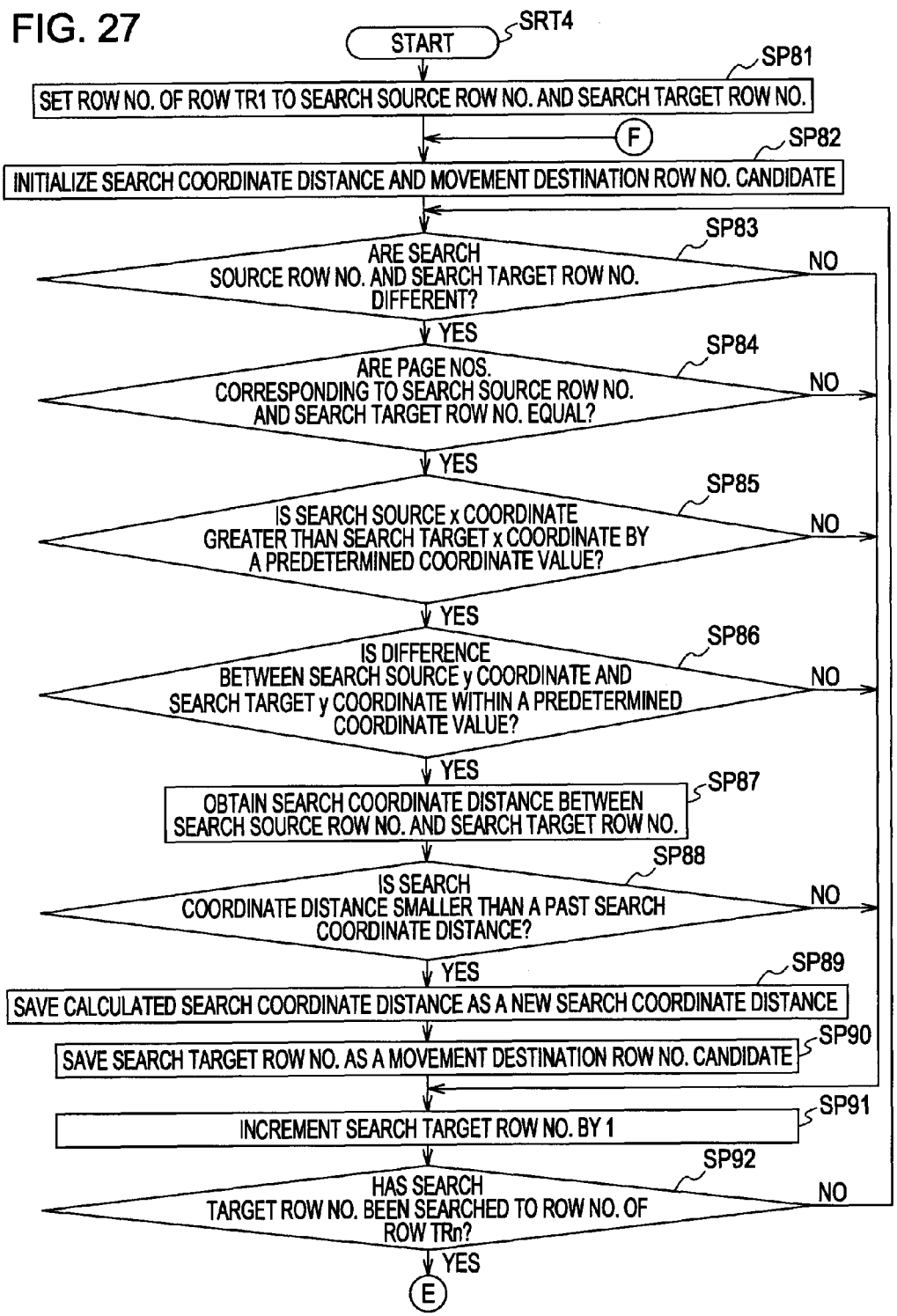
FIG. 27 is a flowchart illustrating right movement row No. setting processing procedures (part 1)

Next, the right movement row No. setting processing procedures of the sub-routine SRT4 in the screen text row placement table creating processing procedures of the sub-routine SRT1 shown in FIG. 17 will be described with reference to the flowcharts shown in FIGS. 27 and 28 and the screen text row placement table TBL shown in FIG. 18.

Now in the event that an underline is displayed under a certain text row, e.g. in the case that a pressing operation is performed on the right button via the remote controller (unshown), the right movement row No. R_ID in the screen text row placement table TBL is the value of the row No. ID corresponding to the screen text row to which the underline is to be moved to next.

The right movement row No. setting sub-routine SRT4 is roughly similar processing as the left movement row No. setting sub-routine SRT3, whereby the points that differ from the left movement row No. setting sub-routine SRT3 will be described below.

From step SP81 through SP 84, the CPU 2A executes processing similar to that of step SP61 through SP64, and advances to step SP85.

In step SP85 the CPU 2A determines whether or not the search target x-coordinate X2 is greater than the search source x-coordinate X1 by a predetermined coordinate value (e.g. equivalent to 30 pixels worth).

If a positive result is obtained here, this indicates that for example the search target row No. is not in the state of indentation by a predetermined number of characters worth in the x-direction as when the screen text row corresponding to the row No. ID shown by the search source number is positioned at the beginning of the paragraph, but that the screen text row corresponding to the row No. ID shown by the search target row No. is positioned farther than the number of characters worth of the indentation to the right side of the screen text row corresponding to the row No. ID shown by the search source row No., and at this time the CPU 2A advances to the next step SP86.

Conversely, if a negative result is obtained in step SP85, this indicates that the screen text row corresponding to the row No. ID shown by the search target row No. is not positioned farther than the number of characters of indentation to the left side of the screen test row corresponding to the row No. ID shown by the search source row No., and that for example the screen text row corresponding to the row No. ID shown by the search target row No. is in the state of being indented by only a predetermined number of characters worth in the x-direction.

Thus the screen text row corresponding to the row umber ID shown by the search target row No. is not applicable to the screen text row that is position to, and near to, the right side of the screen text row corresponding to the row No. ID shown by the search source row No., and at this time the CPU 2A advances to step SP71.

Figure 28:
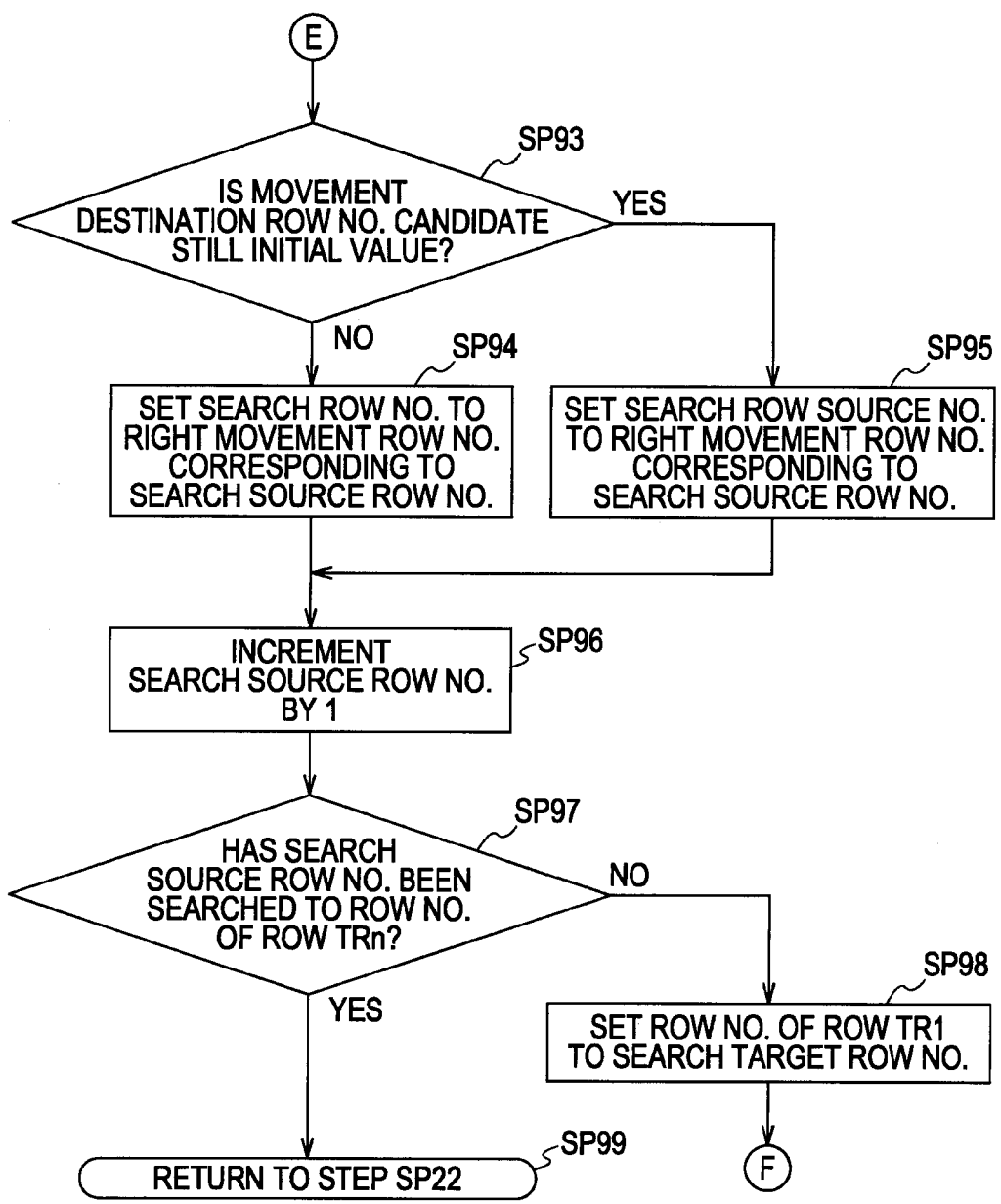
FIG. 28 is a flowchart illustrating right movement row No. setting processing procedures (part 2)

From step SP86 through SP 93, the CPU 2A executes processing similar to that of steps SP66 through SP73 (FIGS. 25 and 26), and advances to step SP94 (FIG. 28).

In step SP94 the CPU 2A sets the value of the movement destination row No. candidate M as the right movement row No. R_ID corresponding to the row No. ID shown by the search source row No., and advances to the next step SP96.

Conversely, if a negative result is obtained in step SP93, this indicates that a screen text row has not been discovered that is positioned, and near to, the right side of the screen text row corresponding to the row No. ID shown by the search source row No., and at this time the CPU 2A advances to the next step SP95.

In step SP95 the CPU 2A sets the value of the current search source row No. as the right movement row No. R_ID that corresponds to the row No. ID shown by the search source row No., and advances to step SP96.

Thus in the case that an underline is displayed under the screen text row corresponding to the row umber ID shown by the current search source row No., and that the screen text row does not exist which nears the right side of the screen text row, even in the case wherein instructions are given to move the underline to the right side at the BD recorder 101 which is the playing side, the CPU 2A can prevent the underline from being moved from the current screen text row.

From step SP96 through SP98, the CPU 2A executes processing similar to that of steps SP76 through SP78, advances to the next step SP99 and ends the right movement row No. setting sub-routing, and advances to step SP23 of the sub-routine SRT1 (FIG. 17).

Figure 9:
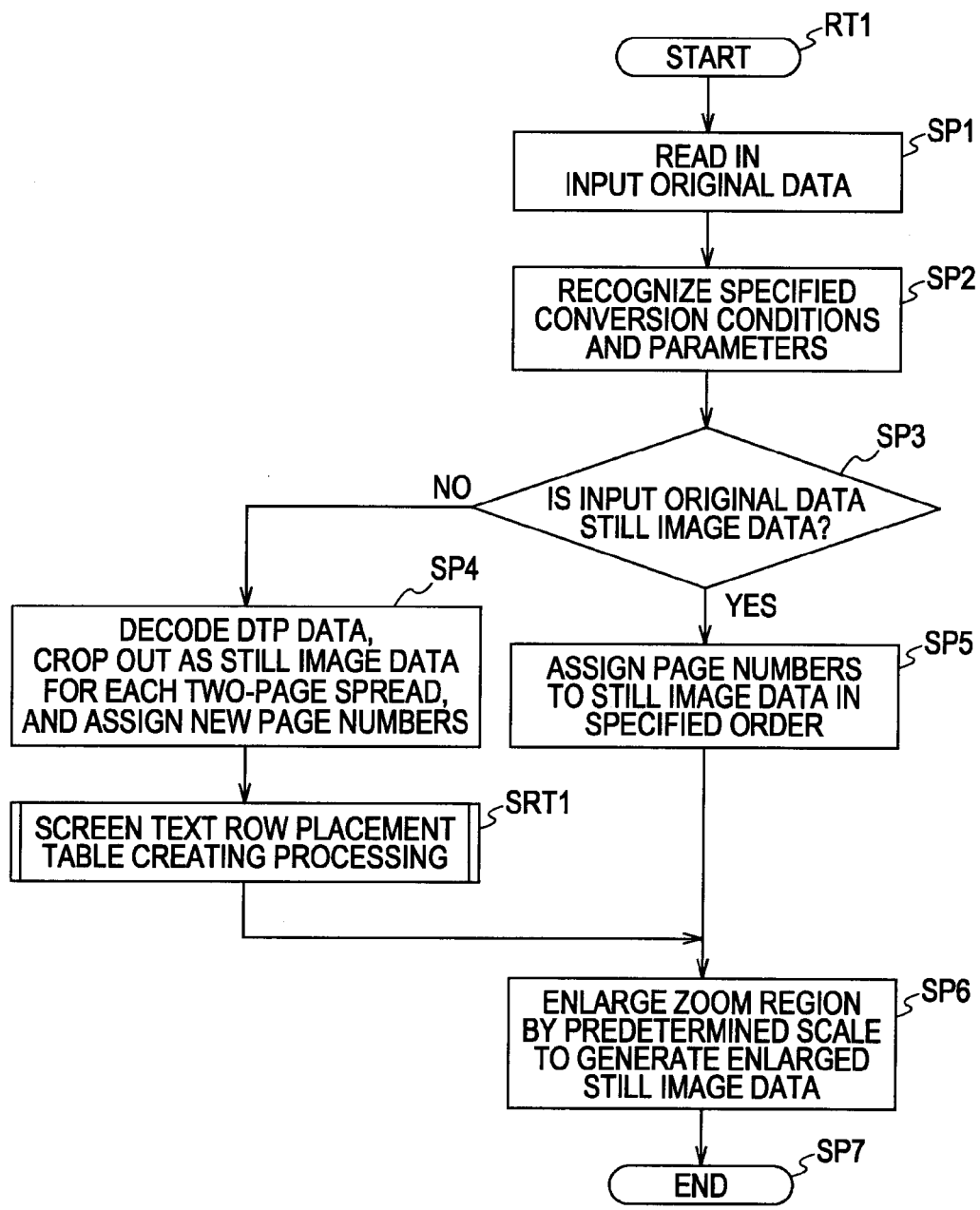
FIG. 9 is a flowchart illustrating data conversion processing procedures.

In step SP23 the CPU 2A ends the sub-routine SRT1, and returns to step SP6 of the routine RT1 (FIG. 9).

Thus, in the right movement row No. setting sub-routine SRT4, the CPU 2A searches the screen text row position to, and near to, the right side of all of the screen text rows.

Also, by executing the screen text row placement table creating processing procedures, the CPU 2A creates the screen text row placement table TBL in order to freely move the underline rendered under the screen text row to another position of screen text row.

1-6. Data Recording Processing Procedures

Figure 29:
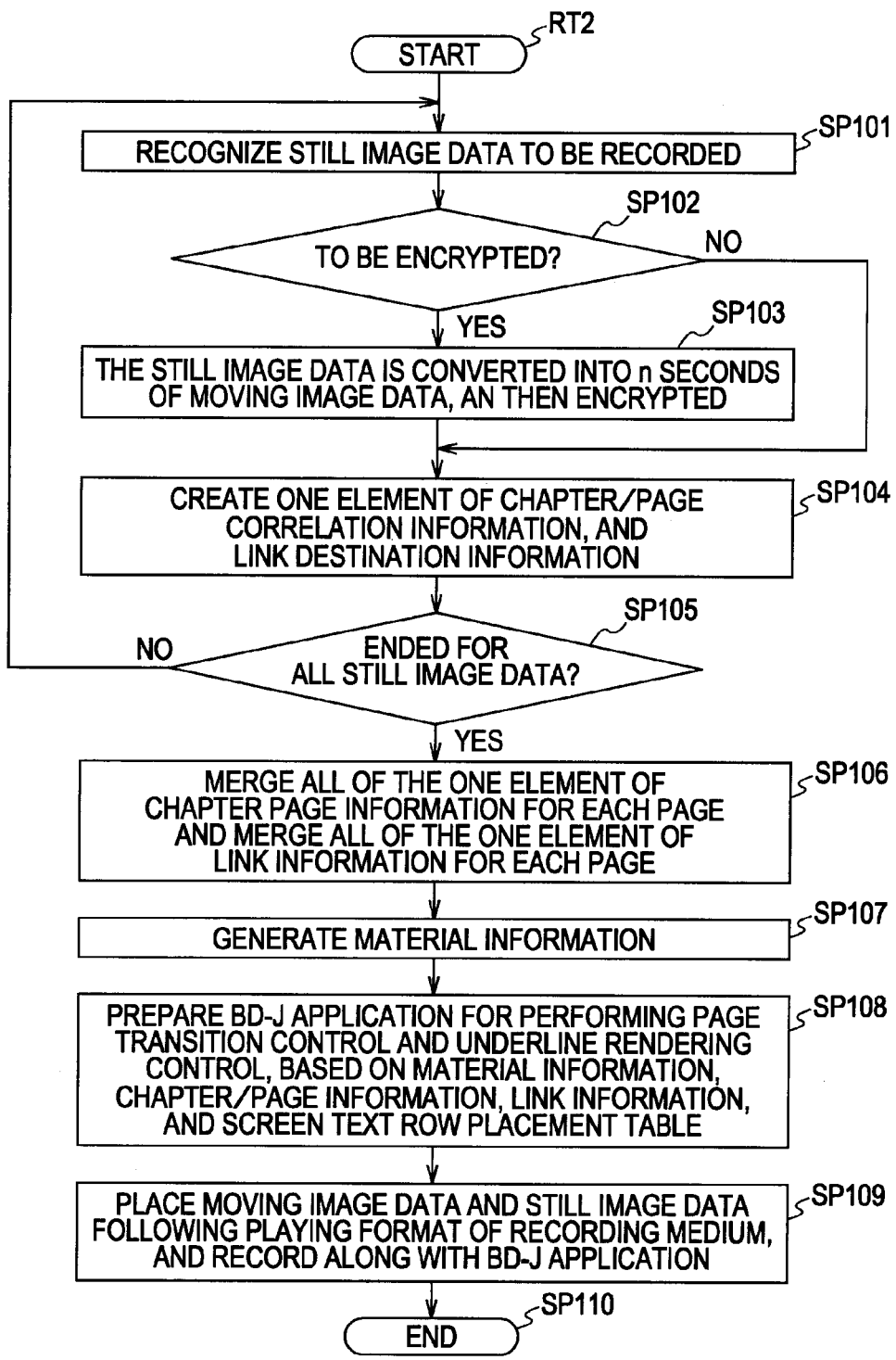
FIG. 29 is a flowchart illustrating encryption selection and data recording processing procedures.
Figure 30:
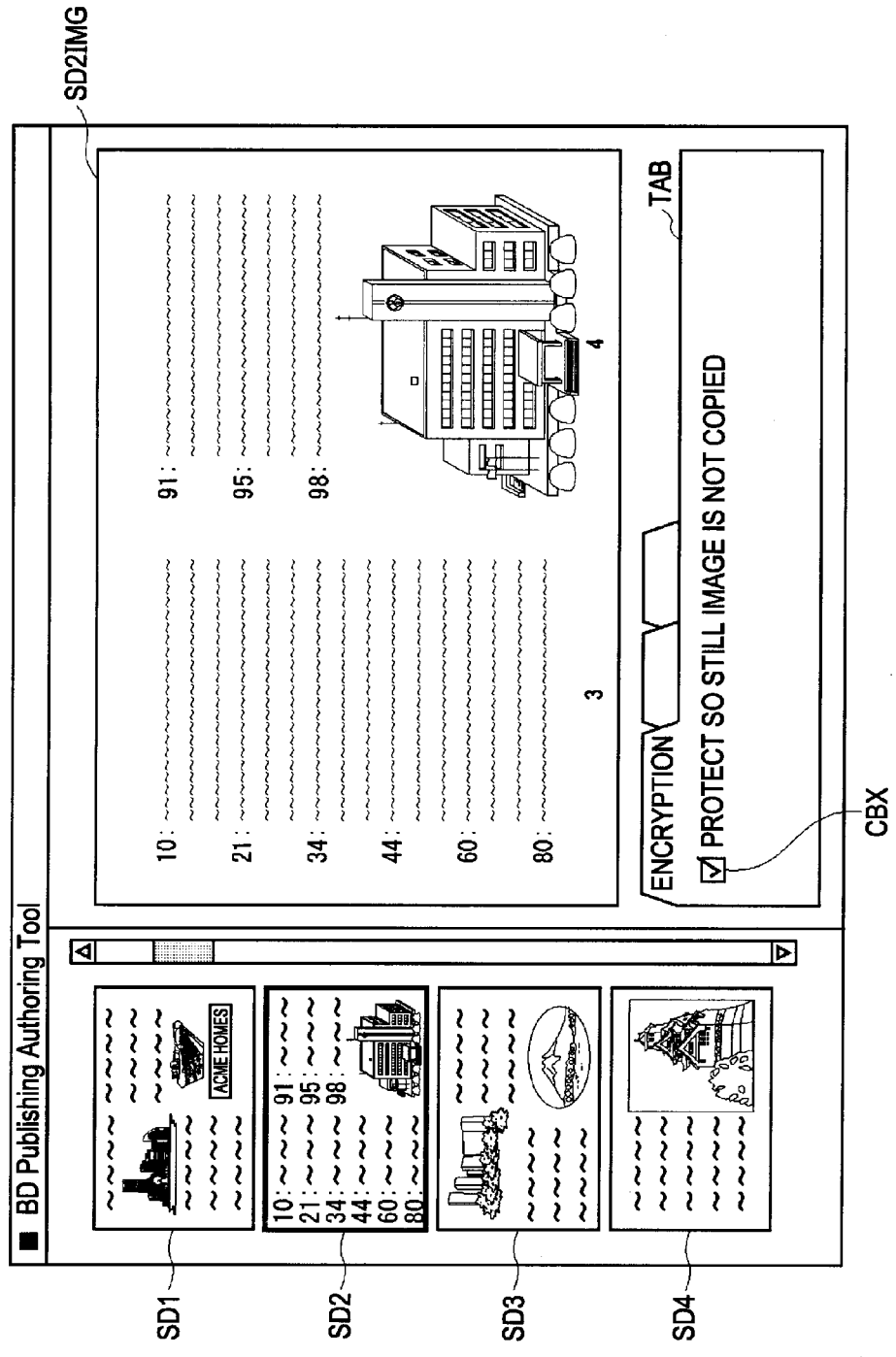
FIG. 30 is a schematic drawing illustrating an encryption object selection screen.

Next, data recording processing procedures following the CPU 2A of the control unit 2 of the disc production device 1 converting the original publication content data C1 into new publication content data C3, up to recording in a Blu-ray disc 5 and creating a disc for commercial sale, will be described following the flowchart shown in FIG. 29.

The CPU 2A starts from the start step in routine RT2, goes to the next step SP101, recognizes the multiple still image data SD1 through SD4, through SD3A, and so on, in order, and goes to the next step SP102.

In step SP102, the CPU 2A determines whether or not the still image data SD is the object of encryption. In the event that a negative result is obtained here, this means that no instruction has been given to encrypt that still image data SD, which is to say that the producer regards that the still image data SD does not have to be made an object of copyright protection, so in this case the CPU 2A advances to the next step SP104.

On the other hand, in the event that a positive result is obtained here, this means that an instruction has been given to encrypt that still image data SD, which is to say that the producer regards that the still image data SD should be made an object of copyright protection, so in this case the CPU 2A advances to the next step SP103.

Now, the CPU 2A follows predetermined authoring software to display an encryption object selection screen G1 in the monitor 10, where the producer selects which still image data SD to set as an object of encryption. With the encryption object selection screen G1, the still image data SD1 through SD4 and so on to be recorded are displayed placed on the left side, with the frame of the still image data SD2 of the second page, for example, being displayed in a highlighted manner, and the display image SD2IMG of the still image data SD2 being displayed at a predetermined size. Also, with the encryption object selection screen G1, a tab TAB for selecting whether or not to encrypt the still image data SD2IMG is provided below the display image SD2IMG, and a check mark can be placed in a checkbox therein.

Accordingly, the producer can place a check mark in the checkbox in the tab TAB in the event that the producer regards that the still image data SD2 should be made an object of copyright protection by way of the display image SD2IMG of the encryption object selection screen G1, whereby the still image data SD2 can be set as an object of encryption.

In step S103, in the event that the still image data SD recognized in step SP101 has been set as an object of encryption by way of the encryption object selection screen G1, the CPU 2A converts the still image data SD into n seconds of moving image data, subjects to encryption processing following a predetermined encryption method, and advances to the next step SP104.

In step SP104, the CPU 2A creates one element of chapter/page correlation information CPi in page increments corresponding to chapter Nos. and link destination information Li, based on the still image data SD making up the publication content data C1, and advances to the next step SP105.

In step SP105, the CPU 2A determines whether or not creating of one element of chapter/page correlation information CPi in page increments corresponding to chapter Nos. and link destination information Li has been completed for all still image data SD making up the publication content data C1. In the event that a negative result is obtained here, this means that creating of one element of chapter/page correlation information CPi in page increments corresponding to chapter Nos. and link destination information Li has not been completed for all still image data SD making up the publication content data C1, so in this case the CPU 2A returns to step SP101 and the above-described processing is repeated.

In the other hand, in the event that a positive result is obtained here, this means that creating of one element of chapter/page correlation information CPi in page increments corresponding to chapter Nos. and link destination information Li has been completed for all still image data SD making up the publication content data C1, so in this case the CPU 2A advances to the next step SP106.

In step SP106, the CPU 2A merges all of the one elements of chapter/page correlation information CPi created in page increments corresponding to chapter Nos. for each still image data SD, and also merges all of the one elements of link information Li created in page increments corresponding to chapter Nos. for each still image data SD, thereby generating chapter/page correlation information CPi and link information Li, and advances to the next step SP107.

In step SP107, the CPU 2A performs processing for all still image data SD making up the publication content data C1, wherein objects of encryption are converted into moving image data, and objects of non-encryption are all formed into chapters in the state of being still image data SD without change, so as to generate material 1 through material 10, material 11 through material XX, and so on (FIG. 12), whereby material information Mi in which the above-described material Nos. and location saved are correlated (FIG. 14) is generated, and the flow advances to the next step SP108.

In step SP108, the CPU 2A prepares a BD-J application programmed to execute page transition control and underline rendering control based on transition control information made up of the material information Mi, chapter/page correlation information CPi, and link information Li, and screen text row placement table TBL, and advances to step SP109.

In step SP109, the CPU 2A places the moving image data of material 1 and still image data SD of material 10, material 11 through material XX, and so on, following the format of the Blu-ray disc 5, further records this in the Blu-ray disc 5 along with the BD-J application, page transition control information, and screen text row placement table TBL, and then advances to the next step SP110 and ends processing.

Accordingly, the CPU 2A of the control unit 2 can record new publication content data C3 made up of the material 1 through material 10, material 11 through material XX, and so on, generated by forming chapters of all moving image data and still image data, in a Blu-ray disc 5 in a page-transition-control capable state by the BD recorder 101 at the playing side.

Also, accordingly, the CPU 2A of the control unit 2 is capable of recording the new publication content data C3 in the Blu-ray disc 5 with the BD recorder 101 at the playing side, in such a state that underlines can be displayed at image text rows included in the moving image data and still image data of the new publication content data C3, and the underlines can be subjected to moving control.

1-7. Example of Storing Data in Recording Medium

Figure 31:
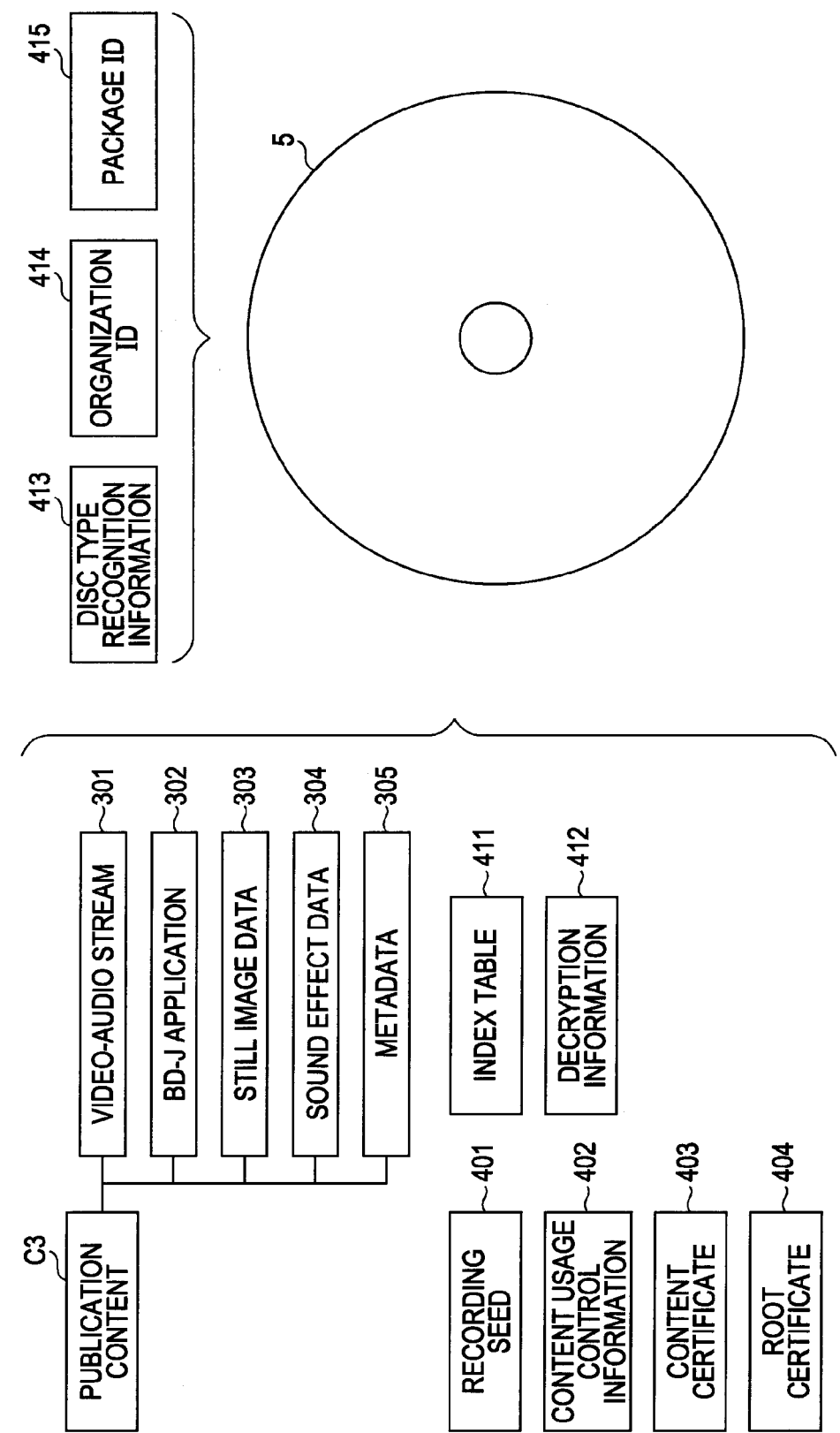
FIG. 31 is a schematic drawing illustrating an example of storing data in a recording medium.

An example of data storage in the Blu-ray disc 5 produced as a commercially-sold disc in this way will be described with reference to FIG. 31. The new publication content data C3 obtained by data conversion from the original publication content data C1 is stored in the Blu-ray disc 5.

The new publication content data C3 includes a video/audio stream 301 made up of encrypted moving image data and corresponding audio data made up of the new publication content data C3, a BD-J application 302 which operates when the Blu-ray disc 5 is being played, still image data 303 such as still images SD1, SD3, SD3A, and so forth, which are subjected to page transition control by the BD-J application 302, sound effect data 304 for outputting predetermined sound effects and voice audio for screen text rows on a screen displayed by the BD-J application 302, and metadata 305 made up of various types of information such as the price of the disc and so forth, and also the above-described page transition control information.

Also stored in the Blu-ray disc 5 is a recording seed 401 for generating key data used to decipher the encrypted moving image data in the video/audio stream 301, and content usage control information 402, made up of copy restriction information, play control information, and so on, corresponding to the new publication content data C3.

Further, the Blu-ray disc 5 stores a content certificate 403 including a hash value for verifying the validity of the new publication content data C3, a hash value for a root certificate 404, and so forth, and the root 404 which is a public certificate issued by a third party entity.

In addition, the Blu-ray disc 5 stores an index table 411 defining the play order and the like of the new publication content data C3, and decryption information 412 for decrypting the video/audio stream 301 at the playing side, disc type recognition information 413 for distinguishing the disc type, an organization ID (Identification) 414 indicating the organization which has generated the new publication content data C3, so as to individually identify the Blu-ray disc 5, and a package ID 415 for identifying the manufacturing package.

1-8. Overall Configuration of BD Playing System

Figure 32:
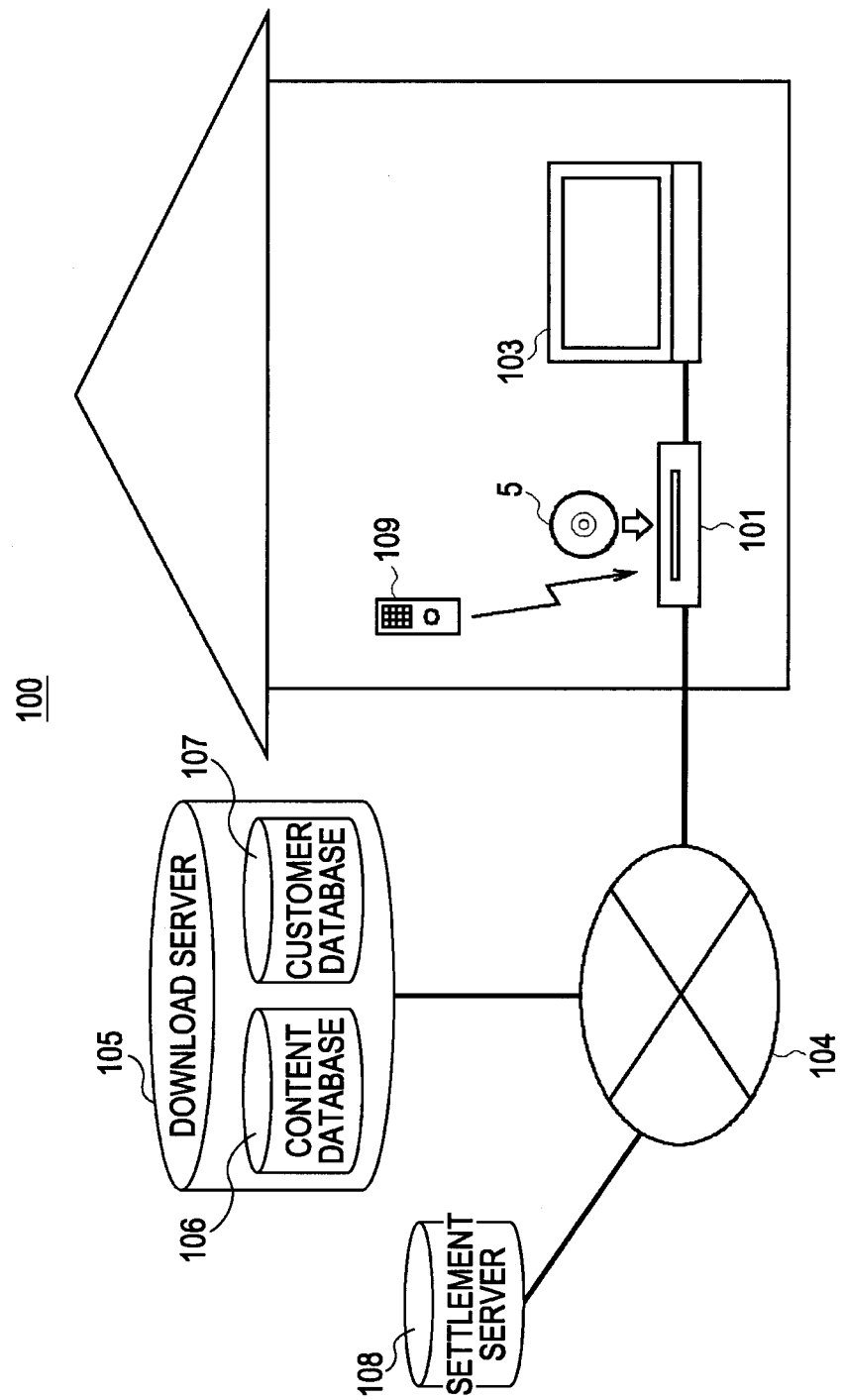
FIG. 32 is a schematic drawing illustrating the overall configuration of a Blu-ray playing system.

Next, the overall configuration of a BD playing system for playing the Blu-ray disc 5 which is a commercially-sold disc, will be described with reference to FIG. 32. In FIG. 32, reference numeral 100 denotes the BD (Blu-ray) playing system as a whole, wherein, upon playing the Blu-ray disc 5 with a BD recorder 101 installed in the home, the playing results are displayed on a television receiver 103 connected thereto by, for example, an HDMI (High Definition Multimedia Interface) or the like.

Also, the BD recorder 101 is capable of performing online shopping with the BD-J application 302 (FIG. 31) recorded in the Blu-ray disc 5, and at this time, communicates with a download server 105 on a network 104. The download server 105 has a content database (hereinafter, abbreviated to "content DB") 106 in which is information of the publication content data C1 (videos, photos, prices, number in stock, and so forth), and a customer database (hereinafter, abbreviated to "customer DB") 107 holding customer information (names, addresses, and credit card information).

In the event of having downloaded a publication content data C1, the BD recorded 101 executes settlement processing via a settlement server 108 on the network 104 used jointly with other online shopping vendors, for settlement of the download. Note that the BD recorder 101 is arranged to perform playing control of the Blu-ray disc 5, and control of GUIs provided by the BD-J application 302, by way of a remote controller 109.

1-8-1. Hardware Circuit Configuration of BD Recorder

Figure 33:
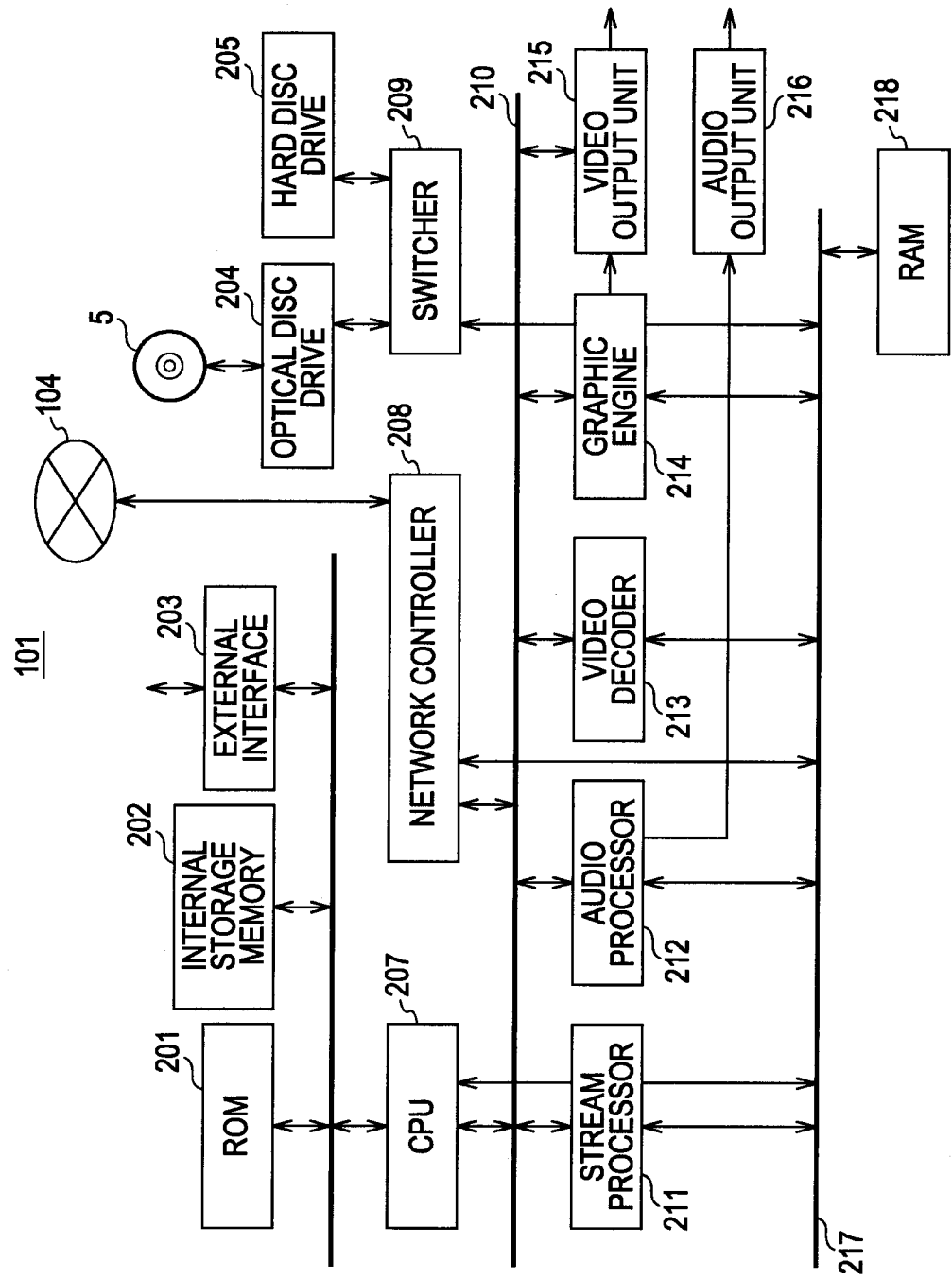
FIG. 33 is a schematic block diagram illustrating the circuit configuration of a Blu-ray recorder.
Figure 34:
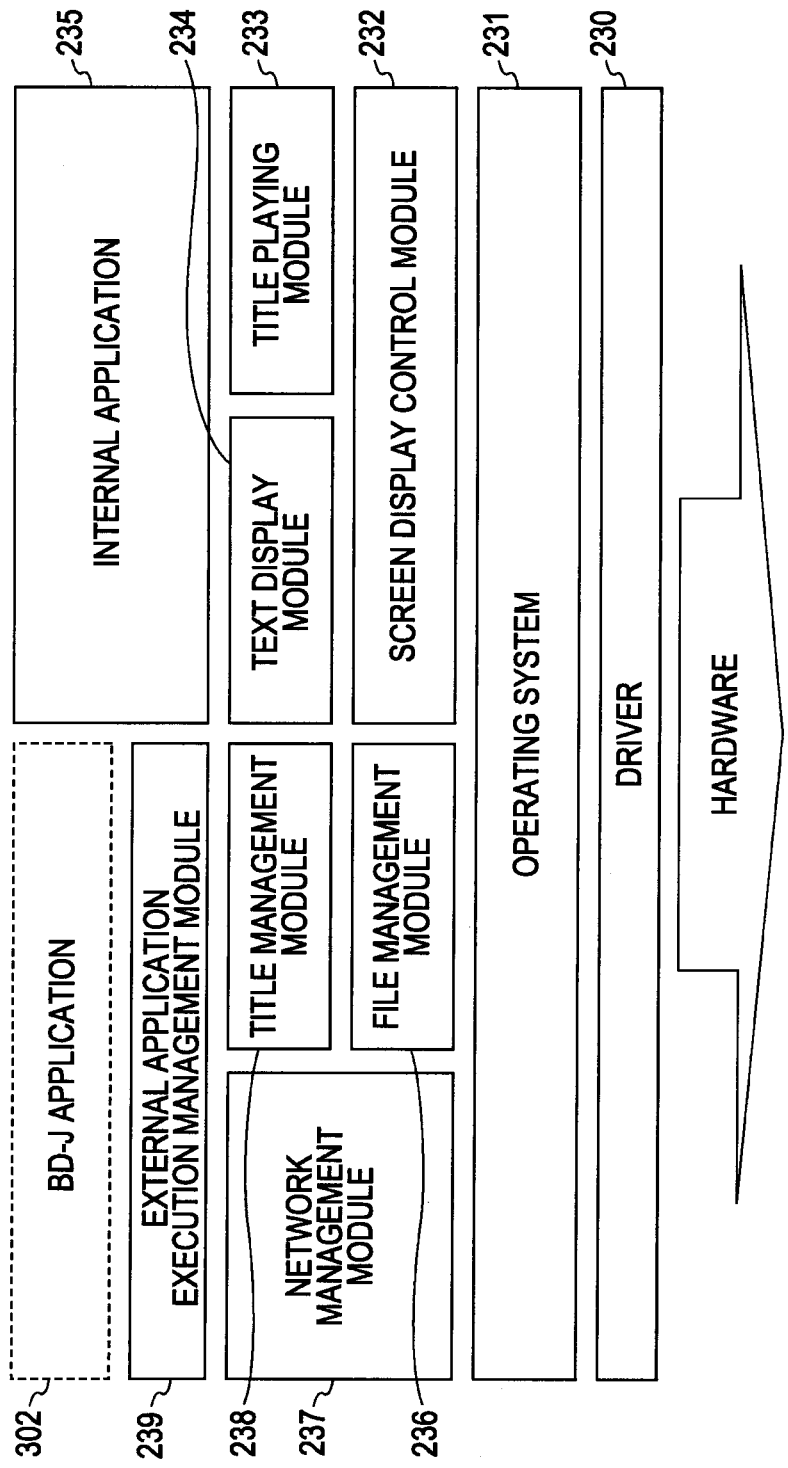
FIG. 34 is a schematic drawing illustrating the software configuration of a Blu-ray recorder.

As shown in FIG. 33, the BD recorder 101 is arranged so that a CPU 207 starts basic programs stored in ROM 201 and various types of application programs stored in a hard disk drive 205 on RAM 218, and controls each of the portions of the BD recorder 101 following the basic programs and various types of applications programs, so as to execute recording/playing processing and so forth.

In actual operations, upon a Blu-ray disc 5 being inserted into an optical disc drive 204, the CPU 207 reads out the video/audio stream 301, BD-J application 302, still image data 303, sound effect data 304, and metadata 305, recorded in the Blu-ray disc 5, via a switcher 209.

The CPU 207 transmits the video/audio stream 301 to a stream processor 211 via a memory bus 217, where it is subjected to processing such as decryption, and transmits the moving image data obtained as a result thereof to a video decoder 213 and also transmits the audio data to an audio processor 212.

The video decoder 213 displays playing video obtained by decoding the moving image data on the television receiver 103 via a graphics engine and video output unit 215. The audio processor outputs playing audio obtained by decoding the audio data, and voice audio included in the sound effect data 304, from speakers of the television receiver 103 via an audio output unit 216.

Note that when having downloaded various types of contents from sites on the network 104 using the BD-J application 302 recorded in the Blu-ray disc 5, the CPU 207 can store such contents in built-in memory 202 formed of semiconductor memory or the like for example, or USB (Universal Serial Bus) memory (not shown) connected via an external interface 203. Further, in the event that the content being downloaded is great in size, the CPU 207 can store this content in a hard disk drive 205 via the switcher 209, rather than in the built-in memory 202 or USB memory.

1-8-2. Software Configuration of BD Recorder

Next, description will be made of a software configuration which the CPU 207 of the BD recorder 101 realized following application programs. In actual operations, an operating system 231 performs input/output of the hardware of the BD recorder 101 via a driver 230, and also manages resources of the higher order programs.

A screen display module 232 which is of higher order than the operating system 231 performs rendering following having decided what sort of image to actually be rendered, at the time of performing display of titles and text in accordance with a rendering request, and so on. A title playing module 233 which is of higher order than the screen display control module 232 governs control at the time of playing GUI titles provided by a built-in application 235, and a text display module 234 governs control regarding text rendering instructions from the built-in application 235.

Also, a network management module 237 which is of higher order than the operating system 231 performs control at the time of accessing the download server 105 or settlement server 108 using the network 104. A title management module 238 operates files on the operating system 230 via a like management module 236, thereby managing the title of the file.

The BD-J application 302, which serves as an external application that has been read out from the Blu-ray disc 5, performs exchange between the main unit programs of the BD recorder 101 via an external application execution management module 239 serving as, for example, a Java (registered trademark) Virtual Machine.

1-8-3. Configuration of Screen Display

Next, the configuration of a screen display at the time of displaying content data which the CPU 207 of the BD recorder 101 has read out from the Blu-ray disc 5 on the television receiver 103 will be described. As shown in FIG. 35, the screen displayed on the television receiver 103 has a plane configuration, made up of a moving image plane MPL and graphic plane GPL, each of which the resolution is 1920 pixels×1080 pixels.

In actual operations, upon a Blu-ray disc 5 being inserted into the optical disc drive 204, the CPU 207 of the BD recorder 101 converts the video/audio stream 301 recorded in the Blu-ray disc 5 into moving image data via the steam processor 211, and sends this to the video decoder 213. The video decoder 213 renders the moving image data on the moving image plane MPL, and sends the moving image plane MPL to the video output unit 215.

The CPU 207 also sends the still image data 303 read out from the Blu-ray disc 5 to the graphic engine 214. The graphic engine 214 renders the still image data 303 on the graphic plane GPL, and sends the graphic plane GPL to the video output unit 215. Also, in the event of displaying underlines as to screen text rows displayed on the television receiver 103, the graphic engine 214 further renders underlines on the graphic plane GPL, and sends the graphic plane GPL to the video output unit 215.

Figure 36:
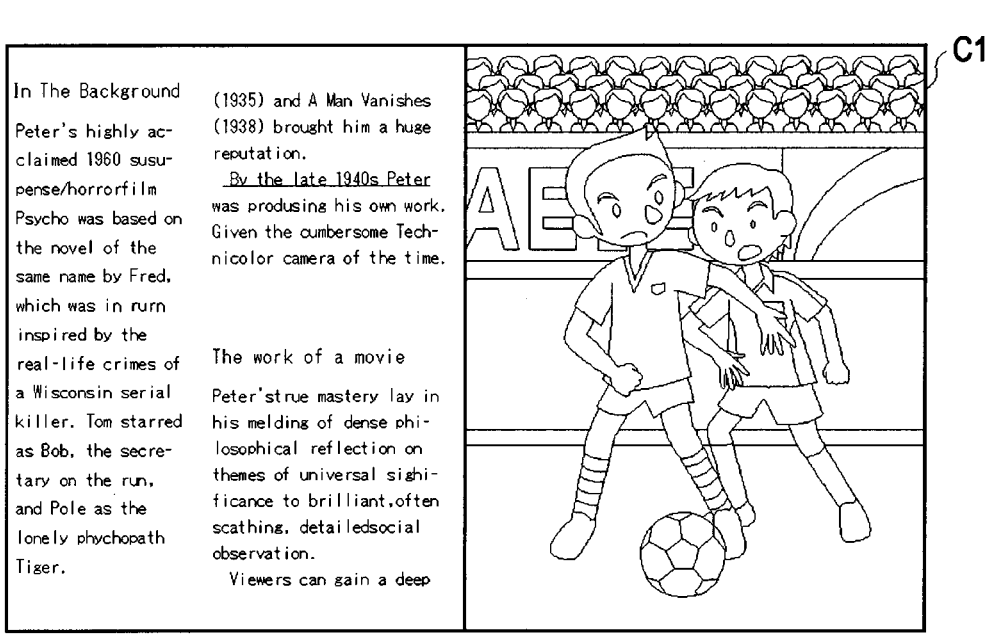
FIG. 36 is a schematic drawing illustrating the configuration of a screen display (part 2)

Next, the video output unit 215 generates the composited image CI shown in FIG. 36 by compositing the supplied moving image plane MPL and graphic plane GPL such that the moving image plane MPL is situated behind the graphic plane GPL, and outputs the composited image CI to the television receiver 103 for display.

1-8-4. Screen Display Processing Procedures

Figure 37:
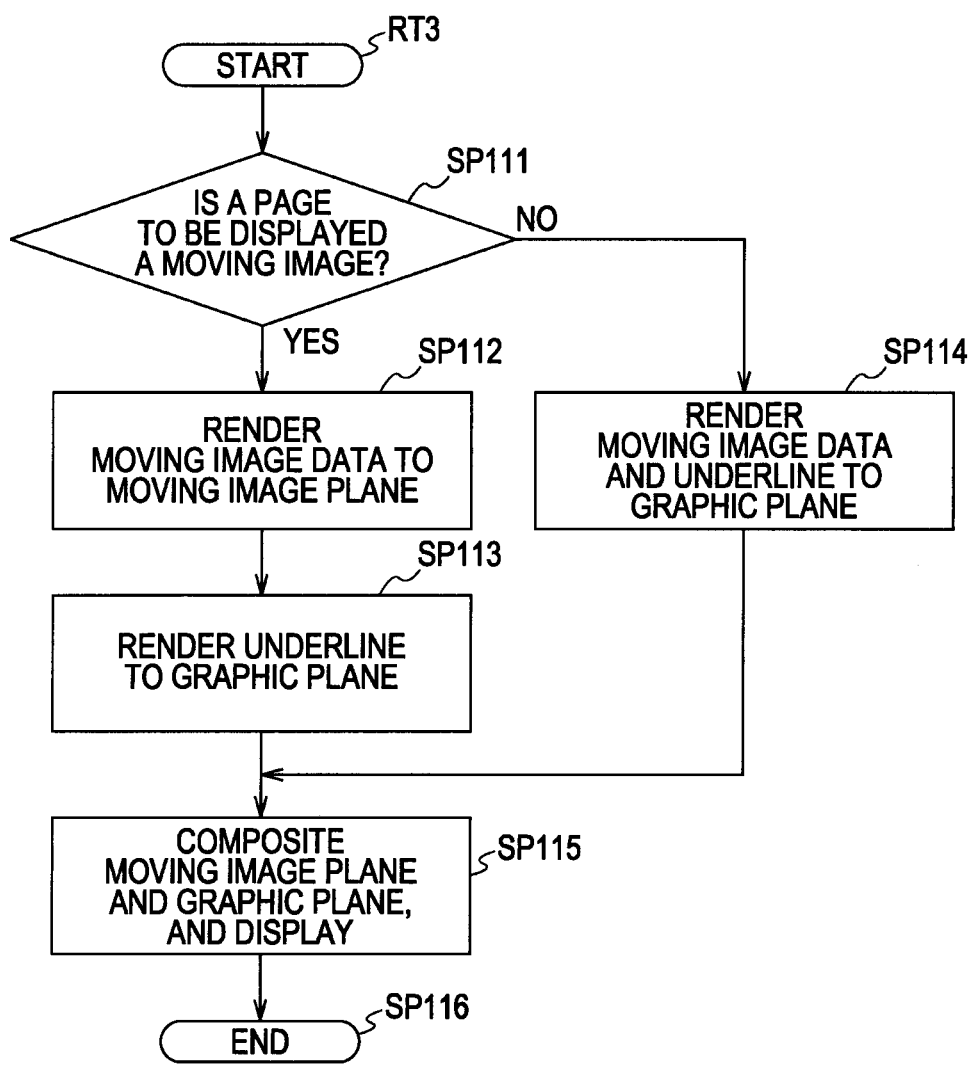
FIG. 37 is a flowchart illustrating screen display processing procedures.

Next, the screen display processing procedures for displaying underlines as to moving image data or still image data will be described with reference to the flowchart shown in FIG. 37.

The CPU 207 of the BD recorder 101 starts from the start step of routine RT3, goes to the next step SP111, and determines whether or not a page to be displayed is a moving image. In the event that a positive result is obtained here, this means that the page to be displayed is a moving image, and in this case the CPU 207 advances to step S112.

In step SP112, the CPU 207 controls the video recorder 213 (FIG. 33) so as to render moving image data on the moving image plane MPL, and advances to the next step SP113.

In step SP113, the CPU 207 controls the graphic engine 214 so as to render underlines on the graphic plane GPL, and advances to the next step SP115.

On the other hand, in the event that a negative result is obtained here, this means that the page to be displayed is a still image, and in this case the CPU 207 advances to step S114.

In step SP114, the CPU 207 controls the graphic engine 214 so as to render still image data and underlines on the graphic plane GPL, and advances to the next step SP115.

In step SP115, the CPU 207 controls the video output unit 215 to generate a composited image CI by compositing the moving image plane MPL and graphic plane GPL, outputs the composited image CI to the television receiver 103 for display, and goes to the next step SP116 where the processing ends.

Accordingly, in the event that the page to be displayed is a moving image, the television receiver 103 displays the composited image CI where the moving image data rendered on the moving image plane MPL and the underlines rendered on the graphic image plane GPL have been composited. On the other hand, in the event that the page to be displayed is a still image, nothing is rendered on the moving image plane MPL, and the television receiver 103 displays the composited image CI where the still image data and underlines rendered on the graphic image plane GPL, and the moving image plane MPL, have been composited. Thus, the BD recorder 101 can display underlines on pages which are moving images, and also display underlines on pages which are still images as well.

1-9. Playing Processing Procedures

Next, the playing processing procedures at the time of the BD recorder 101 playing the Blu-ray disc 5 will be described with reference to the flowchart shown in FIG. 38. The CPU 207 of the BD recorder 101 starts from the start step of routine RT4, goes to the next step SP121, and upon recognizing that a Blu-ray disc 5 which is a recording medium has been inserted to the optical disc drive 204, advances to the next step SP122.

In step SP122, the CPU 204 makes reference to the index table 411 (FIG. 31) recorded in the Blu-ray disc 5, and after having identified the material 1 (FIG. 12) to be played first, advances to the next step SP123.

In step SP 123, the CPU 207 determines whether or not there is a BD-J application 302 to be executed at the same time as the playing of the material 1 in the Blu-ray disc 5. In the event that a negative result is obtained here, this means that there is no BD-J application 302 to be executed at the same time as the playing of the material 1 in the Blu-ray disc 5, and the material 1 should be played normally, so in this case the CPU 207 advances to the next step SP130, the material 1 is played normally, and the flow goes to step SP131 and processing ends.

On the other hand, in the event that a positive result is obtained in step SP123, this means that there is a BD-J application 302 to be executed at the same time as the playing of the material 1 in the Blu-ray disc 5, so in this case, the CPU 207 of the BD recorder advances to the next step SP124.

In step SP124, the CPU 207 starts up the BD-J application 302 recorded in the Blu-ray disc 5 beforehand, and advances to the next step SP125.

In step SP125, the CPU 207 reads out the material information Mi, chapter/page correlation information CPi, and link information Li, recorded in the Blu-ray disc 5, and advances to the next step SP126.

In step SP126 the CPU 207 reads out the page No. of the page which had been open the last time, from the internal storage memory 202 (FIG. 33) or USB memory (not shown) connected via the external interface 203, and advances to the next step SP127.

In step SP127, the CPU 207 starts playing from the top of the chapter of the page with the page No. read out in step SP 126, and advances to the next step SP128.

In step SP128, upon coming to the end of the chapter of the page currently being played, the CPU 207 temporarily stops the playing state and holds the display state as to the last frame image (in the event that a still image is being played here, the first frame image), and advances to the next step SP129.

In step SP129, the CPU 207 keeps the display state as to the last frame image held, and determines whether or not a predetermined amount of time (e.g., 10 seconds) has elapsed. In the event that a negative result is obtained here, this means that the predetermined amount of time has not yet elapsed, and in this case the CPU 207 of the BD recorder 101 stands by until the predetermined amount of time elapses.

On the other hand, in the event that a positive result is obtained here, this means that the predetermined amount of time has already elapsed with the display state in step SP128 as to the last frame image held, and in this case the CPU 207 goes to step SP127. In this case as well, the predetermined amount of time has already elapsed, so in step SP127 the next page is searched based on the page transition control information (described in detail later) by performing the same processing as when a "Next" instruction has been provided, and the playing processing is started from the top of the chapter of the next page, and the subsequent processing is repeated.

1-10. Underline Rendering Control Processing Procedures

Figure 41A:
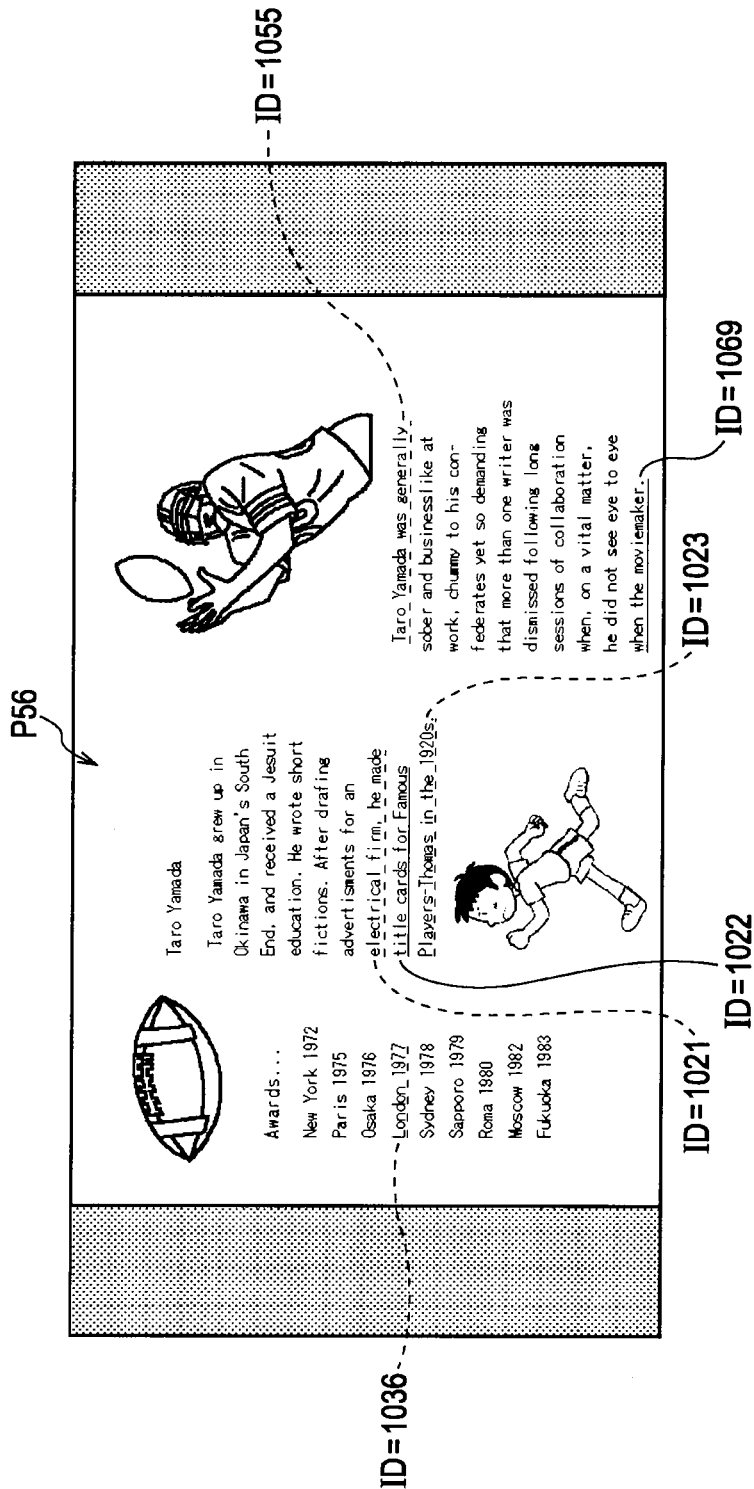
FIGS. 41A and 41B are schematic drawings illustrating an example of underline rendering and page transition.
Figure 41B:
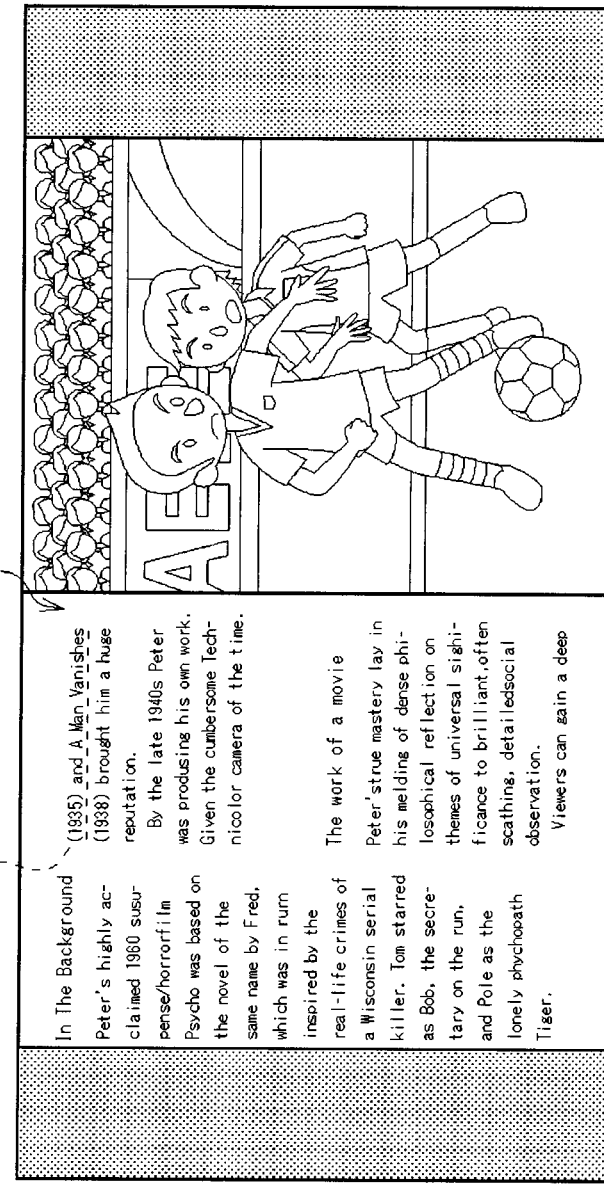

Next, description will be made regarding underline rendering control processing wherein the BD recorder 101 plays a Blu-ray disc 5, renders underlines as to displayed screen text, and moves the underlines in accordance with button pressing operations of the user, with reference to the flowcharts in FIGS. 39 and 40, and the page displayed on the television receiver 103 shown in FIGS. 41A and 41B. Note that the CUP 207 of the BD recorder 101 is arranged such that, event in the event that the user does not perform a button pressing operation, the underline is moved to the screen text row one row below in an automatic manner if a predetermined amount of time elapses.

The CPU executes the steps SP121 through SP127 of the playing processing procedures (FIG. 38), and after playing form the top of the chapter of the page with the page No. read out in step SP126, starts the routine RT5.

The CPU 207 starts from the starting step of the routine RT5 and goes to the next step SP141, makes reference to the screen text row placement table TBL, obtains the row No. ID corresponding to the first screen text row in the page with the page No. read out in step SP126 (FIG. 38), and goes to the next step SP142.

In step SP142, the CPU 207 renders an underline of a length of screen text string width DIS_W from a position indicated by the screen character position x-coordinate DIS_CX, and screen character position y-coordinate DIS_CY corresponding to the row No. ID obtained in step SP141, and advances to the next step SP143.

In step SP143, the CPU 207 determines whether or not information regarding the saved location of audio data is described in the audio saving location AS corresponding to the row No. ID. In the event that a positive result is obtained here, this means that there is voice audio corresponding to the row No. ID, so in this case the CPU 207 advances to the next step SP144, and reads out and outputs the voice audio data from the saving location indicated by the audio saving location AS.

On the other hand, in the event that a negative result is obtained here, this means that no voice audio corresponding to the row No. ID exists, so in this time the CPU 207 advances to step SP145.

In step SP145, the CPU 207 determines whether or not there has been a pressing operation performed for some button while the page is being played and displayed. In the event that a negative result is obtained here, this means that no pressing operation has been performed for any button while the page is being played and displayed, so in this case the CPU 207 advances to step SP146, and determines whether or not a predetermined amount of time (e.g., 5 seconds) has elapsed.

In the event that a negative result is obtained, this means that the predetermined amount of time has not elapsed yet, so in this case the CPU 207 advances to step SP145 and stands by for button pressing operations until the predetermined amount of time elapses.

On the other hand, in the event that a positive result is obtained in step SP146, this means that the predetermined amount of time has already elapsed with the display state of the underline in step SP142 maintained, so in this case, the CPU 207 advances to step SP162, and automatically moves the underline to the screen text row one row below.

On the other hand, in the event that a positive result is obtained in step SP145, this means that a pressing operation has been performed for some button while the page is being played and displayed, so in this case the CPU 207 advances to step SP 147.

In step SP147, the CPU 207 determines whether or not the type of the button regarding which the pressing operation has been performed is the next button, and in the event that a positive result is obtained, advances to the next step SP148.

In step SP148, the CPU 207 deletes the current underline display and prepares for the next display, and advances to step SP149.

In step SP149, the CPU 207 sets the chapter No. of the material No. equivalent to the next corresponding page, from the page No. corresponding to the current chapters, as the transition destination chapter, following, of the page transition control information, the chapter/page correlation information CPi (FIG. 15), and advances to the next step SP156.

For example, in the event that the corresponding page No. corresponding to the current chapter is the third page, the chapter/page correlation information CPi is referred to, whereby the fact is recognized that chapter 2 of chapter No. "2" of the material 1 of which the next corresponding page is the fourth page, is the transition destination chapter, so the chapter 2 of the material 1 is set as the transition destination chapter.

In step SP156, the CPU 207 starts playing of the transition destination chapter from the top, and advances to the next step SP157. At this time, in the event that the transition destination chapter is the chapter 2 of the material 1 made up of moving image data, playing of the moving image is starting from the top thereof, but if the transition destination chapter is chapter 1 of material XX which is still image data, still image playing regarding the still image data SD3A is performed.

In step SP157, upon coming to the end of the chapter of the page currently being played, the CPU 207 temporarily stops the playing state, holds the display state as to the last frame image, and returns to step SP141. At this time, in the event that the transition destination chapter is chapter 2 of material 1 which is made up of moving image data, the display state as to the last frame image is held, but in the event that the transition destination chapter is chapter 1 of material XX which is still image data, the display state of the still image playing as to the still image data SD3A is held.

On the other hand, in the event that a negative result is obtained in step SP147, this means that the type of the button regarding which a pressing operation has been performed is not the next button, so in this case the CPU 207 advances to the next step SP150.

In step SP150, the CPU 207 determines whether or not the type of the button regarding which the pressing operation has been performed is the back button, and in the event that a positive result is obtained, advances to the next step SP151.

In step SP151, the CPU 207 deletes the current underline display and prepares for the next display, and advances to step SP152.

In step SP152, the CPU 207 sets the chapter No. of the material No. equivalent to the previous corresponding page, from the page No. corresponding to the current chapters, as the transition destination chapter, following, of the page transition control information, the chapter/page correlation information CPi (FIG. 15), and advances to the next step SP156.

For example, in the event that the corresponding page No. corresponding to the current chapter is the third page, the chapter/page correlation information CPi is referred to, whereby the fact is recognized that chapter 1 of chapter No. "1" of the material 1 of which the previous corresponding page is the second page, is the transition destination chapter, so the chapter 1 of the material 1 is set as the transition destination chapter.

In step SP156, the CPU 207 starts playing of the transition destination chapter from the top, advances to the next step SP157, and upon coming to the end of the chapter of the page currently being played, temporarily stops the playing state, holds the display state as to the last frame image, and returns to step SP141.

On the other hand, in the event that a negative result is obtained in step SP150, this means that the type of the button regarding which a pressing operation has been performed is neither the next button nor the back button, so in this case the CPU 207 advances to the next step SP153.

In step SP153, the CPU 207 determines whether or not a pressing operation has been performed with the OK button on a link provided to the page corresponding to the current chapter. In the event that a positive result is obtained here, this means that a pressing operation has been performed with the OK button on a link provided to the page corresponding to the current chapter, so in this case the CPU 207 advances to the next step SP154.

In step SP154, the CPU 207 deletes the current underline display and prepares for the next display, and advances to step SP155.

In step SP155, the CPU 207 makes reference to the link information Li (FIGS. 16A through 16C) of the page transition control information, obtains the material No. and page No. of the transition destination to which transition is to be made, sets the chapter No. of the entrance thereof as the transition destination chapter, and advances to the next step SP156.

In step SP156, the CPU 207 starts playing of the transition destination chapter from the top, advances to the next step SP157, and upon coming to the end of the chapter of the page currently being played, temporarily stops the playing state, holds the display state as to the last frame image, and returns to step SP141.

On the other hand, in the event that a negative result is obtained in step SP153, this means that the type of the button regarding which a pressing operation has been performed is none of the next button, back button or OK button, so in this case the CPU 207 advances to the next step SP158.

In step SP158, the CPU 207 determines whether or not the type of the button regarding which the pressing operation has been performed is the up button, and in the event that a positive result is obtained, advances to the next step SP159.

In step SP159, the CPU 207 deletes the current underline display and prepares for the next display, and advances to step SP160.

In step SP160, the CPU 207 obtains the up movement row No. U_ID corresponding to the current row No. ID from the screen text row placement table TBL (FIG. 18) and sets this as the movement destination of the underline, and advances to the next step SP 170. Hereinafter, we will say that the current row No. ID is, for example, "1022".

In step SP170, the CPU 207 determines whether or not the page No. PG corresponding to the row No. ID which the obtained up movement row No. U_ID indicates differs from the page No. PG corresponding to the current row No. ID. In the event that a negative result is obtained here, this means that the screen text row which is the moving source, and the screen text row corresponding to the row No. ID at the moving destination indicated by the up movement row No. U_ID exist on the same page, and in this case the CPU 207 returns to step SP142.

Actually, as shown in FIG. 18, page NO. PG corresponding to the row No. ID "1022" in the screen text row placement table TBL is "56", and the up movement row No. U_ID is "1021". Also, the page No. PG corresponding to the row No. ID "1021" indicated by the up movement row No. U_ID is "56", so the page Nos. of both are the same.

Accordingly, the CPU 207 returns to step SP142, and renders, on the graphic plane GPL at one time, an underline of a length of the screen text string width DIS_W from a position indicated by the screen character position x-coordinate DIS_CX, and screen character position y-coordinate DIS_CY corresponding to the row No. ID "1021" in the screen text row placement table TBL. Accordingly, the CPU 207 can move the underline which had been displayed at the screen text row corresponding to the row No. ID "1022" on page P56 shown in FIG. 41A to the screen text row corresponding to the row No. ID "1021", one row above. Note that in FIGS. 41A and 41B, the underlines displayed at the moving source screen text rows are shown as solid lines, and the underlines which are to be displayed at the moving destination screen text rows are shown as dotted lines.

On the other hand, in the event that a negative result is obtained in step SP158, this means that the type of the button regarding which a pressing operation has been performed is none of the next button, back button, OK button, or up button, so in this case the CPU 207 advances to the next step SP161.

In step SP161, the CPU 207 determines whether or not the type of the button regarding which the pressing operation has been performed is the down button, and in the event that a positive result is obtained, advances to the next step SP162, deletes the current underline display and prepares for the next display, and further advances to step SP163. Note that in the event that a positive result is obtained in step SP146 as well, the CPU 207 advances to step SP162, deletes the underline display, and further advances to step SP163.

In step SP163, the CPU 207 obtains the down movement row No. D_ID corresponding to the current row No. ID from the screen text row placement table TBL and sets this as the movement destination of the underline, and advances to the next step SP170.

In step SP170, the CPU 207 determines whether or not the page No. PG corresponding to the row No. ID which the obtained down movement row No. D_ID indicates differs from the page No. PG corresponding to the current row No. ID. Actually, as shown in FIG. 18, page No. PG corresponding to the row No. ID "1022" in the screen text row placement table TBL is "56", and the down movement row No. D_ID is "1023". Also, the page No. PG corresponding to the row No. ID "1023" indicated by the down movement row No. D_ID is "56", so the page Nos. of both are the same.

Accordingly, the CPU 207 returns to step SP142, and renders, on the graphic plane GPL at one time, an underline of a length of the screen text string width DIS_W from a position indicated by the screen character position x-coordinate DIS_CX, and screen character position y-coordinate DIS_CY corresponding to the row No. ID "1023" in the screen text row placement table TBL. Thus, the CPU 207 can move the underline which had been displayed at the screen text row corresponding to the row No. ID "1022" on page P56 shown in FIG. 41A to the screen text row corresponding to the row No. ID "1023", one row below.

On the other hand, in the event that a negative result is obtained in step SP161, this means that the type of the button regarding which a pressing operation has been performed is none of the next button, back button, OK button, up button, or down button, so in this case the CPU 207 advances to the next step SP164.

In step SP164, the CPU 207 determines whether or not the type of the button regarding which the pressing operation has been performed is the left button, and in the event that a positive result is obtained, advances to the next step SP165, deletes the current underline display and prepares for the next display, and further advances to step SP166.

In step SP166, the CPU 207 obtains the left movement row No. L_ID corresponding to the current row No. ID "1022" from the screen text row placement table TBL and sets this as the movement destination of the underline, and advances to the next step SP 170.

In step SP170, the CPU 207 determines whether or not the page No. PG corresponding to the row No. ID which the obtained left movement row No. L_ID indicates differs from the page No. PG corresponding to the current row No. ID. Actually, as shown in FIG. 18, page No. PG corresponding to the row No. ID "1022" in the screen text row placement table TBL is "56", and the left movement row No. L_ID is "1036". Also, the page No. PG corresponding to the row No. ID "1036" indicated by the left movement row No. L_ID is "56", so the page Nos. of both are the same.

Accordingly, the CPU 207 returns to step SP142, and renders, on the graphic plane GPL at one time, an underline of a length of the screen text string width DIS_W from a position indicated by the screen character position x-coordinate DIS_CX, and screen character position y-coordinate DIS_CY corresponding to the row No. ID "1036" in the screen text row placement table TBL. Thus, the CPU 207 can move the underline which had been displayed at the screen text row corresponding to the row No. ID "1022" on page P56 shown in FIG. 41A to the screen text row corresponding to the row No. ID "1036", to the left.

On the other hand, in the event that a negative result is obtained in step SP164, this means that the type of the button regarding which a pressing operation has been performed is none of the next button, back button, OK button, up button, down button, or left button, so in this case the CPU 207 advances to the next step SP167.

In step SP167, the CPU 207 determines whether or not the type of the button regarding which the pressing operation has been performed is the right button, and in the event that a positive result is obtained, advances to the next step SP168, deletes the current underline display and prepares for the next display, and further advances to step SP169.

In step SP169, the CPU 207 obtains the right movement row No. R_ID corresponding to the current row No. ID "1022" from the screen text row placement table TBL and sets this as the movement destination of the underline, and advances to the next step SP 170.

In step SP170, the CPU 207 determines whether or not the page No. PG corresponding to the row No. ID which the obtained right movement row No. R_ID indicates differs from the page No. PG corresponding to the current row No. ID. Actually, as shown in FIG. 18, page No. PG corresponding to the row No. ID "1022" in the screen text row placement table TBL is "56", and the right movement row No. R_ID is "1055". Also, the page No. PG corresponding to the row No. ID "1055" in the screen text row placement table TBL indicated by the down movement row No. D_ID is "56", so the page Nos. of both are the same.

Accordingly, the CPU 207 returns to step SP142, and renders, on the graphic plane GPL at one time, an underline of a length of the screen text string width DIS_W from a position indicated by the screen character position x-coordinate DIS_CX, and screen character position y-coordinate DIS_CY corresponding to the row No. ID "1055" in the screen text row placement table TBL. Thus, the CPU 207 can move the underline which had been displayed at the screen text row corresponding to the row No. ID "1022" on page P56 shown in FIG. 41A to the screen text row corresponding to the row No. ID "1055", to the right.

On the other hand, in the event that a negative result is obtained in step SP167, this means that the type of the button regarding which a pressing operation has been performed is none of the next button, back button, OK button, up button, down button, left button, or right button, so in this case the CPU 207 advances to the next step SP174.

In step SP174, the CPU 207 has not been provided with an instruction for page transition, so upon coming to the end of the chapter of the page currently being played, temporarily stops the playing state, holds the display state as to the last frame image, returns to step SP145, and stands by for a button pressing operation.

So far, a description has been made regarding a case wherein the current row No. ID is "1022", but hereinafter, we will say that the current row No. ID is, for example, "1069". In this case, the underline is displayed at the screen text row corresponding to the row No. ID "1069" on page P56 shown in FIG. 41A.

In step SP161, in the event of determining that the type of button regarding which a pressing operation has been performed is the down button, the CPU 207 advances to the next step SP162 and deletes the current underline display to prepare for the next display, and further advances to step SP163.

In step SP163, the CPU 207 obtains the down movement row No. D_ID corresponding to the current row No. ID "1069" from the screen text row placement table TBL and sets this as the movement destination of the underline, and advances to the next step SP170.

In step SP170, the CPU 207 determines whether or not the page No. PG corresponding to the row No. ID which the obtained down movement row No. D_ID indicates differs from the page No. PG corresponding to the current row No. ID. Actually, as shown in FIG. 18, page No. PG corresponding to the row No. ID "1069" in the screen text row placement table TBL is "56", and the down movement row No. D_ID is "1078". Also, the page No. PG corresponding to the row No. ID "1078" indicated by the down movement row No. D_ID is "57", so the page Nos. differ. Accordingly, a positive result is obtained here, and the CPU 207 advances to the next step SP171.

In step SP171, the CPU 207 sets the entrance of the page indicated by the page No. PG "57" corresponding to the obtained row No. ID "1078" as the transition destination chapter, from the page No. corresponding to the current chapter, following, of the page transition control information, the chapter/page correlation information CPi (FIG. 15), and advances to the next step SP172.

In step SP172, the CPU 207 starts playing of the transition destination chapter from the top, advances to the next step SP173, and upon coming to the end of the chapter of the page currently being played, temporarily stops the playing state, holds the display state as to the last frame image, and returns to step SP142 again.

In step SP142, the CPU 207 renders an underline of a length of screen text string width DIS_W from a position indicated by the screen character position x-coordinate DIS_CX, and screen character position y-coordinate DIS_CY corresponding to the row No. ID "1078" in the screen text row placement table TBL, advances to the next step SP143, and repeats the above-described processing. Accordingly, the CPU 207 can display the still image of page P57 on the television receiver 103, and also move the underline to the screen text row corresponding to the row No. ID "1078".

Now, while description has been made above regarding a case of making transition to the next page upon the down button having been pressed, the CPU 207 performs similar processing while making reference to the screen text row placement table TBL in the event that the up button, left button, or right button, are pressed, as well. In the event that the moving destination of the underline is set to another page in this case, the CPU 207 makes transition to the other page and displays the underline at this other page.

1-11. Operations and Advantages

In the above configuration, the control unit 2 of the disc production device 1 selects, of the still image data SD1 through SD4 and enlarged still image data SD3A of the publication content data C1, just the still image data SD2 and SD4 which the producer has instructed to be objects of copyright protection, converts these into moving image data, and encrypts.

The control unit 2 of the disc production device 1 then can record, together in the Blu-ray disc 5, the moving image portion generated based on the still image data SD2 and SD4, and the still image portion of the other still image data SD1, SD3, SD3A, and so forth, along with the BD-J application 302.

Thus, the control unit 2 of the disc production device 1 can record just the still image data SD2 and SD4 to be objects of copyright protection after conversion into moving image data and encryption, security management can be made for the still image data SD2 and SD4 to be objects of copyright protection while suppressing increase of data amount as compared with a case of performing moving image conversion and encryption of all of the still image data SD1 through SD4 and enlarged still image data SD3A.

Also, the control unit 2 of the disc production device 1 generates page transition control information (material information Mi, page information CPi, and link information Li) for freely transitioning among chapter 1 of the chapter 1 and chapter 2 of material 1, and so on through chapter 1 of material 10, chapter 1 of material 11, and so on through chapter 1 of material XX, and so forth, of the new publication content data C3 generated by moving image conversion.

Accordingly, in the event that a pressing operation is performed for the next button while displaying the still image (chapter 1) of the third page shown with the material 11 while playing the Blu-ray disc 5, the BD recorder 101 which is the playing side can transition to the moving image portion (chapter 2) of the fourth page shown with the material 1, following the page transition control information.

In the same way, in the event that a pressing operation is performed for the back button while displaying the still image (chapter 1) of the third page shown with the material 11, the BD recorder 101 can transition to the moving image portion (chapter 1) of the second page shown with the material 1, following the page transition control information.

Thus, in the event of performing page transition in new publication content data C3, the BD recorder 101 follows the page transition control information to perform page transition based on page Nos. in the original publication content data C1 regardless of the material No., thereby enabling page switching in the original order, without giving the user an unnatural sensation.

Further, at the time of decoding the DTP data D1 including text creating the still image data IMG1 of the publication content data C1, text string placement information is obtained from the DTP data D1. The control unit 2 of the disc production device 1 generates a screen text row placement table TBL for displaying an underline serving as a highlight as to a screen text row displayed on the television receiver 103, and also for moving the display position of the highlight, based on text string placement information, and records this in the Blu-ray disc 5.

Accordingly, at the time of playing the Blu-ray disc 5 the BD recorder 101 which is the playing side can display underlines as to screen text rows displayed on the television receiver 103 following the screen text row placement table TBL.

At this time, in the event that the page to be displayed is a moving image, the BD recorder 101 renders the moving data on the moving image plane MPL and also renders the underlines on the graphic plane GPL, and after compositing the moving image plane MPL and graphic plane GPL, displays on the television receiver 103.

On the other hand, in the event that the page to be displayed is a still image, the BD recorder 101 does not render anything on the moving image plane MPL, and renders the still image data and underlines on the graphic plane GPL, and after compositing the moving image plane MPL and graphic plane GPL, displays on the television receiver 103.

Also, with the BD recorder 101, underlines displayed at screen text rows can be freely moved to screen text rows at other positions following the screen text row placement table TBL by user operations.

At this time, in the event that the moving destination of the underline is different from the page in which the screen text at which the underline is currently displayed, the BD recorder 101 makes transition thereof to the moving image portion or still image of the moving destination following the screen text row placement table TBL and page transition control information, and also can move the underline to the image text row which is the moving destination.

Further, in the event that there is no screen text row in the direction instructed by user operations, the BD recorder 101 can keep the underline from moving from the current screen text row following the screen text row placement table TBL.

Also, in the event that a pressing operation is performed with the next button while displaying the still image (chapter 1) in the third page shown with the material 11 when playing the Blu-ray disc 5, transition is made to the moving image portion (chapter 2) of the fourth page shown with material 1, following the page transition control information.

Further, in the event that a pressing operation is performed with the "2" button while displaying the moving image portion (chapter 2) in the fourth page shown with the material 1, transition is made to the moving image portion (chapter 1) of the second page shown with material 1, following the page transition control information.

Further, in the event that a pressing operation is performed with the next button while displaying the moving image portion (chapter 1) in the second page shown with the material 1, transition is made to the moving image portion (chapter 1) of the third page shown with material 11, following the page transition control information.

Thus, in the event of making transition from a still image to a moving image portion, or in the event of making transition from a moving image to a moving image portion, or in the event of making transition from a moving image to a still image portion, the BD recorder 101 can display the underline at the screen text row in the moving image portion or still image at the transition destination page, following the screen text row placement table TBL.

According to the above configuration, the control unit 2 of the disc production device 1 decodes DTP data D1 which is electronic document data including text to create still image data of publication content data C1, and converts, of the still image data, predetermined still image data into moving image data. Further, the control unit 2 of the disc production device 1 extracts text string placement information from the DTP data D1. Next, the control unit 2 of the disc production device 1 displays an underline as a highlight as to a screen text included in the moving image data displayed on the television receiver 103, and also generates a screen text row placement table TBL serving as underline rendering control information for displaying an underline as a highly as to screen text included in the moving image data displayed on the television receiver 103 and for moving the display position of the highlight, based on the text string placement information, and records this in the Blu-ray disc 5.

Accordingly, the control unit records in the recoding medium not only moving image data obtained by converting still image data based on the electronic document data, but also the screen text string placement table TBL based on the text row placement information extracted from the electronic document data, so when the recording medium is played, the highlight can be displayed as to a text string included in the content obtained by converting the still images into the moving image, and the display position of the highlight can be freely changed.

2. Other Embodiments

With the above embodiment, a case has been described wherein the still image data SD2 and SD4 are converted into moving image data with a frame frequency of 60 Hz, but the present invention is not restricted to this arrangement, and arrangements may be made wherein conversion is made into moving image data with a frame frequency of, for example, 24 Hs, 30 Hz, or other frame frequencies.

Also, with the above embodiment, a case has been described wherein following conversion of the still image data SD2 and SD4 into moving image data, encryption by AACS is performed. However, the present invention is not restricted to this arrangement, and an arrangement may be made wherein encryption is performed with, for example, SAFIA (Security Architecture For Intelligent Attachment).

Further, with the above embodiment, a case has been described wherein the still image data SD2 and SD4 are converted into 5-second moving image data. However, the present invention is not restricted to this arrangement, and an arrangement may be made wherein the still image data SD2 and SD4 are converted into 10-second moving image data if the contents thereof are characters and the like, and converted into 3-second moving image data if photographs or the like which are recognizable at a glance.

Further, with the above embodiment, a case has been described wherein new publication content data C3 obtained by performing data conversion of publication content data C1 is recorded in a Blu-ray disc 5. However, the present invention is not restricted to this arrangement, and an arrangement may be made wherein the new publication content data C3 obtained by performing data conversion of publication content data C1 is recorded in another disc-shaped recording medium such as a DVD or the like.

Further, with the above embodiment, a case has been described wherein the player of the recording medium according to the present invention is applied to a BD recorder 101. However, the present invention is not restricted to this arrangement, and an arrangement may be made wherein application may be made to a television receiving with functions to play a disc-shaped recording medium, a portable disc-shaped recording medium player, a desktop or notebook type personal computer with functions to play a disc-shaped recording medium, a gaming device with functions to play a disc-shaped recording medium, or various other types of electronic devices, as long as capable of playing disc-shaped recording media such as the Blu-ray disc 5 or the like.

Further, with the above embodiment, a case has been described wherein an underline is displayed as to screen text rows read in from the DTP data D1 and displayed on the television receiver 103, one row at a time, and moved one row at a time. However, the present invention is not restricted to this arrangement, and an arrangement may be made wherein underlines are displayed and moved regarding text strings in increments of certain lengths, such as sentences, phrases, words, or the like. In this case as well, the character position indicating the first character of the certain text string and the text row width indicating the length of the text string can be extracted from the DTP data D1.

Also, in the event that the certain text string is on multiple screen text rows, an underline can be rendered from the character position indicating the first character in the certain text string to the last character in the screen text row where this text string is included, and further render an underline from the top of the next screen text row as appropriate.

Further, with the above embodiment, a case has been described wherein an underline is used as a highlight to facilitate visual recognition of screen text rows displayed on the television receiver 103 regarding which screen text the user is reading. However, the present invention is not restricted to this arrangement, and various display forms may be employed, such as, for example, coloring the background solid behind the screen text row so as to give an appearance of having been marked with a marker, filling in the background behind the screen text row with hatching, and so on.

Further, with the above embodiment, a case has been described wherein PDF data, which is one type of DTP data is read in as electronic document data. However, the present invention is not restricted to this arrangement, and various other types of electronic document data including text may be used. In this case as well, the text string placement information can be read in from the electronic, document data, and a screen text row placement table TBL serving as underline rendering control information corresponding to the text string placement information can be created.

Further, with the above embodiment, a case has been described wherein, at the time of displaying an underline as to a still image, the still image data and underline are rendered and displayed on the graphic plane GPL. However, the present invention is not restricted to this arrangement, and an arrangement may be made wherein the still image data is rendered on the moving image plane MPL, the underline is rendered on the graphic plane GPL, these are composited, and displayed on the screen.

Further, with the above embodiment, a case has been described wherein an underline of a length of screen text string width DIS_W is rendered on the graphic plane GPL from a position indicated by the screen character position x-coordinate DIS_CX and screen character position y-coordinate DIS_CY. However, the present invention is not restricted to this arrangement, and an arrangement may be made wherein the underline is gradually rendered over time from the position indicated by the screen character position x-coordinate DIS_CX and screen character position y-coordinate DIS_CY. In this case, it is sufficient for an underline of a length of screen text string width DIS_W to be rendered on the graphic plane GPL by the time that a predetermined amount of time has elapsed.

Further, with the above embodiment, a case has been described wherein the DTP data D1 is decoded, still image data IMG1 is cropped out in two-page spread increments made up of left-and-right pages of the publication content data C1, and the cropped out still image data IMG1 is subjected to appropriation of new page Nos. in increments of the two-page spreads. However, the present invention is not restricted to this arrangement, and an arrangement may be made wherein new page Nos. are assigned in increments of pages made up of just the left side page or left side page in the publication content data C1.

Moreover, with the above embodiment, a case has been described wherein the BD recorder 101 serving as a recording medium player according to the embodiment of the present invention is configured of a playing block including the CPU 207 and optical disc drive 204, and an underline rendering control block including the CPU 207 and graphic engine 214. However, the present invention is not restricted to this arrangement; rather, recording medium players according to embodiments of the present invention may be configured a variety of a playing arrangements and underline rendering control arrangements.

The present application contains subject matter related to that disclosed in Japanese Priority Patent Application JP 2009-186690 filed in the Japan Patent Office on Aug. 11, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method for production of recording medium comprising:
obtaining text string placement information from electronic document data, wherein said text string placement information represents placement of a plurality of text strings included in said electronic document data;
converting said electronic document data into still image data;
converting predetermined still image data of said still image data into moving image data by generating moving image data of n seconds using said still image data;
generating underline rendering control information to display predetermined text strings included in said moving image data in a highlighted manner and to move a display position of one or more highlights, based on said text string placement information; and
recording said moving image data and said underline rendering control information in said recording medium based on a predetermined recording medium format,
wherein said generation of said underline rendering control information comprises generating underline rendering control information to display one or more highlights for said text strings included in said still image data and to move the display position of said one or more highlights based on said text string placement information, and
wherein the step of recording comprises recording said still image data in said recording medium based on said predetermined recording medium format.

2. The method according to claim 1, wherein said conversion of said still image data into said moving image data comprises generating, after having selected desired said still image data from a plurality of said still image data, said moving image data for said desired still image data, and encrypting said generated moving image data so as to be converted into encrypted image data.

3. The method according to claim 2, further comprising: generating transition information to transition between said encrypted moving image data and said still image data not selected during said conversion; and wherein the step of recording comprises recording said still image data in said recording medium based on said predetermined recording medium format.

4. The method according to claim 1, further comprising:
assigning new page numbers to a plurality of pages of said electronic document data;
converting said still image data to which said page numbers have been assigned into said moving image data having moving image pages corresponding to said new page numbers; and
generating, at the time of moving the display position of said one or more highlights displayed for said text strings included in said moving image data, said underline rendering control information to move said one or more highlights to said moving image page or said still image page which is different from said moving image page where said text strings are displayed.

5. The method according to claim 1, wherein obtaining of text string placement information comprises dividing said plurality of text strings included in said electronic document data into one-row increments; and
obtaining text position indicating a position of the first character of each row, and text string width indicating a length of said text string included in said one-row increment from said first character as said text string placement information
wherein said underline rendering control information is generated to display said one or more highlights, over said length indicated by said text string width from the position indicated by said text position, for said text strings included in said moving image data.

6. A non-transitory recording medium having stored thereon, at least one code section being executable by a computer for causing the computer to perform steps comprising:
obtaining text string placement information from electronic document data, wherein said text string placement information represents placement of a plurality of text strings included in said electronic document data;
converting said electronic document data into still image data;
converting predetermined still image data of said still image data into moving image data by generating moving image data of n seconds using said still image data;
generating underline rendering control information to display predetermined text strings included in said moving image data in a highlighted manner and to move a display position of one or more highlights based on said text string placement information, wherein said generation of said underline rendering control information comprises generating underline rendering control information to display one or more highlights for said text strings included in said still image data and to move said display position of said one or more highlights based on said text string placement information; and
recording said moving image data and said underline rendering control information in said recording medium based on a predetermined recording medium format.

7. A player, comprising:
a playing unit operable to:
obtain text string placement information from electronic document data, wherein said text string placement information represents placement of a plurality of text strings included in said electronic document data;
convert said electronic document data into still image data;
convert predetermined still image data of said still image data into moving image data by generating moving image data of n seconds using said still image data;
generate underline rendering control information to display predetermined text strings included in said moving image data in a highlighted manner and to move a display position of one or more highlights based on said text string placement information;
display one or more highlights for said text strings included in said still image data and move display position of said one or more highlights based on said text string placement information; and
record said moving image data and said underline rendering control information in said recording medium based on a predetermined recording medium format.

8. The player according to claim 7, further comprising an underline rendering control unit operable to move the display position of said one or more highlights based on user operation instructions.

9. The player according to claim 7, further comprising an underline rendering control unit operable to display said one or more highlights for said text strings, and automatically move the display position of said one or more highlights after a predetermined amount of time has elapsed.

* * * * *